(12) United States Patent
Nelson et al.

(10) Patent No.: US 11,945,620 B2
(45) Date of Patent: Apr. 2, 2024

(54) APPARATUSES AND METHODS FOR FORMING POUCH PRODUCT

(71) Applicant: Altria Client Services LLC, Richmond, VA (US)

(72) Inventors: Gregory L. Nelson, Chester, VA (US); Christopher Ryan Newcomb, Powhatan, VA (US); James D. Evans, Chesterfield, VA (US); Thien Nguyen, Richmond, VA (US); Jarrod W. Chalkley, Mechanicsville, VA (US); Robert V. Powell, Midlothian, VA (US)

(73) Assignee: ALTRIA CLIENT SERVICES LLC, Richmond, VA (US)

( * ) Notice: Subject to any disclaimer, the term of this patent is extended or adjusted under 35 U.S.C. 154(b) by 0 days.

(21) Appl. No.: 17/851,222

(22) Filed: Jun. 28, 2022

(65) Prior Publication Data
US 2022/0324596 A1    Oct. 13, 2022

Related U.S. Application Data

(62) Division of application No. 16/382,820, filed on Apr. 12, 2019, now Pat. No. 11,407,534.

(51) Int. Cl.
*B65B 9/00* (2006.01)
*A24F 23/02* (2006.01)
(Continued)

(52) U.S. Cl.
CPC ............ *B65B 9/04* (2013.01); *A24F 23/02* (2013.01); *B65B 1/10* (2013.01); *B65B 29/00* (2013.01);
(Continued)

(58) Field of Classification Search
CPC ..... A24F 23/02; B29C 51/225; B29C 66/489; B65B 1/16; B65B 9/04; B65B 9/042;
(Continued)

(56) References Cited

U.S. PATENT DOCUMENTS 3,215,558 A    11/1965 Dascher
3,519,526 A *  7/1970 Bryant ............... D06N 7/0071
                                                428/95
(Continued)

FOREIGN PATENT DOCUMENTS

DE    19725377 A1    12/1998
EP      280799 A1     9/1988
(Continued)

OTHER PUBLICATIONS

U.S. Office Action dated Dec. 8, 2022 for corresponding U.S. Appl. No. 16/382,733.
(Continued)

*Primary Examiner* — Eyamindae C Jallow
(74) *Attorney, Agent, or Firm* — Harness, Dickey & Pierce, P.L.C.

(57) ABSTRACT

In an example embodiment, an apparatus for making pouch products includes a conveyor system. The conveyor system includes a first receiving location along a path of the conveyor system, and a dosing location along the path of the conveyor system. The apparatus also includes a first material dispensing station configured to transfer a first material to the first receiving location. The first material includes a first elastic layer and a first support layer. The first material dispensing station includes a dispenser roller configured to hold a roll of the first material, a plurality of rollers configured to convey the first material from the dispenser roller to the first receiving location, and a stripper plate configured
(Continued)

remove at least a portion of the first support layer from a portion of the first elastic layer.

19 Claims, 38 Drawing Sheets

(51) Int. Cl.
  *B65B 1/10* (2006.01)
  *B65B 9/04* (2006.01)
  *B65B 29/00* (2006.01)
  *B65B 41/16* (2006.01)
  *B65B 43/04* (2006.01)
  *B65B 61/10* (2006.01)
  *B65B 61/28* (2006.01)

(52) U.S. Cl.
  CPC .............. *B65B 41/16* (2013.01); *B65B 43/04* (2013.01); *B65B 61/10* (2013.01); *B65B 61/28* (2013.01)

(58) Field of Classification Search
  CPC ......... B65B 13/02; B65B 41/16; B65B 47/10; B65B 2009/047
  USPC .......................................................... 53/450
  See application file for complete search history.

(56) References Cited

U.S. PATENT DOCUMENTS

| | | | |
|---|---|---|---|
| 3,591,065 A | 7/1971 | Hansen, Jr. et al. | |
| 3,691,718 A | 9/1972 | Woodruff et al. | |
| 3,846,569 A | 11/1974 | Kaplan | |
| 4,118,454 A * | 10/1978 | Miki | B29C 51/426 |
| | | | 264/294 |
| 4,359,358 A * | 11/1982 | Hattemer | G09F 3/0288 |
| | | | 493/401 |
| 4,494,361 A * | 1/1985 | Barathon | B65B 9/02 |
| | | | 53/553 |
| 4,618,384 A | 10/1986 | Sabee | |
| 4,676,051 A | 6/1987 | Hoskinson et al. | |
| 4,779,400 A | 10/1988 | Hoskinson et al. | |
| 4,813,209 A | 3/1989 | Foster et al. | |
| 4,849,043 A * | 7/1989 | Instance | B31D 1/021 |
| | | | 156/227 |
| 5,192,484 A * | 3/1993 | Matuzawa | B29C 51/225 |
| | | | 264/553 |
| 5,366,685 A * | 11/1994 | Fujii | B29C 51/225 |
| | | | 425/388 |
| 5,391,420 A * | 2/1995 | Bootman | G09F 5/04 |
| | | | 424/76.4 |
| 5,412,925 A | 5/1995 | Tani et al. | |
| 5,460,269 A | 10/1995 | Bayer | |
| 5,516,581 A | 5/1996 | Kreckel et al. | |
| 5,519,982 A | 5/1996 | Herber et al. | |
| 5,755,681 A | 5/1998 | Plews | |
| 6,286,145 B1 | 9/2001 | Welchel et al. | |
| 6,544,910 B2 | 4/2003 | Himmelsbach et al. | |
| 6,996,958 B1 * | 2/2006 | Yeh | B65B 47/10 |
| | | | 53/575 |
| 7,048,013 B2 | 5/2006 | Shannon | |
| 8,440,043 B1 | 5/2013 | Schneider et al. | |
| 8,628,319 B2 | 1/2014 | Mazzarolo | |
| 8,662,880 B2 | 3/2014 | Fowler et al. | |
| 9,084,836 B2 | 7/2015 | Martin | |
| 10,028,521 B2 | 7/2018 | Carroll et al. | |
| 2003/0138479 A1 | 7/2003 | Mizota et al. | |
| 2010/0106113 A1 | 4/2010 | Heinecke | |
| 2011/0229676 A1 | 9/2011 | Funakoshi et al. | |
| 2012/0051805 A1 | 3/2012 | Suzuki et al. | |
| 2014/0047804 A1 | 2/2014 | Evans et al. | |
| 2014/0190638 A1 | 7/2014 | Hull | |
| 2014/0261473 A1 | 9/2014 | Carroll et al. | |
| 2015/0336691 A1 | 11/2015 | Fowler et al. | |
| 2018/0133919 A1 * | 5/2018 | Waterman | B65B 61/08 |

FOREIGN PATENT DOCUMENTS

| | | |
|---|---|---|
| JP | 2006141908 A | 6/2006 |
| JP | 2012056607 A | 3/2012 |
| WO | WO-2017060399 A1 | 4/2017 |
| WO | WO-2017093486 A1 | 6/2017 |

OTHER PUBLICATIONS

GD, Horizontal Flat Pouching Machine <https://www.gidi.it/en/solutions/product/sm>, accessed Apr. 11, 2019.
U.S. Appl. No. 16/382,820, filed Apr. 12, 2019.
U.S. Appl. No. 16/382,733, filed Apr. 12, 2019.
U.S. Appl. No. 16/382,736, filed Apr. 12, 2019.
U.S. Appl. No. 15/975,087, filed May 9, 2018.
U.S. Appl. No. 16/275,927, filed Feb. 14, 2019.
U.S. Appl. No. 13/967,181, filed Aug. 14, 2013.
Extended European Search Report for Application No. 20167379. 5-1016, dated Aug. 5, 2020.
Communication Pursuant to Article 94(3) EPC for European Patent Application 20167379.5, dated Nov. 8, 2021 (4 pages).
United States Office Action for U.S. Appl. No. 16/382,820 dated Nov. 26, 2021 (10 pages).
U.S. Office Action dated Nov. 26, 2021 for corresponding U.S. Appl. No. 16/382,733.
United States Notice of Allowance for U.S. Appl. No. 16/382,820 dated Mar. 21, 2022.
U.S. Final Office Action dated Jun. 8, 2022 for corresponding U.S. Appl. No. 16/382,733.
U.S. Office Action dated Jun. 8, 2023 for corresponding U.S. Appl. No. 16/382,733.
U.S. Notice of Allowance dated Jan. 10, 2024 for corresponding U.S. Appl. No. 16/382,733.
European Examination Report for EP Application 20167379.5 dated Oct. 23, 2023 (4 pages).

* cited by examiner

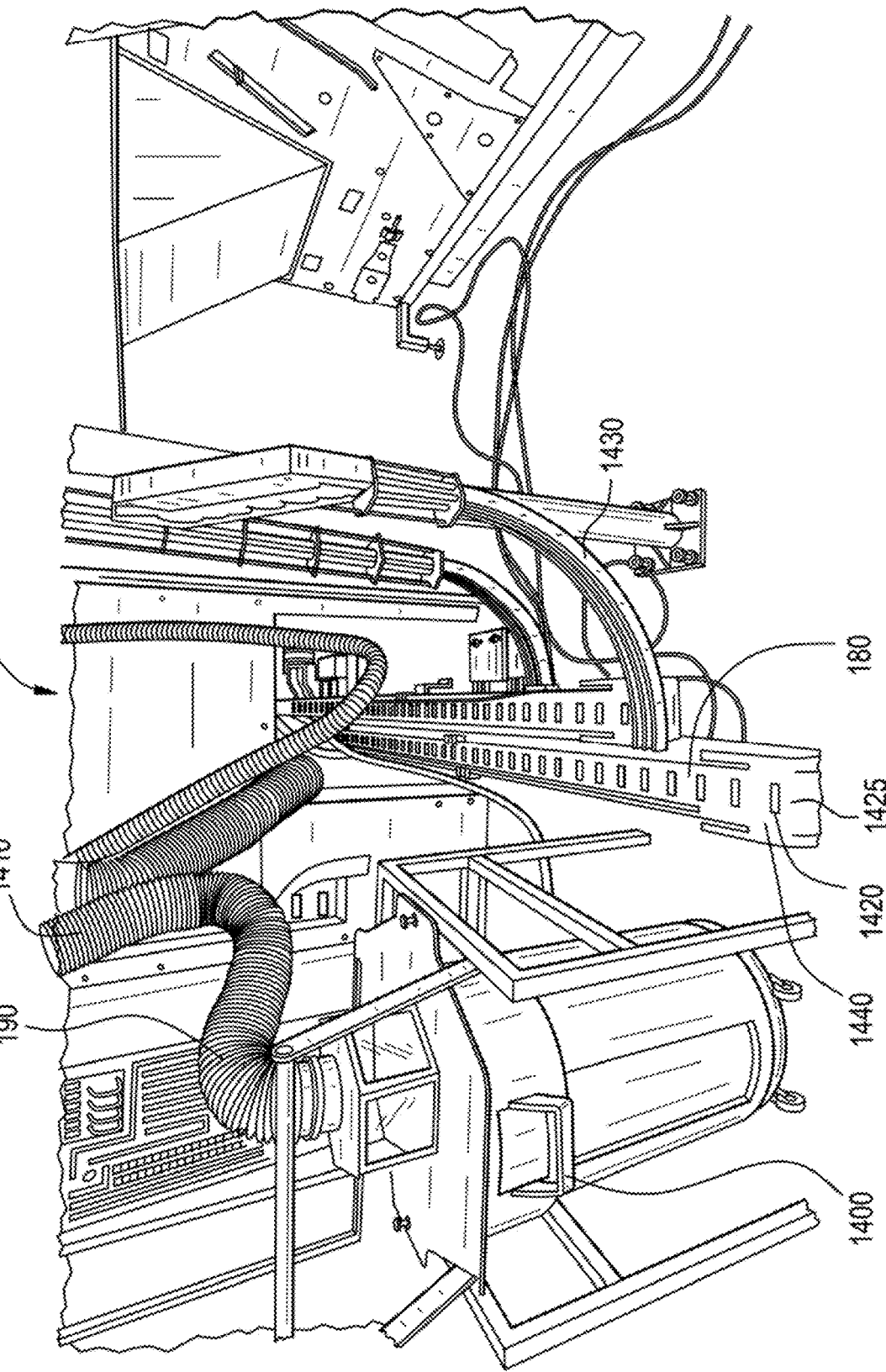

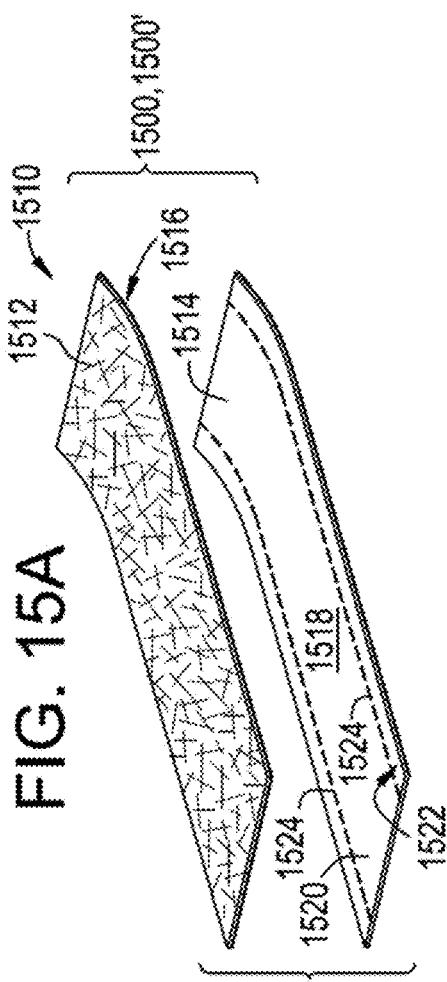
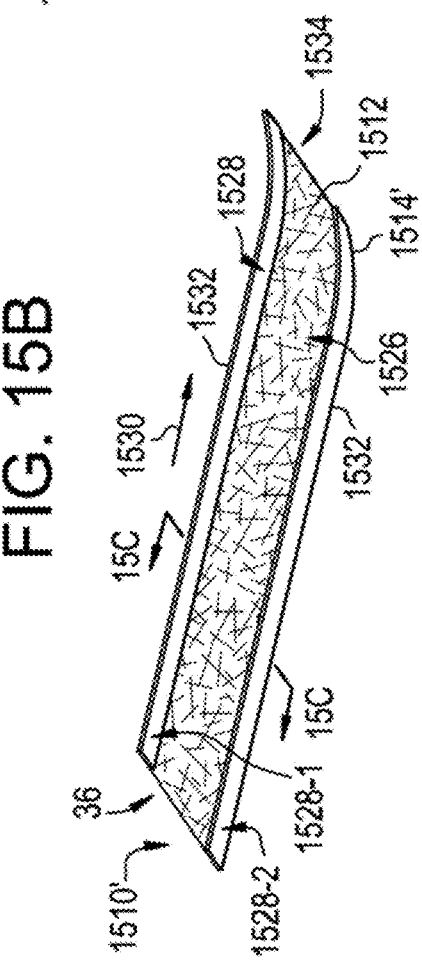
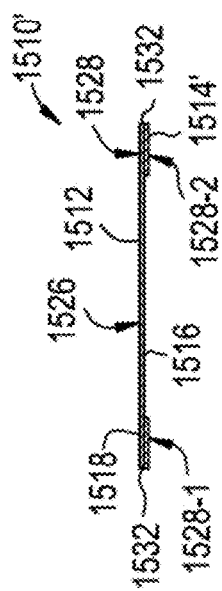

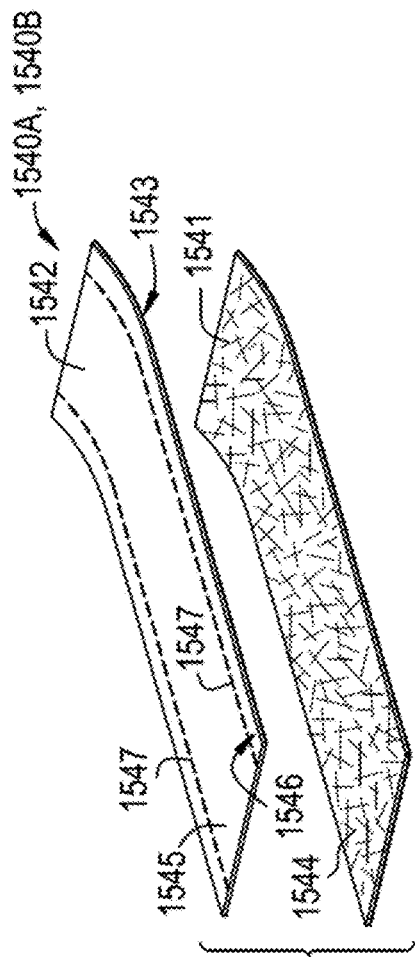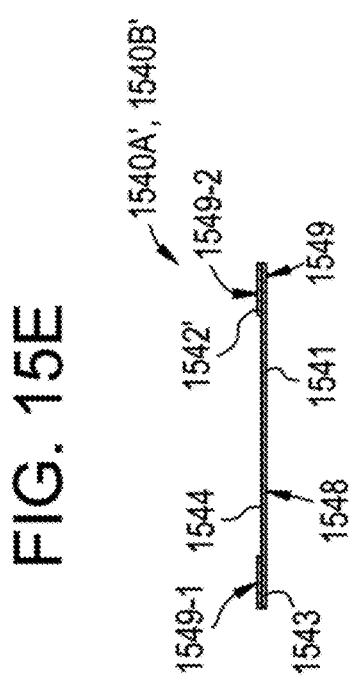

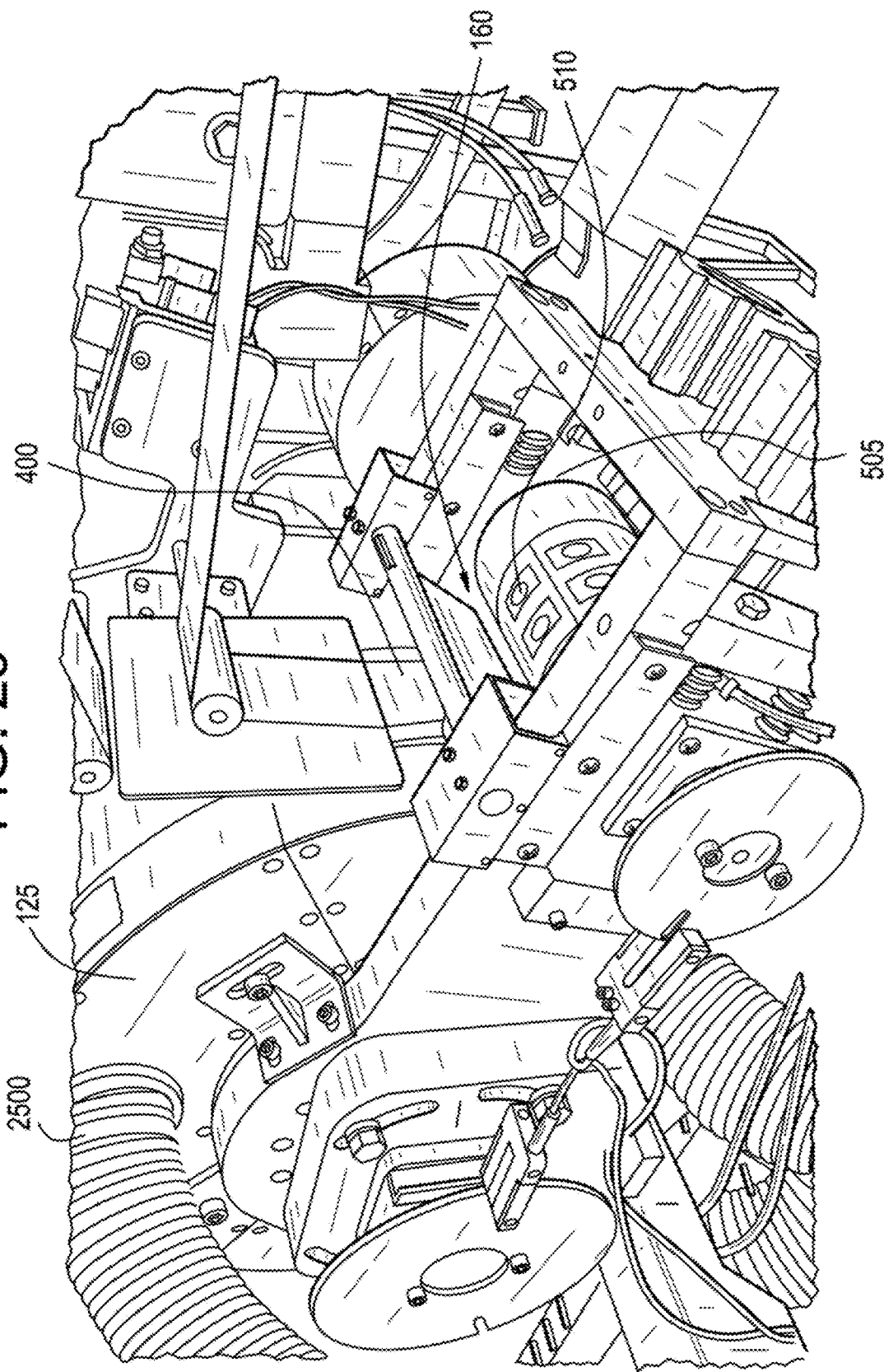

APPARATUSES AND METHODS FOR FORMING POUCH PRODUCT

CROSS-REFERENCE TO RELATED APPLICATION(S)

This application is a divisional application of U.S. application Ser. No. 16/382,820, filed Apr. 12, 2019, the entire contents of which is incorporated herein by reference.

BACKGROUND

Field

The present disclosure relates to apparatuses and methods for forming pouch products including an elastic layer.

SUMMARY

At least one example embodiment relates to an apparatus for making pouch products.

In at least one example embodiment, an apparatus making pouch products comprises a first material dispensing station configured to transfer a first material to a first receiving location. The first material includes a first elastic layer, and a first support layer. The first material dispensing station includes a dispenser roller configured to hold a roll of the first material, a plurality of rollers configured to convey the first material from the dispenser roller to the first receiving location, and a stripper plate configured remove at least a portion of the first support layer from a portion of the first elastic layer.

In at least one example embodiment, the plurality of rollers comprises at least one tensioner configured to apply tension to the first material as the first material is conveyed from the dispenser roll to the first receiving location.

In at least one example embodiment, the first material dispensing station further comprises a dewrinkling roller configured to reduce wrinkles in the first material.

In at least one example embodiment, the apparatus further comprises a doser at a dosing location. The doser is configured to deliver a filling material to a portion of the first material.

In at least one example embodiment, the apparatus further comprises a second material dispensing station configured to deliver a second material to a second receiving location, the second material including a second elastic layer and a second support layer, the first material being aligned with the second material at the second receiving location, such that the filling material is between the portion of the first material and a portion of the second material.

In at least one example embodiment, the second material dispensing station includes a second dispenser roller configured to hold a roll of the second material, a second plurality of rollers configured to convey the second material from the second dispenser roller to the second receiving location, and a second stripper plate configured remove at least a portion of the second support material from the second elastic material. The second stripper plate is adjacent the second receiving location. The second material dispensing station further comprises a second dewrinkling roller configured to reduce wrinkles in the second material. The second dewrinkling roller has a bowed outer surface.

In at least one example embodiment, the apparatus further comprises a heat knife assembly at a cutting and sealing location. The heat knife assembly comprises a heat knife assembly roller, and a plurality of heat knives along the heat knife assembly roller. The heat knife assembly is configured to seal a peripheral portion of the first elastic material to a second peripheral portion of the second elastic material, such that the filling material is enclosed between the first elastic material and the second elastic material to form a pouch product.

In at least one example embodiment, the apparatus further comprises an ejector system at a product ejection location. The ejector system is configured to remove product from the apparatus.

In at least one example embodiment, the apparatus further comprises a waste removal system at a waste removal location. The waste removal system includes a waste vacuum configured to remove remnants of the first material and remnants of the second material.

In at least one example embodiment, the apparatus further comprises a conveyor system. The conveyor system includes a rotatable drum or a linear conveyor. The rotatable drum includes a plurality of divots therein. The plurality of divots are configured to allow a vacuum to be communicated to the plurality of divots at the dosing location, such that a portion of the first elastic material is pulled into the plurality of divots at the dosing location.

At least one example embodiment relates to an apparatus for making pouch products.

In at least one example embodiment, an apparatus for making pouch products comprises a rotatable drum including a plurality of divots along a central portion of the rotatable drum, and a vacuum source configured to communicate a vacuum to each of the plurality of divots so as to draw a first elastic layer of a first material into each of the plurality of divots.

In at least one example embodiment, the plurality of divots are arranged in two lanes. Each of the plurality of divots comprises at least one air hole therethrough.

At least one example embodiment relates to an apparatus for making pouch products.

In at least one example embodiment, an apparatus for making pouch products comprises a rotatable drum including a plurality of divots along a central portion of the rotatable drum. The plurality of divots are configured to travel along a path of the rotatable drum. The apparatus also includes a first material dispensing station configured to transfer a first material to a first receiving location along the path of the rotatable drum. The first material includes a first elastic layer and a first support layer. The first material dispensing station includes a dispenser roller configured to hold a roll of the first material, and a stripper plate configured remove at least a portion of the first support layer from a portion of the first elastic layer. The apparatus also includes a vacuum source configured to communicate a vacuum to each of the plurality of divots so as to pull at least a portion of the first elastic layer into each of the divots.

In at least one example embodiment, the apparatus further comprises a doser at a dosing location. The doser is configured to deliver a filling material to a portion of the first material.

In at least one example embodiment, the apparatus further comprises a second material dispensing station configured to deliver a second material to a second receiving location. The first material is aligned with the second material at the second receiving location, such that the filling material is between the portion of the first material and a portion of the second material.

In at least one example embodiment, the second material dispensing station includes a second dispenser roller configured to hold a roll of the second material, the second material including a second support material, and a second stripper plate configured remove at least a portion of the second support material from the second material. The second stripper plate is adjacent the second receiving location.

In at least one example embodiment, the apparatus further comprises a heat knife assembly at a cutting and sealing location along the path of the rotatable drum. The heat knife assembly comprises a heat knife assembly roller, and a plurality of heat knives along the heat knife assembly roller. The heat knife assembly is configured to seal a peripheral portion of the first elastic material to a second peripheral portion of the second elastic material, such that the filling material is enclosed between the first elastic material and the second elastic material so as to form a pouch product.

In at least one example embodiment, the apparatus further comprises an ultrasonic rotary sealer and cutter at a cutting and sealing location along the path of the rotatable drum.

In at least one example embodiment, the apparatus further comprises an ejector system at a product ejection location. The ejector system is configured to remove product from the apparatus.

In at least one example embodiment, the apparatus further comprises a waste removal system at a waste removal location. The waste removal system includes a waste vacuum configured to remove remnants of a first material and remnants of a second material.

At least one example embodiment relates to a method of making a pouch.

In at least one example embodiment, a method of making a pouch product having an elastic outer wrapper comprises transferring a first material to a first receiving location, the first material including a first elastic layer and a first support layer, removing a portion of the first support layer from the first elastic layer to form a first web, and conveying the first web to a dosing location.

In at least one example embodiment, the method further includes applying a vacuum to the first web at the dosing location to form first web portions, filling each of the first web portions with a filling material to form filled first web portions, and conveying the filled first web portions to a second receiving location.

In at least one example embodiment, the method further includes transferring a second material to the second receiving location, the second material including a second elastic layer and a second support layer, and removing a portion of the second support layer to form a second web.

In at least one example embodiment, the method further includes aligning the second web with the first web, and sealing the second web to the first web to form a pouch product.

In at least one example embodiment, the method further includes cutting the pouch product from the first web and the second web.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 14 is a perspective view of a container feed system of the apparatus of FIG. 1 according to at least one example embodiment.

FIGS. 15A, 15B, and 15C are illustration of a first material or a second material for use in the apparatus according to at least one example embodiment.

FIG. 15D is an exploded perspective view of another composite material according to at least one example embodiment.

FIG. 15E is a cross-sectional view of the composite material of FIG. 15D, the composite material having a portion of a support layer removed.

FIG. 25 is a partial view of the apparatus of FIG. 1 showing the second receiving location and the cutting and sealing location according to at least one example embodiment.

DETAILED DESCRIPTION OF EXAMPLE EMBODIMENTS

Figure 1:
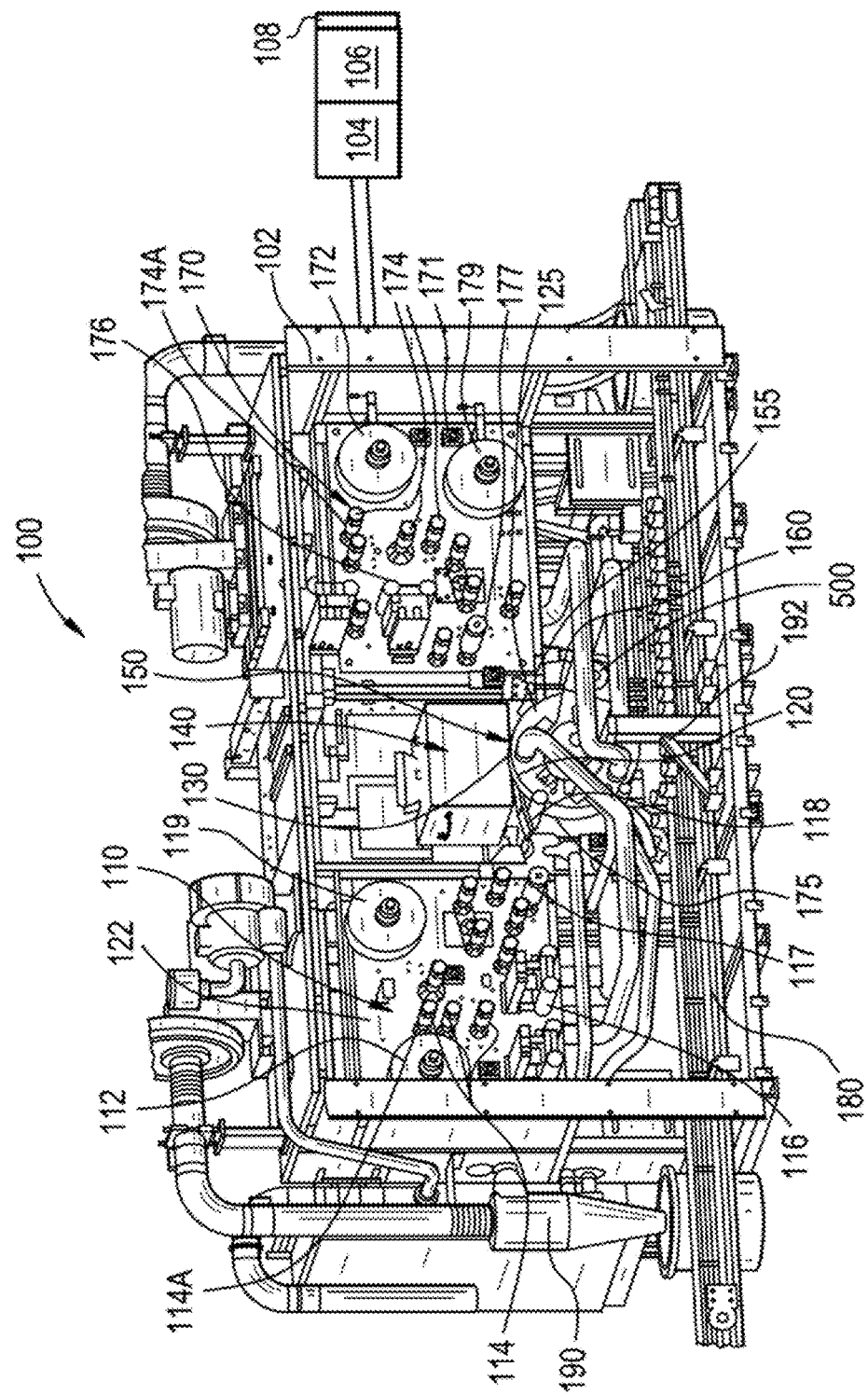
FIG. 1 is a front perspective view of an apparatus for forming a pouch product according to at least one example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, regions, layers and/or sections, these elements, regions, layers, and/or sections should not be limited by these terms. These terms are only used to distinguish one element, region, layer, or section from another region, layer, or section. Thus, a first element, component, region, layer, or section discussed below could be termed a second element, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," specify the presence of stated features, integers, steps, operations, and/or elements, but do not preclude the presence or addition of one or more other features, integers, steps, operations, elements, and/or groups thereof.

Example embodiments are described herein with reference to cross-sectional illustrations that are schematic illustrations of example embodiments. As such, variations from the shapes of the illustrations are to be expected. Thus, example embodiments should not be construed as limited to the shapes of regions illustrated herein but are to include deviations and variations in shapes. When the terms "about" or "substantially" are used in connection with a numerical value, it is intended that the associated numerical value include a tolerance of ±10% around the stated numerical value unless the context indicates otherwise.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

As used herein, "coupled" includes both removably coupled and permanently coupled. When the elastic layer and the support layer are removably coupled to one another, the elastic layer and the support layer can be separated upon the application of sufficient force.

FIG. 1 is a front perspective view of an apparatus for forming a pouch product according to at least one example embodiment.

In at least one example embodiment, as shown in FIG. 1, an apparatus 100 for forming a pouch product includes a housing or frame 102 configured to house at least a portion of the apparatus 100. The apparatus also includes a control interface 104, a control system 106, a first material dispensing station 110, a conveyor system (e.g., a rotatable drum 125) and a doser 140. The apparatus 100 also includes a second material dispensing station 170, a conveyor system 175, a container conveyor system 180, and a waste removal system 190.

In at least one example embodiment, a first receiving location 120, a dosing location 130, a second receiving location 150, and a cutting and sealing location 160 are along the path of the rotatable drum 125. In at least one example embodiment, the rotatable drum 125 may move in a generally clockwise direction. In other example embodiments, the rotatable drum 125 may move in a counterclockwise direction. The first receiving location 120 may be at about an 11 o'clock position along the path, the dosing location 130 may be at about a 12 o'clock position along the path, the second receiving location may be at about a 2 o'clock position along the path, and the cutting and sealing location may be at about a 4 o'clock position along the path. In other example embodiments, where a linear conveyor is used instead of the rotatable drum 125, the first receiving location 120 may be upstream of the dosing location 130, the second receiving location 150, and the cutting and sealing location 160. The dosing location 130 may be between the first receiving location 120 and the second receiving location 150, and the second receiving location 150 may be between the dosing location 130 and the cutting and sealing location 160.

In at least one example embodiment, the first material dispensing station 110 is configured to deliver a first material to the first receiving location 120. The first material dispensing station 110 includes a first roll holder 112 configured to hold a roll of the first material (not shown). The first material, as shown and discussed with respect to FIGS. 15A, 15B, and 15C, generally includes a first elastic layer and a first support layer. The first roll holder 112 may include a generally cylindrical roller on a shaft. The first roll holder 112 is configured to rotate as the first material is pulled therefrom. In other example embodiments, the first roll holder 112 may not rotate, and instead, the first material may be held on a material roller that is placed on the first roll holder 112, such that the material roller may rotate about the first roll holder 112.

In at least one example embodiment, the first material dispensing station 110 also includes a first set of rollers 114 including a first tensioner 114A, a first dewrinkling roller 117, a first stripper plate 118, and a first scrap roll holder 119. The first set of rollers 114 may include one to twenty rollers. The first set of rollers 114 may extend between the first roll holder 112 and/or the first dewrinkling roller 117. The first set of rollers 114 includes any roller over which the first material travels except for the first dewrinkling roller 117. Each roller of the first set of rollers 114 may include a generally cylindrical body mounted on a shaft extending from a first backing board 122. The first backing board 122 may be within and/or supported by the housing or frame 102. Each roller of the first set of rollers 114 is configured to rotate about the respective shaft in either a clockwise or counterclockwise direction so as to aid in transferring the first material from the first roll holder 112 to the first receiving location 120 and aid in transferring a removed portion of the support layer from the first receiving location 120 to the first scrap roll holder 119.

In at least one example embodiment, the first tensioner 114A, is configured to maintain tension along the first material. The first tensioner 114A may be any tensioning roller including tension sensing rollers generally known to a person having ordinary skill in the art. Where a tension sensing roller is used, the tension sensing roller may sense a tension of the first material, and the control system 106 may be configured to receive a signal from the tension sensing roller regarding the tension, compare the tension to a desired tension stored in a memory 108, and adjust the tension applied by the first tensioner 114A if necessary and/or desired.

The first material dispensing station 110 also includes the first dewrinkling roller 117, which is configured to reduce and/or prevent wrinkles in the first material. The first dewrinkling roller 117 may have a bowed surface configured to remove any wrinkles from the first material as the first material passes over the first dewrinkling roller 117. The first dewrinkling roller 117 may be adjacent the first receiving location 120.

In at least one example embodiment, the rollers of the first material dispensing station 110 are arranged as shown in FIG. 1. However, in other example embodiments, the arrangement of the rollers may vary as required based on the location of the first receiving location 120 with respect to the first material dispensing station 110.

In at least one example embodiment, the first stripper plate 118 is adjacent the first receiving location 120. The first stripper plate 118 is configured to remove at least a portion of the first support layer from the first elastic layer of the first material at the first receiving location 120 as discussed in greater detail with respect to FIGS. 16-29. The removed portion or portions of the support layer are rolled onto the first scrap roll holder 119.

In at least one example embodiment, the dosing location 130 is along the path of the rotatable drum 125. The doser 140 is positioned at or adjacent the dosing location 130 and is configured to deliver a desired (or, alternatively predetermined) portion of a filler material (also referred to as a portioned instance of material) at the dosing location 130. The doser 140 may be moveable with respect to the dosing location 130 so as to allow for maintenance of the rotatable drum 125 and/or other portions of the apparatus 100.

In at least one example embodiment, the filler material may include plant material, such as tobacco. For example, the tobacco may include moist smokeless tobacco, which may have a relatively high moisture content.

In at least one example embodiment, the doser 140 may be any suitable doser, such as the doser described in U.S. application Ser. No. 15/975,087 filed May 9, 2018 or U.S. application Ser. No. 16/275,927 filed Feb. 14, 2019, the entire contents of each of which are incorporated herein by reference thereto. In other example embodiments, the doser 140 may be the doser described in co-ending U.S. application Ser. No. 16/382,736 titled "DOSER ASSEMBLIES, APPARATUSES INCLUDING A DOSER ASSEMBLY, AND/OR METHODS OF MAKING THE SAME," filed concurrently herewith, the entire contents of which is incorporated herein by reference. Any other suitable dosers may be used.

In at least one example embodiment, the apparatus 100 includes the second material dispensing station 170, which is configured to transfer a second material to the second receiving location 150. The second receiving location 150 may be between the dosing location 130 and the cutting and sealing location 160. The second material may be the same as or substantially the same as the first material, and is discussed in detail with respect to FIGS. 15A-15C. In other example embodiments, the second material may be different than or substantially different than the first material.

In at least one example embodiment, the second material dispensing station 170 includes a second backing board 171 and a second roll holder 172 configured to hold a roll of the second material. The second roll holder 172 may include a generally cylindrical roller on a shaft. The second roll holder 172 is configured to rotate as the second material is pulled therefrom. In other example embodiments, the second roll holder 172 may not rotate, and instead, the second material may be held on a material roller that is placed on the second roll holder 172, such that the material roller may rotate about the second roll holder 172. The second roll holder 172 may be mounted on the second backing board 171. In some example embodiments, the second roll holder 172 may be removably mounted.

In at least one example embodiment, the second material dispensing station 170 also includes a second set of rollers 174 including a second tensioner 174A, a second dewrinkling roller 177, the second stripper plate 155, and the second scrap roll holder 179. The second material runs through the second set of rollers 174, and over the second tensioner 174A, which is configured to maintain tension along the second material. The second set of rollers 174 may include one to ten rollers, which may be between the second roll holder 172 the second dewrinkling roller 177, the second stripper plate 155, and the second scrap roll holder 179.

In at least one example embodiment, the second tensioner 174A is generally the same as the first tensioner 114A. In other example embodiments, the second tensioner 174A is different than the first tensioner 114A.

In at least one example embodiment, the second dewrinkling roller 177 is configured to reduce and/or prevent wrinkles in the second material as the second material passes over the second dewrinkling roller 177. The second dewrinkling roller 177 may be the same as the first dewrinkling roller 117. The second dewrinkling roller 177 may have a bowed surface configured to remove any wrinkles from the second material as the second material passes thereover.

In at least one example embodiment, the rollers of the second material dispensing station 170 are arranged as shown in FIG. 1. However, in other example embodiments, the arrangement of the rollers may vary as required based on the location of the second receiving location 150 with respect to the second material dispensing station 170.

In at least one example embodiment, the second material dispensing station 170 also includes a second stripper plate 155. The second stripper plate 155 may be adjacent the second receiving location 150.

In at least one example embodiment, the apparatus 100 includes a sealer and cutter, such as a heat knife assembly 500 adjacent the cutting and sealing location 160. The heat knife assembly 500 is configured to seal a portion of the first elastic layer to a portion of the second elastic layer around the filler material, and then cut around the seal to form a pouch product as discussed with respect to FIGS. 16-29. In at least one example embodiment, the seal (not shown) is formed by heat sealing. In other example embodiments, a seal may be formed using an adhesive, such as a food-grade adhesive, or formed by ultrasonic welding and/or laser.

In at least one example embodiment, the apparatus 100 includes a container conveyor system 180 configured to deliver a plurality of containers to an ejection location 192 along the path of the rotatable drum 125. The container conveyor system 180 runs below the rotatable drum 125 as shown in FIG. 1. The container conveyor system 180 may be any suitable container conveyor system generally known to a person having ordinary skill in the art.

In at least one example embodiment, the ejection location 192 may be at about a 6 o'clock position along the path of the rotatable drum 125. At the ejection location 192, pouch products are ejected from the rotatable drum 125 after formation, and placed into the plurality of containers moving along the container conveyor system 180.

In at least one example embodiment, the apparatus 100 also includes a waste removal system 190, which may include a vacuum configured to remove excess portions of the first material and the second material that are not part of the pouch product, and/or any other dust and/or waste produced during manufacture of the pouch products.

In at least one example embodiment, the control interface 104 may be configured to receive control commands, including commands provided by an operator based on manual interaction with the control interface 104. The control interface 104 may be a manual interface, including a touchscreen display interface, a button interface, a mouse interface, a keyboard interface, some combination thereof, or the like. Control commands received at the control interface 104 may be forwarded to the control system 106, which may include a processor, and the control system 106 may execute one or more programs of instruction, for example to adjust operation of one or more portions of the apparatus 100, based on the control commands.

In some example embodiments, the control system 106 (e.g., the processor executing a program of instructions) may include a memory 108. The memory 108 may be configured to store information and look-up tables indicating a desired tension of the first and second material, a desired weight of filled containers, etc. The control system 106 may be configured to determine when a container has been filled based on a weight of the container and/or determine a tension of the first and second materials.

In at least one example embodiment, the control system 106 is configured to control a supply of a first material and a second material, control a tension of the first material and/or the second material, control a speed of rotation of the rollers and/or the rotatable drum 125, etc.

In at least one example embodiment, the apparatus may include a weight sensor (e.g., a weight scale) (not shown) configured to generate data signals associated with the weight of a formed pouch product. The control system 106 may process received sensor data to determine a weight of the formed pouch products and adjust the doser 140 or other portions of the apparatus 100 to ensure uniformity of formed pouch products.

The control system 106 according to one or more example embodiments may be implemented using hardware, or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Software may include a computer program, program code, instructions, or some combination thereof, for independently or collectively instructing or configuring a hardware device to operate as desired. The computer program and/or program code may include program or computer-readable instructions, software modules, data files, data structures, and/or the like, capable of being implemented by one or more hardware devices, such as one or more of the hardware devices mentioned above. Examples of program code include both machine code produced by a compiler and higher level program code that is executed using an interpreter.

Software and/or data may be embodied permanently or temporarily in any type of machine, element, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media or memory 108 discussed herein.

Figure 2:
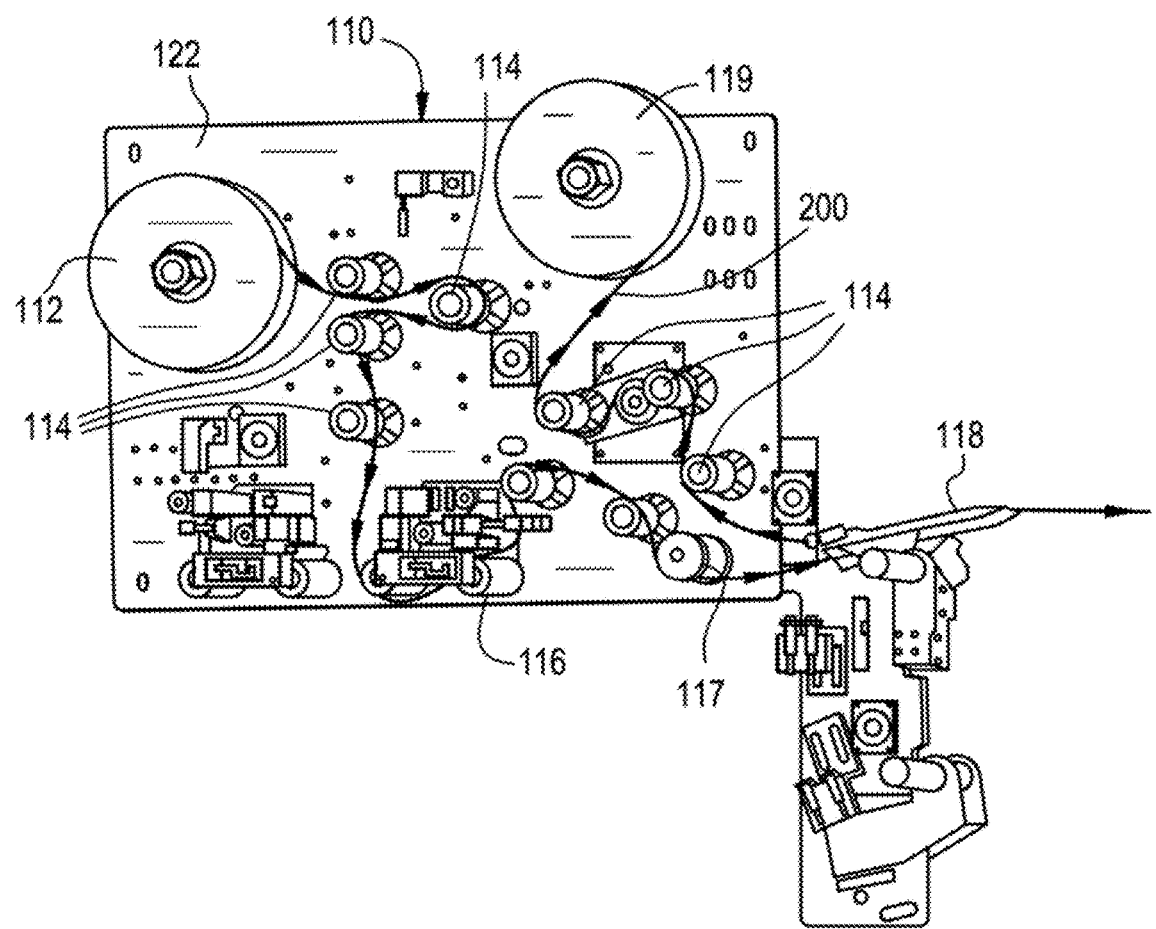
FIG. 2 is an illustration of a first material dispensing station of the apparatus of FIG. 1 according to at least one example embodiment.

FIG. 2 is an illustration of a first material dispensing station of the apparatus of FIG. 1 according to at least one example embodiment.

In at least one example embodiment, as shown in FIG. 2, the first material dispensing station 110 may include the first roll holder 112, the first set of rollers 114 including the first tensioner 114A, the first dewrinkling roller 117, the first stripper plate 118, and the first scrap roll holder 119 on the first backing board 122. A path of travel of the first material through the first material dispensing station 110 is illustrated by line 200. As shown, the first material may extend from the first roll holder 112 and through a portion of the first set of rollers 114 including the first tensioner 114A, the first dewrinkling roller 117, and to the first stripper plate 118 as shown. The apparatus may also include a first tracking controller 116 configured to maintain the first material 1500 on track and at a desired tension.

In at least one example embodiment, the first stripper plate 118 is a stationary plate that abuts the rotatable drum 125 (shown in FIG. 1) at the first receiving location 120.

Figure 3:
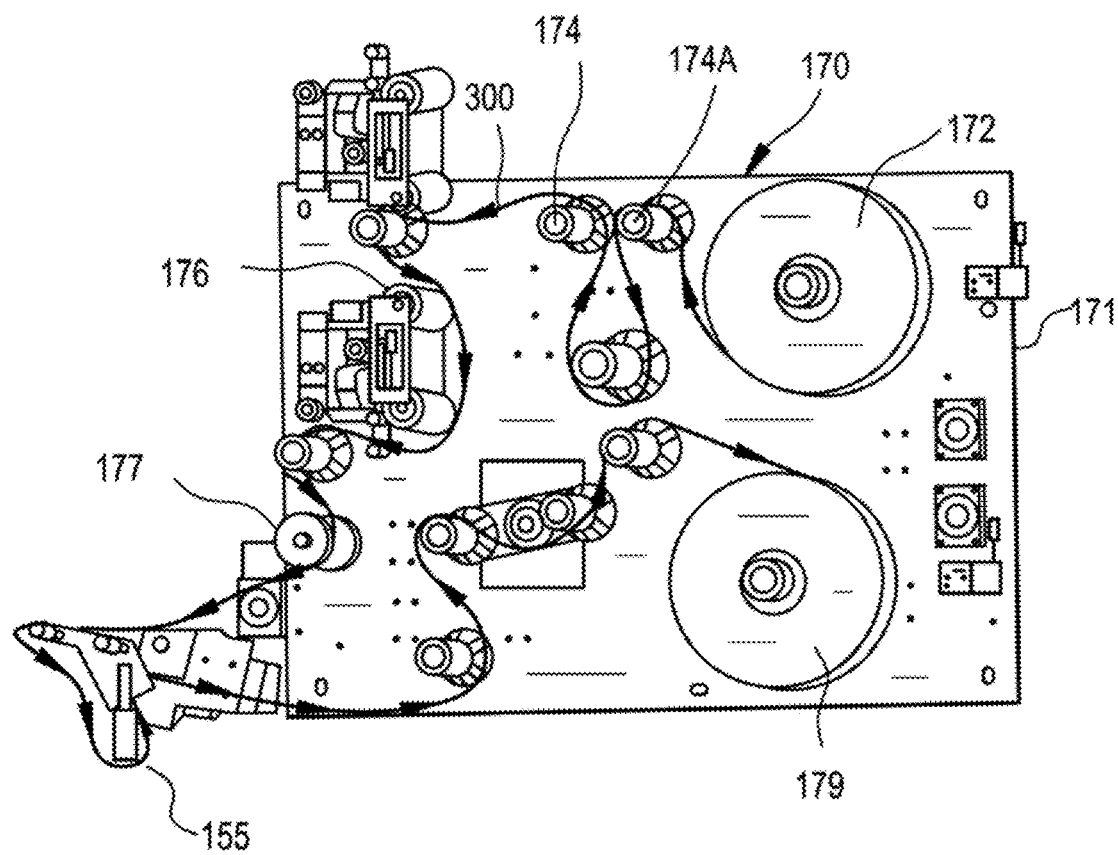
FIG. 3 is an illustration of a second material dispensing station of the apparatus of FIG. 1 according to at least one example embodiment.

FIG. 3 is an illustration of a second material dispensing station of the apparatus of FIG. 1 according to at least one example embodiment.

In at least one example embodiment, the second material dispensing station 170 is arranged generally the same as the first material dispensing station 110 shown in FIG. 2. The second material dispensing station 170 includes the second roll holder 172, the second set of rollers 174 including the second tensioner 174A, the second dewrinkling roller 177, the second stripper plate 155, and the second scrap roll holder 179 on a second backing board 171. The second material may extend from the second roll holder 172 and through the second set of rollers 174, the second tensioner 174A, the second dewrinkling roller 177, and to the second stripper plate 155 as shown. A path of travel of the first material through the second material dispensing station 170 is illustrated by line 300. Further, the second tensioner 174A may include a second tracking controller 176 configured to keep the second material on track and maintain tension of the second material as the second material passes through the second material dispensing station 170. In at least one example embodiment, the second tracking controller 176 is the same as the first tracking controller 116.

In at least one example embodiment, the second stripper plate 155 is a stationary plate that abuts the rotatable drum 125 (shown in FIG. 1) at the second receiving location 150.

Figure 4:
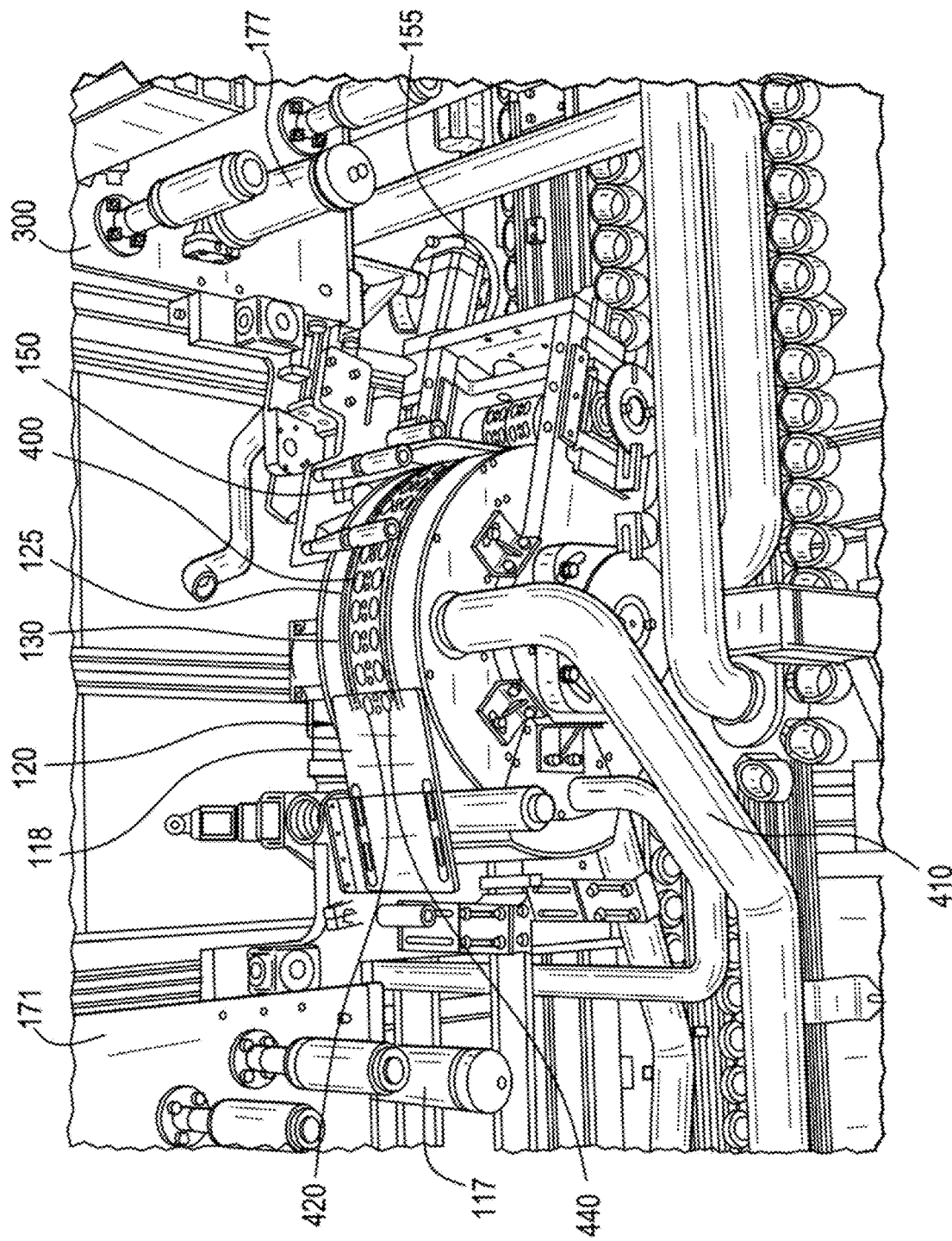
FIG. 4 is a perspective view of the apparatus of FIG. 1 according to at least one example embodiment.

FIG. 4 is a perspective view of a first receiving location, a dosing location, and a second receiving location of the apparatus of FIG. 1 according to at least one example embodiment.

In at least one example embodiment, as shown in FIG. 4, the first receiving location 120, the dosing location 130, and the second receiving location 150 are positioned along the rotatable drum 125.

In at least one example embodiment, as shown in FIG. 4, the first stripper plate 118 abuts the rotatable drum 125 at the first receiving location 120.

In at least one example embodiment, the rotatable drum 125 includes two lanes 420, 440 of divots 400 along a surface thereof. Each of the divots 400 in each of the lanes 420, 440 is configured to receive the first elastic layer and remaining portion of the first supporting layer after the portion of the first support layer is removed therefrom. At the dosing location 130, a filler material is inserted into each divot by the doser 140 (shown in FIG. 1). After dosing, the rotatable drum 125 moves the filled first elastic layer to the second receiving location 150 as discussed in detail with respect to FIGS. 16-29. The second stripper plate 155 is adjacent the second receiving location 150.

In at least one example embodiment, the apparatus 100 further includes a vacuum source 410 configured to communicate a vacuum to an inner portion of the rotatable drum 125 between about the first receiving location 120 and the second receiving location 150. The rotatable drum 125 may include baffles (not shown) therein that generally align with the location of the first receiving location 120 and the second receiving location 150 so as to focus the vacuum on the area between the first receiving location 120 and the second receiving location 150. A full description of the operation of the apparatus 100 accompanies the description of FIGS. 16-29.

Figure 5:
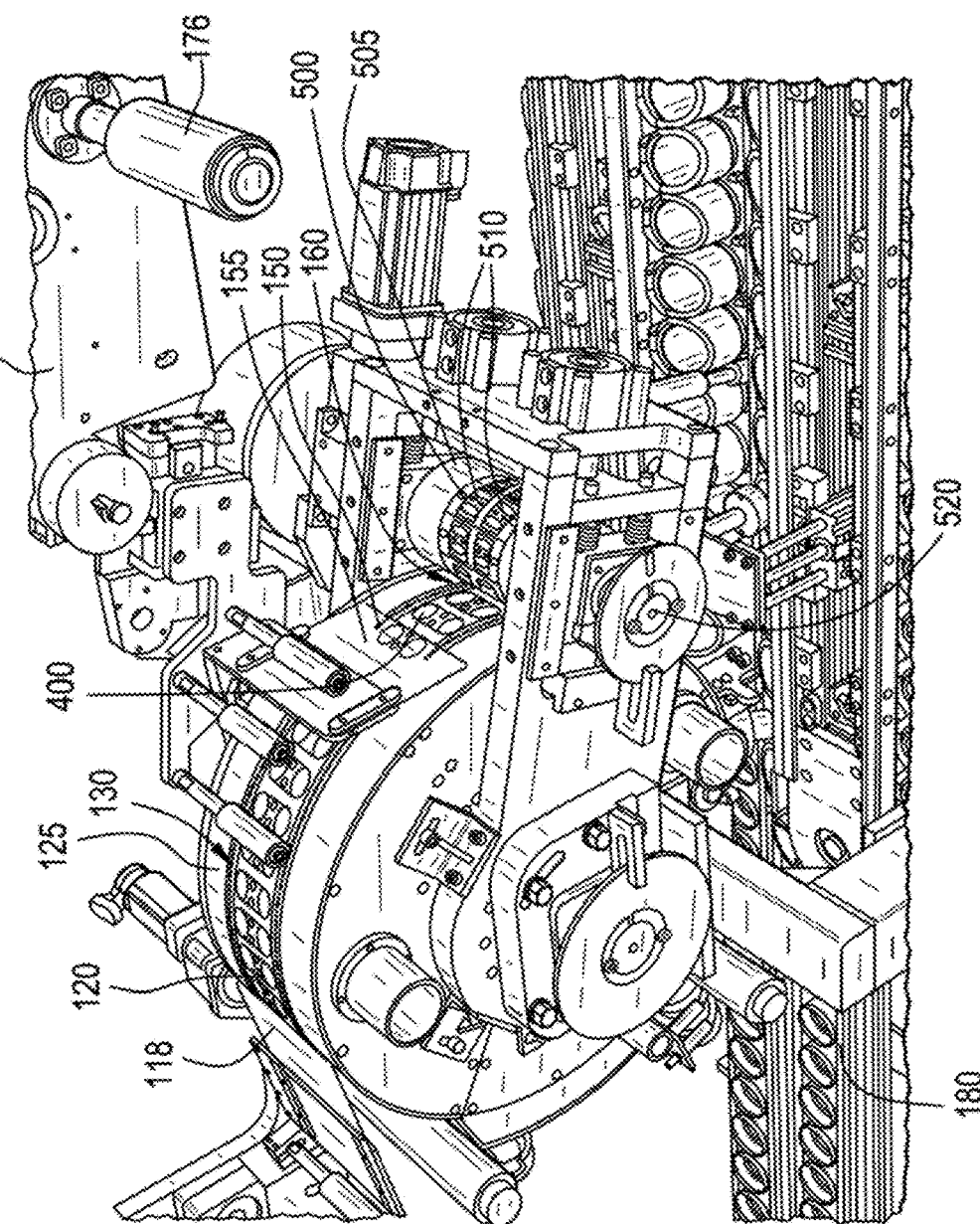
FIG. 5 is a partial view of a first receiving location, a dosing location, and a second receiving location of the apparatus of FIG. 1 according to at least one example embodiment.

FIG. 5 is a partial view of a first receiving location, a dosing location, and a second receiving location along a path of a rotatable drum of the apparatus of FIG. 1 according to at least one example embodiment.

In at least one example embodiment, as shown in FIG. 5, the cutting and sealing location 160 is along the path of the rotatable drum 125. The cutting and sealing location 160 is adjacent the second receiving location 150.

In at least one example embodiment, the heat knife assembly 500 is adjacent the cutting and sealing location 160. The heat knife assembly 500 includes a heat knife assembly roller 505 and a plurality of heat knives 510. The heat knife assembly roller 505 is configured to rotate on a shaft 520 extending through the heat knife assembly roller 505. The heat knife assembly roller 505 rotates in a direction opposite to the direction in which the rotatable drum 125 rotates. The heat knife assembly roller 505 may be driven by a motor (not shown). A speed of rotation of the heat knife assembly roller 505 may be greater than a speed of rotation of the rotatable drum 125. As the heat knife assembly roller 505 and the rotatable drum 125 rotate, the divots 400 and respective ones of the plurality of heat knives 510 align. A full description of the operation of the heat knife assembly 500 is further described with respect to FIG. 24.

In at least one example embodiment, each of the plurality of heat knives 510 is sized and configured to fit around a respective one of the divots 400 along the rotatable drum 125. Thus, the size and shape of each of the heat knives 510 is about the same as the size and shape of each of the divots. For example, each divot 400 and each heat knife 510 may be generally oval in shape, and the heat knife 510 may be slightly larger than the respective divot 400. The speed of rotation of the heat knife assembly roller 505 may be controlled by the control system 106, such that respective ones of the plurality of heat knives 510 match up to and/or substantially align with respective divots 400 along the rotatable drum 125.

In at least one example embodiment, the plurality of heat knives 510 include at least a portion that is formed of metal. A heater or rotary engine(not shown), may be in the heat knife assembly roller 505 and configured to heat the plurality of heat knives 510 to a temperature sufficient to heat seal a portion of the first elastic layer to a portion of the second elastic layer. The temperature may range from about 100° C. to about 500° C. depending on the material used to form the first and second elastic layers. For example, the heat knives may be heated to a temperature of about 400° C. The chosen temperature is sufficient to melt the first and second elastic layers thereby at least partially cutting through the first and second elastic layers as the seal is formed.

Figure 6:
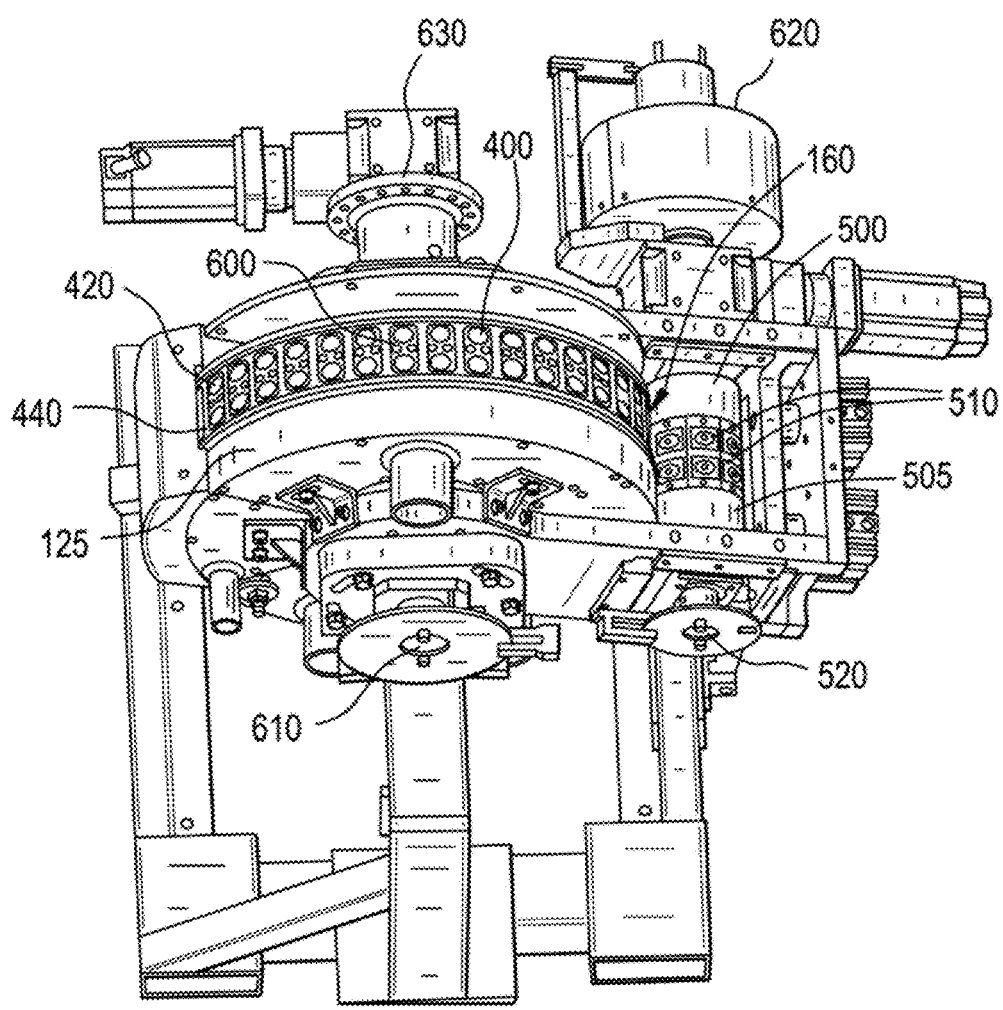
FIG. 6 is a top perspective view of a conveyor system of the apparatus of FIG. 1 according to at least one example embodiment.

FIG. 6 is a top perspective view of a conveyor system of the apparatus of FIG. 1 according to at least one example embodiment.

In at least one example embodiment, as shown in FIG. 6, the rotatable drum 125 rotates on a shaft 610. Further, the rotatable drum 125 includes a plurality of plates 600. The plurality of plates 600 are spaced apart along an outer surface of the rotatable drum 125. The plurality of plates 600 may be substantially uniformly spaced apart. However, in other example embodiments, the plurality of plates 600 may not be uniformly spaced apart. Each of the plurality of plates defines two divots 400 therein so as to form the two lanes 420, 440 along the rotatable drum 125. The apparatus is configured to form about 100 pouch products per minute, but the number of pouch products formed may vary based on a speed of rotation of the rotatable drum 125, the number of plates 600, and the number of lanes. For example, the number of lanes may be increased or decreased to alter the number of pouch products formed per minute. Each of the plurality of plates 600 may include three or more divots 400, such that additional lanes are formed along the rotatable drum 125. Thus, a number of pouch products produced may be increased by increasing a number of lanes along the rotatable drum 125.

As shown in FIG. 6, a motor 620 is configured to drive the shaft 520 on which the heat knife assembly roller 505 rotates. A second motor 630 is configured to drive the shaft 610 on which the rotatable drum 125 rotates.

Figure 7A:
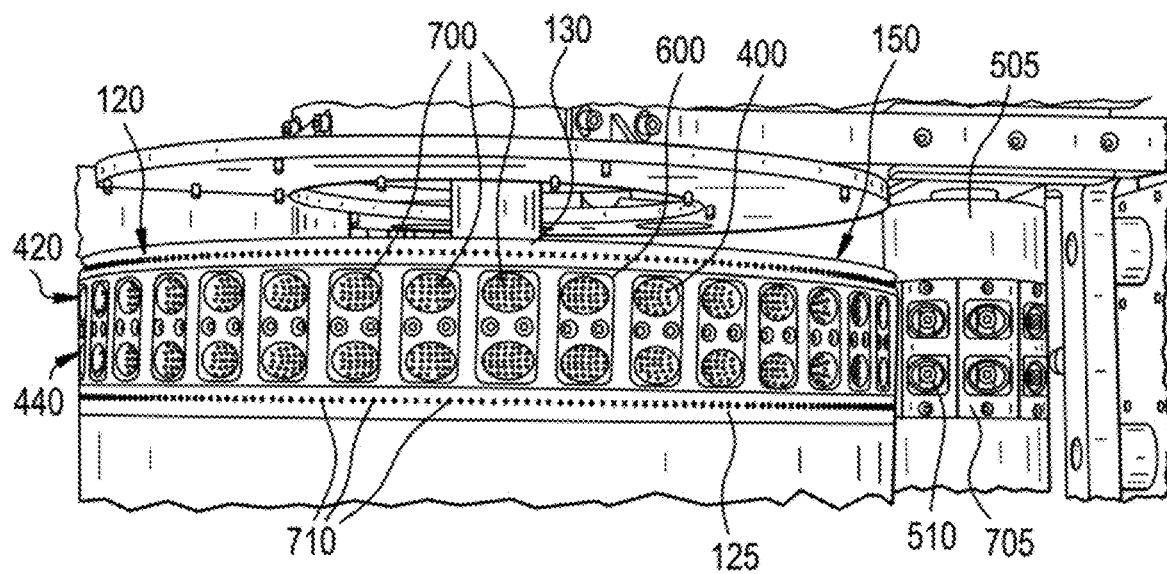
FIG. 7A is a top view of the apparatus of FIG. 1 according to at least one example embodiment.

FIG. 7A is a top view of a conveyor system and a cutting and sealing system of the apparatus of FIG. 1 according to at least one example embodiment.

In at least one example embodiment, as shown in FIG. 7A, the plurality of plates 600 are attached to a top surface extending along the rotatable drum 125. Each of the plurality of plates 600 includes two divots 400. As shown, the divots 400 includes a plurality of air inlets 700 through which vacuum is communicated so as to pull the first elastic layer into each of the divots 400 as the rotatable drum 125 rotates from the first receiving location 120 to the second receiving location 150 as discussed in further detail with respect to FIGS. 16-29. Further, as shown, each of the divots 400 may be generally oval in shape. In other example embodiments, the divots 400 may be round, square, polygonal, or any other shape.

In at least one example embodiment, the heat knife assembly roller 505 includes a plurality of plates 705 including at least one heat knife 510 thereon. In at least one example embodiment, the number of heat knives 510 per plate is the same as the number of divots 400 per plate 600 in the rotatable drum 125.

In at least one example embodiment, each of the heat knives 510 is generally oval in shape. In other example embodiments, the heat knives 510 may be round, square, polygonal, or any other shape. A shape of the heat knives may be generally the same as a shape of the divots 400. In other example embodiments, the shape of the heat knives 510 is different than the shape of the divots 400.

In at least one example embodiment, the rotatable drum 125 may include a plurality of grippers 710. The grippers 710 may be air inlets through which vacuum may be communicated. In other example embodiments, the grippers 710 may be raised bumps that are configured to aid in retaining the first material in which the portion of the support layer remains along the plurality of grippers 710 as the rotatable drum 125 rotates.

Figure 7B:
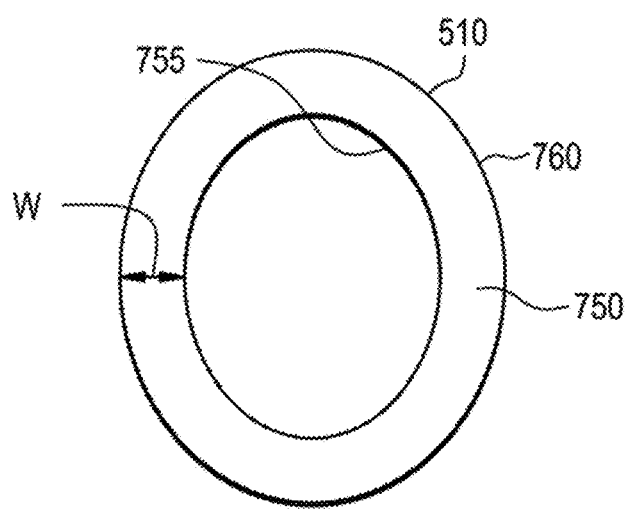
FIG. 7B is a top view of a heat knife according to at least one example embodiment.

FIG. 7B is a top view of a heat knife according to at least one example embodiment.

In at least one example embodiment, each of the heat knives 510 has a generally flat raised portion 750 between an inner diameter 755 and an outer diameter 760 of each heat knife 510. The flat raised portion 750 is configured to contact the second elastic layer as the seal is formed. The flat raised portion 750 may be about 0.1 millimeter (mm) to about 5.0 mm in width "W" (e.g., about 0.2 mm to about 4.5 mm, about 0.5 mm to about 4.0 mm, about 1.0 mm to about 3.5 mm, about 1.5 mm to about 3.0 mm, or about 2.0 mm to about 2.5 mm). The width "W" of the raised portion 750 may be generally about the same as a resulting seal formed between the first and second elastic layers. Further, a temperature used to form the seal may be decreased when the width "W" is increased.

Figure 8:
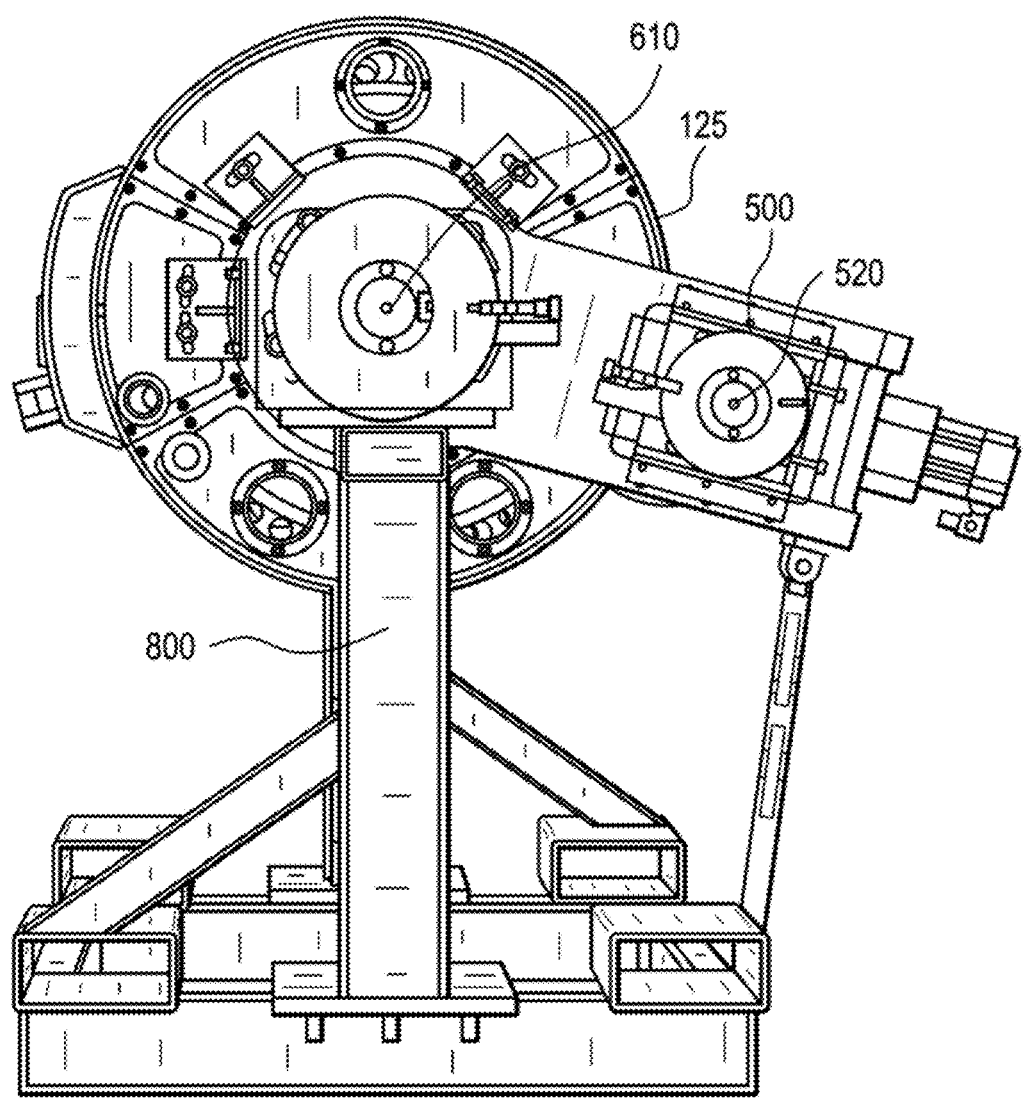
FIG. 8 is a side view of the conveyor system of the apparatus of FIG. 1 according to at least one example embodiment.

FIG. 8 is a side view of the conveyor system of the apparatus of FIG. 1 according to at least one example embodiment.

In at least one example embodiment, as shown in FIG. 8, the rotatable drum 125 rotates about the shaft 610, while the heat knife assembly roller 505 of the heat knife assembly 500 rotates about the shaft 520.

In at least one example embodiment, the rotatable drum 125 may be supported on a stand 800.

In at least one example embodiment, the heat knife assembly 500 may be positioned at about the 4 o'clock position along the path of the rotatable drum 125. In other example embodiments, the heat knife assembly 500 may be positioned adjacent another location along the rotatable drum 125.

Figure 9:
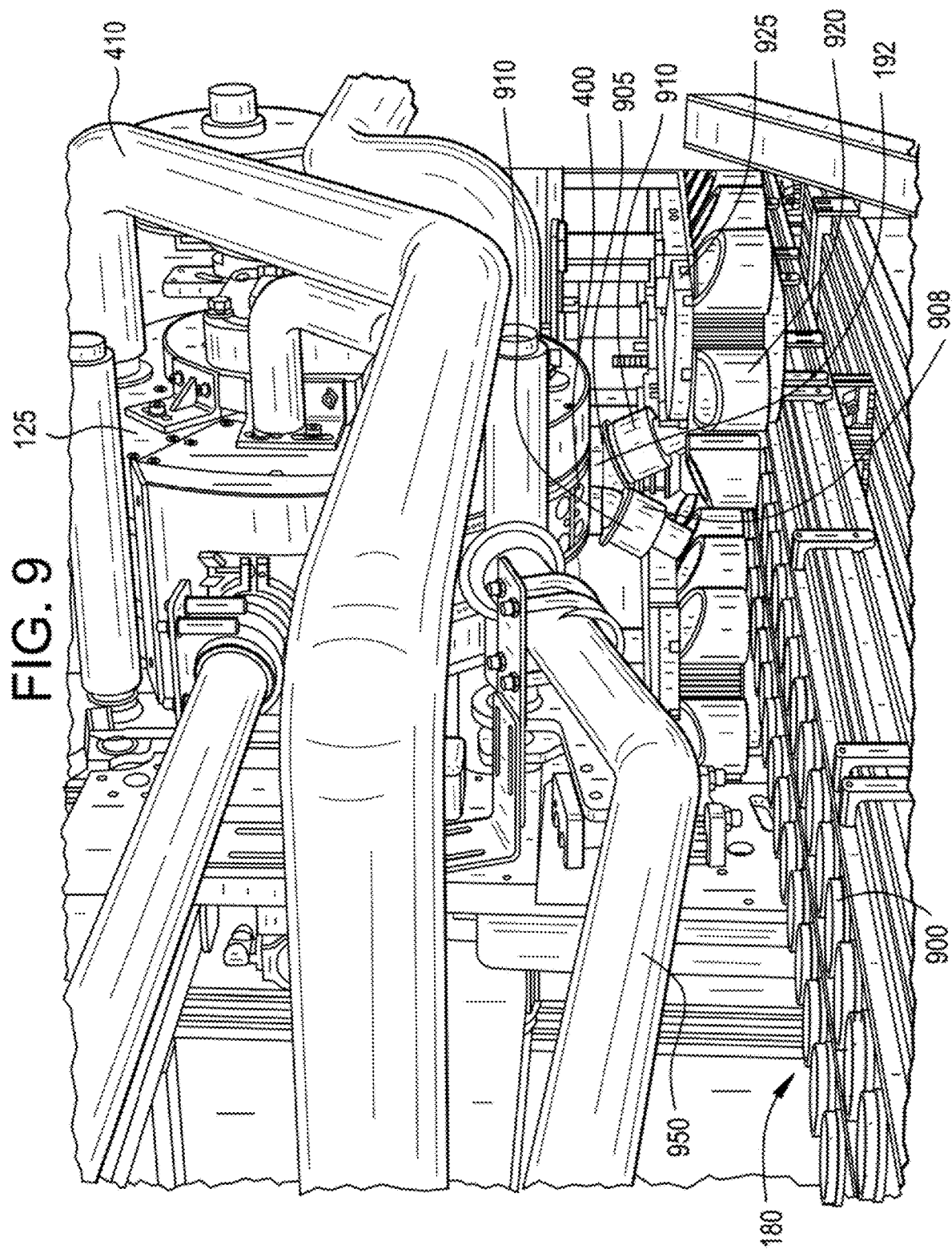
FIG. 9 is a bottom perspective view of a portion of the apparatus of FIG. 1 according to at least one example embodiment.

FIG. 9 is a bottom perspective view of a portion of the apparatus of FIG. 1 according to at least one example embodiment.

In at least one example embodiment, as shown in FIG. 9, the apparatus 100 further includes an ejector assembly 905 including at least one ejector 910 per lane of the rotatable drum 125. The ejector assembly 905 is located at or adjacent to the ejection location 192. The ejector assembly 905 includes an ejector housing 908 defining an opening that is configured to catch the formed pouch products at about the 6 o'clock position along the rotatable drum 125. Two ejectors 910 extend from a bottom of the ejector housing 908, such that one pouch product per lane is delivered to each of the two ejectors 910 at a time. Each of the ejectors 910 is a generally cylindrical tube that is configured to funnel each pouch product to a product container 900 as the container travels along the container conveyor system 180 and underneath the ejectors 910 and rotatable drum 125. The ejector housing 908 may include an edge (not shown) that substantially abuts a bottom portion of the rotatable drum 125 so as to scrape and/or provide force to remove the pouch products from any surrounding material as the rotatable drum 125 rotates since the pouch products may not be fully cut from the waste materials upon arrival at the ejection location 192.

The device may further includes funnels 920 along carousels 925. The funnels 920 are configured to align and move with one of the containers 900, which then align with one of the ejectors 910. The funnels 920 aid in placing pouch products in the container 900. The container conveyor system 180 may be similar to the conveyor system described in application Ser. No. 13/967,181 to James D. Evans, filed Aug. 14, 2013, the entire content of which is incorporated herein by reference thereto.

Figure 10:
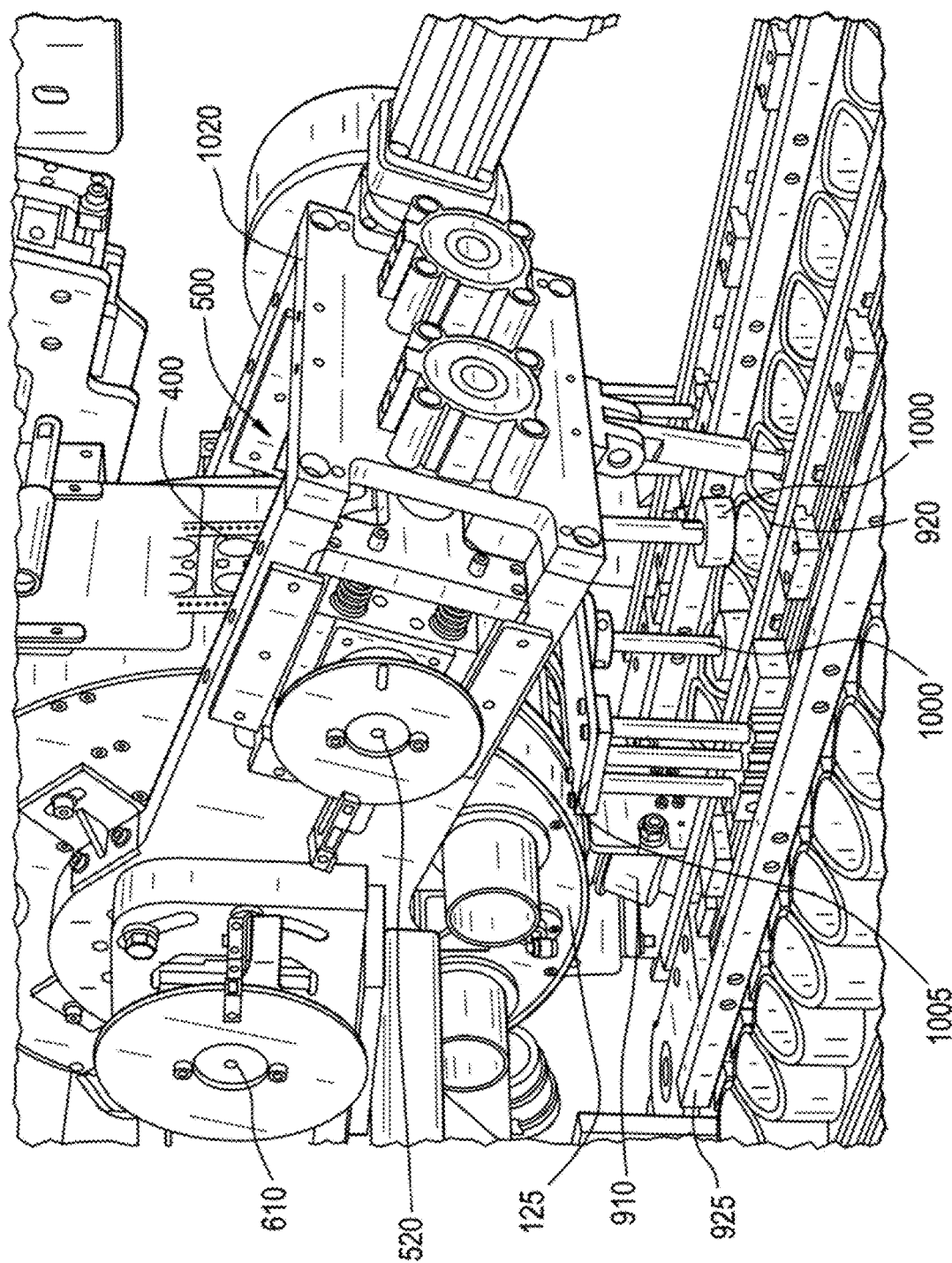
FIG. 10 is a second bottom perspective view of a portion of the apparatus of FIG. 1 according to at least one example embodiment.

FIG. 10 is a second bottom perspective view of a portion of the apparatus of FIG. 1 according to at least one example embodiment.

In at least one example embodiment, as shown in FIG. 10, the apparatus 100 further includes at least one tamper 1000 per lane of the rotatable drum 125. The at least one tamper 1000 is attached to a tamper housing 1005 that raises and lowers with relation to the container conveyor system 180, such that each tamper 1000 is simultaneously lowered through a respective one of the funnels 920 and into the container aligned with the respective one of the funnels 920 in order tamp the pouch products therein prior to placing a lid on the container. Once tamped, the at least one tamper 1000 is raised back to a rest position until the containers are moved forward and another container and aligned funnel are beneath the tamper 1000. Any suitable mechanism to raise and lower the at least one tamper 1000 may be used.

FIG. 10 also shows that in at least one example embodiment, the heat knife assembly 500 may be mounted on a heat knife assembly housing 1020. The heat knife assembly 500 may be moveable in relation to the rotatable drum 125 so as to adjust a distance between the heat knife assembly roller 505 (not shown) and the rotatable drum 125. The heat knife assembly housing 1020 may include grooves on opposing sides. The shaft 520 on which the heat knife assembly roller 505 is mounted may slide within the grooves to move the heat knife assembly roller 505 closer to or further away from the rotatable drum 125.

Figure 11:
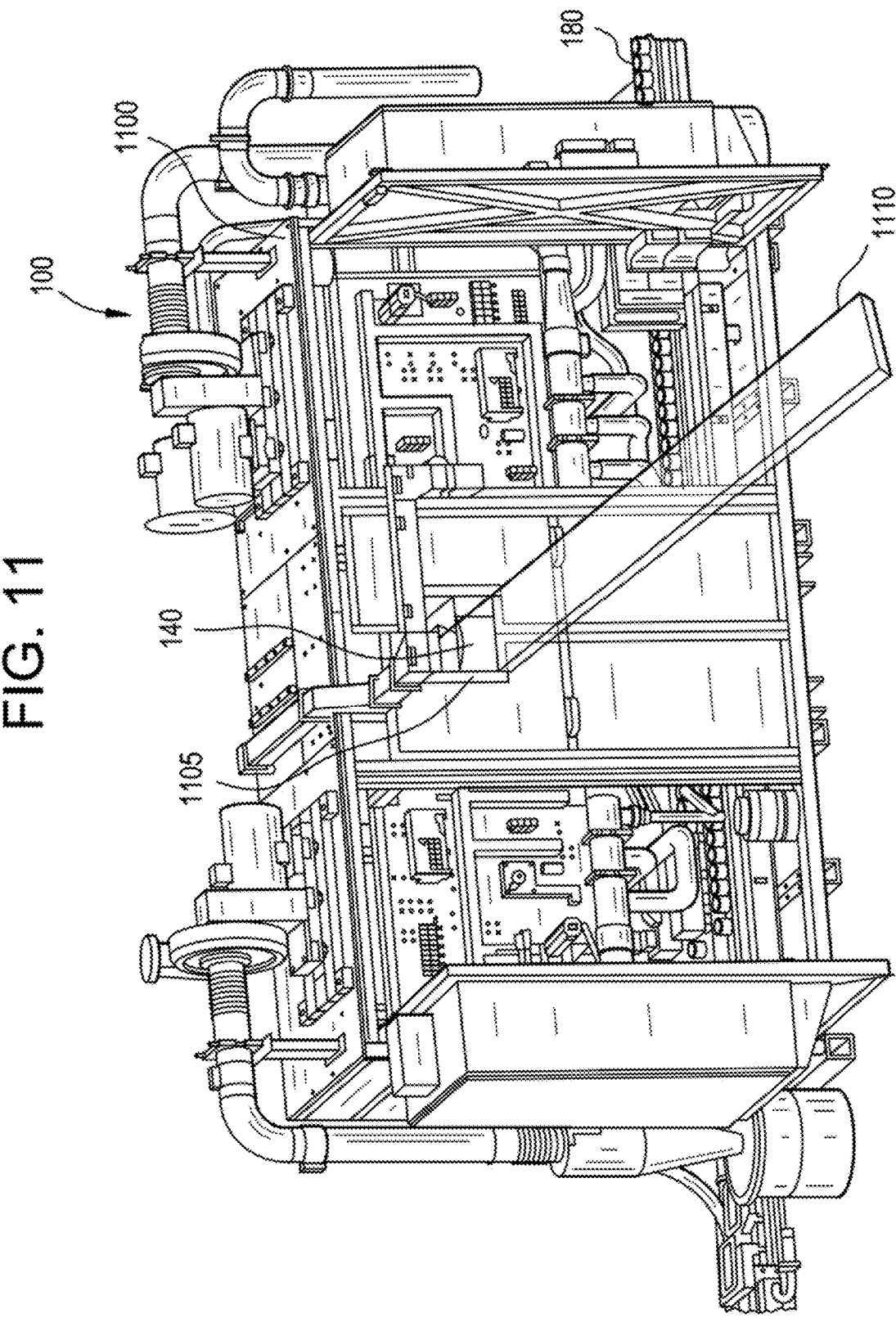
FIG. 11 is a rear perspective view of an apparatus for forming a pouch product according to at least one example embodiment.

FIG. 11 is a rear perspective view of an apparatus for forming a pouch product according to at least one example embodiment.

In at least one example embodiment, as shown in FIG. 11, the apparatus 100 may include the housing or frame 102. Further, the apparatus 100 may include a filler material conveyor system 1110 along which the filler material travels before reaching the doser 140. An end of the filler material conveyor system 1110 may at least partially extend through a window 1105 in the frame 102, such that the filter material falls off the end of the filler material conveyor system 1110 and into a hopper of the doser 140.

In at least one example embodiment, the filler material conveyor system 1110 may be retractable to allow for easy access to the doser 140 for maintenance, etc. Further, the filler material conveyor system 1110 may include sensors configured to sense a level of filler material on the conveyor as is generally known to a person having ordinary skill in the art. The control system 106 may receive a signal from the sensors and determine a level of filler material and adjust the level of filter material based on requirements of the doser 140.

Figure 12:
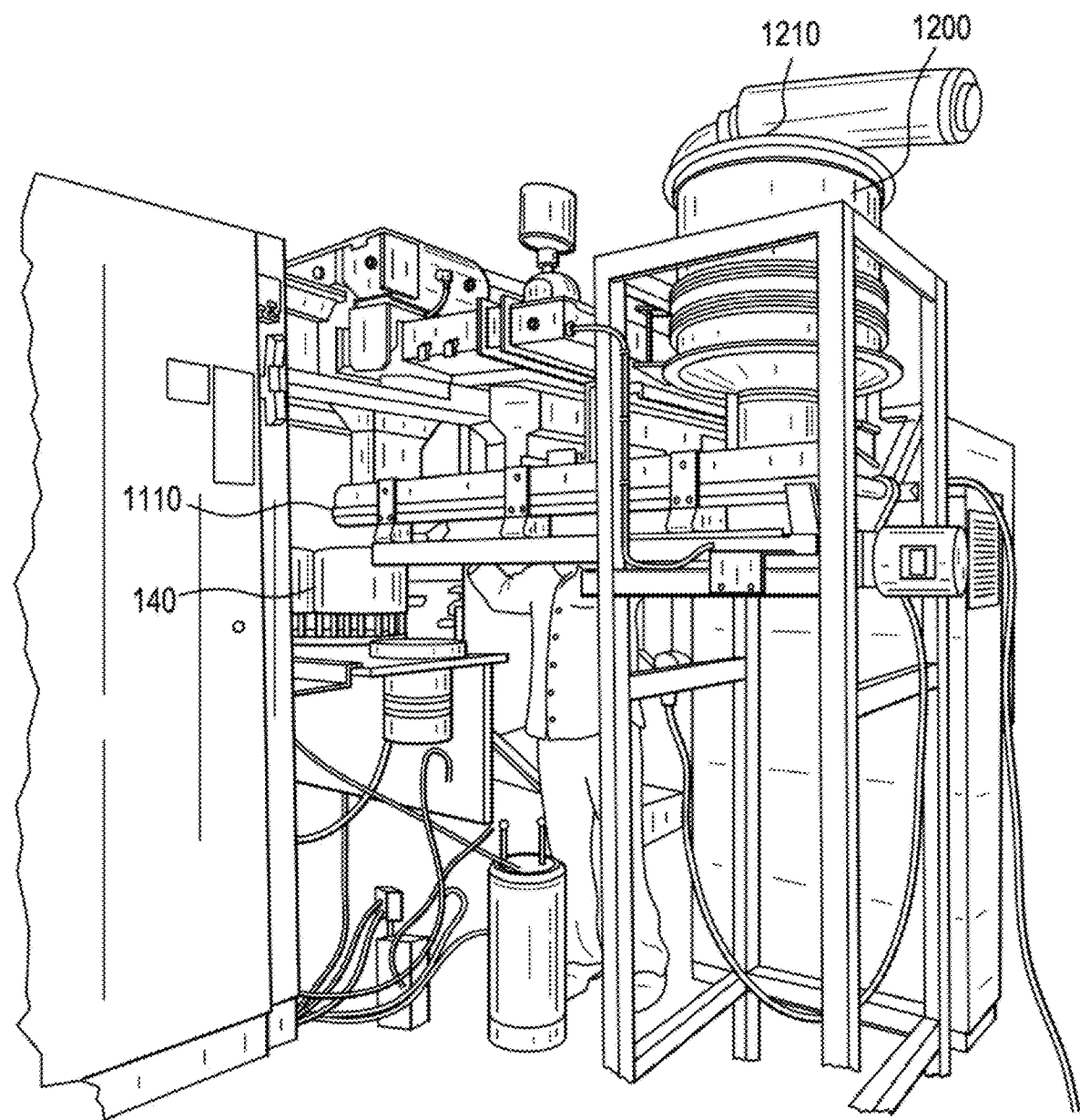
FIG. 12 is a partial rear perspective view of an apparatus for forming a pouch product including a filler material distribution system according at least one example embodiment.

FIG. 12 is a partial rear perspective view of an apparatus for forming a pouch product including a filler material distribution system according at least one example embodiment.

In at least one example embodiment, as shown in FIG. 12, the apparatus 100 includes a filler material distribution system 1200 including the filler material conveyor system 1110 and a hopper 1210. In at least one example embodiment, the hopper 1210 may include a vibration mechanism used to shake the filler material and consistently deliver the filler material to the filler material conveyor system 1110. In at least one example embodiment, the hopper 1210 may be a vibrating bin, such as a live bottom bin.

Figure 13:
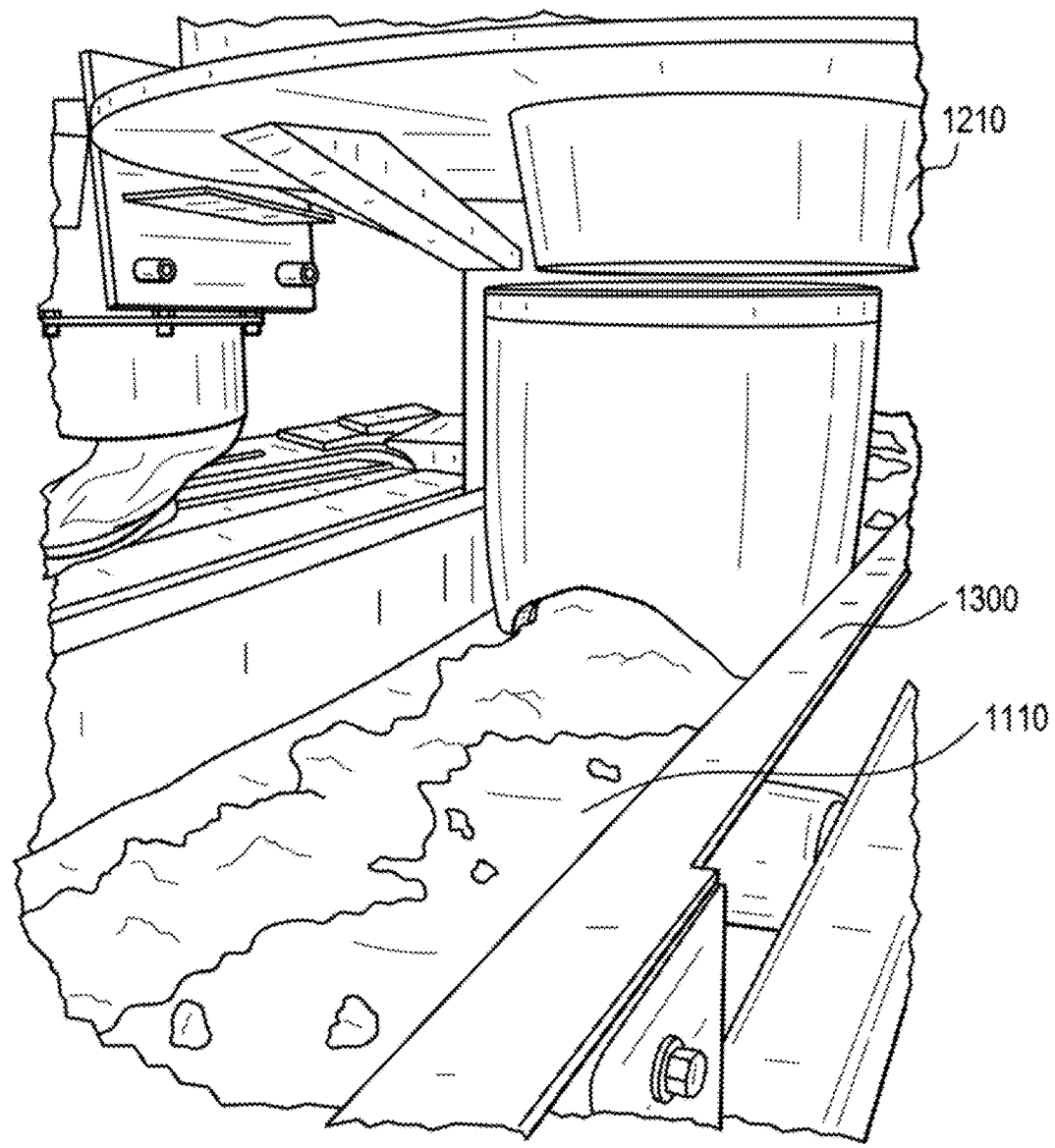
FIG. 13 is an enlarged view of a portion of the filler material distribution system of FIG. 12 according to at least one example embodiment.

FIG. 13 is an enlarged view of a portion of the filler material distribution system of FIG. 12 according to at least one example embodiment.

In at least one example embodiment, as shown in FIG. 13, the hopper 1210 is configured to release the filler material 1300 from a bottom thereof directly onto the filler material conveyor system 1110.

FIG. 14 is a perspective view of a container feed system of the apparatus of FIG. 1 according to at least one example embodiment.

In at least one example embodiment, as shown in FIG. 14, the apparatus 100 includes the container conveyor system 180, which may be any known container conveyor system 180. In at least one example embodiment, the container conveyor system 180 includes a conveyor 1425 including a plurality of spaced apart cleats 1420 fixed on the conveyor 1425. A container infeed system 1430 delivers containers to each space 1440 between adjacent cleats 1420.

In at least one example embodiment, the device also includes the waste removal system 190, which may include a waste vacuum 1410 in communication with the rotatable drum 125 and ejection location 192. The waste vacuum 1410 is configured to collect any dust and/or waste and deliver the dust and/or waste to a waste container 1400.

FIGS. 15A, 15B, and 15C are illustration of the first material and/or the second material for use in the apparatus 100 according to at least one example embodiment.

As shown in FIGS. 15A, 15B, 15C, 15D, and 15E, the first material 1500 comprises a composite material 1510A and the second material 1500' comprises a composite material 1510B. The composite material 1510A is the same as the composite material 1510B. The composite material 1510A, 1510B includes a first or elastic layer 1512 and a second or support layer 1514. In at least one example embodiment, the elastic layer 1512 comprises a sheet of non-woven elastomeric material and the support layer 1514 comprises a sheet of woven material. The elastic layer 1512 may be stacked with the support layer 1514. In at least some example embodiments, the elastic layer 1512 is disposed on top of the support layer 1514 and extends coextensive with the support layer 1514. In at least some other example embodiments, a support layer 1514 may be disposed on top of the elastic layer 1512 (see, e.g., the elastic layer 1541 and the support layer 1542 of FIGS. 15D-15E). At least a portion of the elastic layer 1512 may be coupled to the support layer 1514.

In at least some example embodiments, a first surface 1516 of the elastic layer 1512 may engage a first surface 1518 of the support layer 1514. In at least some example embodiments, the elastic layer 1512 is coupled to the support layer 1514 by physical characteristics of the elastic layer 1512 and the support layer 1514, for example, by adhesive friction. In at least one example embodiment, the elastic layer 1512 comprises polyurethane and the support layer comprises polypropylene.

The support layer 1514 may include a first portion 1520 and a second portion 1522. In at least some example embodiments, the second portion 1522 comprises a pair of second portions 1522, with the first portion 1520 being disposed between the pair of second portions 1522. In at least some example embodiments, the first portion 1520 and each of the pair of second portions 1522 is generally rectangular. The second portions 1522 may have substantially similar shapes and dimensions, and extend substantially parallel to one another. In at least some example embodiments, the support layer 1514 may be sized, shaped, and/or sub-divided (such as into the first and second portions 1520, 1522) to reduce or minimize interference of the support layer 1514 with regions of the elastic layer 1512 that will be involved in subsequent manufacturing processes.

In at least one example embodiment, boundaries between the first and second portions 1520, 1522 are at least partially defined by a plurality of perforations 1524 and the first portion 1520 is configured to be separated from the second portion 1522 at the plurality of perforations 1524. In at least some other example embodiments, boundaries between the first and second portions 1520, 1522 are separated by cuts or weak regions, such as thinner regions. Thus, the first and second portions 1520, 1522 may be configured to be separated from one another.

The second portion 1522 of the support layer 1514 may remain coupled to the elastic layer 1512 when the first portion 1520 is removed. In at least some example embodiments, the composite material 1510A, 1510B may be assembled, stored, and transported with the first and second portions 1520, 1522 remaining together. Accordingly, when the elastic and support layers 1512, 1514 are coextensive, the composite material 1510A, 1510B may be stored, such as on a roll or in stacks of sheets, without adjacent elastic layers 1512 substantially sticking to one another. In at least some other example embodiments, the first portion 1520 of the support layer 1514 may be removed from the second portion 1522 prior to storage and/or transport. Thus, the composite material 1510A, 1510B may further comprise an interleaf layer to reduce and/or prevent sticking between adjacent elastic layers 1512 (not shown). In still other example embodiments, the composite material is manufactured with a support layer that includes only second portions and is substantially free of a first portion (not shown).

FIG. 15B is a perspective view of the composite material of FIG. 15A having a portion of a support layer removed according to at least one example embodiment. FIG. 15C is a cross-sectional view of the composite material of FIG. 15B, taken at line 15C-15C.

In at least one example embodiment, the first portion 1520 of the support layer 1514 may be removed from the composite material 1510A, 1510B to create a composite material 1510A', 1510B', as shown in FIGS. 15B-15C. The composite material 1510A', 1510B' includes the elastic layer 1512 and a support layer 1514'. The support layer 1514' includes the pair of second portions 1522, with the first portion 1520 (FIG. 15A) having been removed. Accordingly, a portion of the first surface 1516 of the elastic layer 1512 is exposed and free to interact with a product portion during a manufacturing process.

The composite material 1510A', 1510B' includes a first or product region 1526 and a second or apparatus region 1528. The product region 1526 comprises a portion of the elastic layer 1512 free from the support layer 1514' (e.g., the portions where the pair of second portions 1522 remain). In some example embodiments, the apparatus region 1528 is configured to engage an apparatus (not shown) to facilitate conveyance of the composite material 1510A', 1510B' through the apparatus in a machine direction 1530. In some example embodiments, the presence of the support layer 1514' in the apparatus region 1528 may maintain tensile strength of the composite material 1510A', 1510B' in the machine direction 1530 to facilitate conveyance of the composite material 1510A', 1510B' and/or may facilitate holding the composite material 1510A', 1510B' on an apparatus (e.g., on a top surface of the apparatus) during a manufacturing process. In at least some example embodiments, the composite material 1510A', 1510B' can be registered by and conveyed through the apparatus.

In the example embodiment shown in FIGS. 15B-15C, the apparatus region 1528 includes a first apparatus region 1528-1 and a second apparatus region 1528-2. The first and second apparatus regions 1528-1, 1528-2 may be disposed on opposite sides of the product region 1526. In at least one example embodiment, each of the product region 1526, the first apparatus region 1528-1, and the second apparatus region 1528-2 is substantially rectangular. The first and second apparatus regions 1528-1, 1528-2 may extend along opposing edges 1532 of the composite material 1510A', 1510B'. In at least one example embodiment, the first and second apparatus regions 1528-1, 1528-2 extend continuously between a first end 1534 of the composite material 1510A', 1510B' and a second end 1536 of the composite material 1510A', 1510B' to maintain tensile strength of the composite material 1510A', 1510B' as it is conveyed through the apparatus in the machine direction 1530. In at least one example embodiment, the first and second apparatus regions 1528-1, 1528-2 extend substantially parallel to one another.

The product region 1526 is free to stretch and deform (such as in a direction perpendicular to the first surface 1516) to permit the performance of additional manufacturing steps, such as product placement, sealing of the elastic layer 1512 to itself or another elastic layer to form a pouch around the product, sealing the elastic layer 1512 around the product, and/or cutting or other methods of separation. The first and second apparatus regions 1528-1, 1528-2 may continue to engage the apparatus while other manufacturing steps are performed within the product region 1526.

FIG. 15D is an exploded perspective view of another composite material according to at least one example embodiment.

In at least one example embodiment, as shown in FIG. 15D, a composite material 1540A, 1540B includes a first or elastic layer 1541 and a second or support layer 1542. In at least one example embodiment, the elastic layer 1541 comprises a sheet of non-woven elastomeric material and the support layer 1542 comprises a sheet of woven material. In at least some example embodiments, the support layer 1542 is disposed on top of the elastic layer 1541 and extends coextensive with the elastic layer 1541.

In at least some example embodiments, a first surface 1543 of the support layer 1542 may engage a second surface 1544 of the elastic layer 1541. In at least some example embodiments, the elastic layer 1541 is coupled to the support layer 1542 by physical characteristics of the elastic layer 1541 and the support layer 1542, for example, by adhesive friction. In at least one example embodiment, the elastic layer 1541 comprises polyurethane and the support layer 1542 comprises polypropylene.

The support layer 1542 may include a first portion 1545 and a second portion 1546. In at least some example embodiments, the second portion 1546 comprises a pair of second portions 1546, with the first portion 1545 being disposed between the pair of second portions 1546. In at least some example embodiments, the first portion 1545 and each of the pair of second portions 1546 is generally rectangular. The second portions 1546 may have substantially similar shapes and dimensions, and extend substantially parallel to one another. In at least some example embodiments, the support layer 1546 may be sized, shaped, and/or sub-divided (such as into the first and second portions 1545, 1546) to reduce or minimize interference of the support layer 1546 with regions of the elastic layer 1545 that will be involved in subsequent manufacturing processes.

In at least one example embodiment, boundaries between the first and second portions 1545, 1546 are at least partially defined by a plurality of perforations 1547 and the first portion 1545 is configured to be separated from the second portions 1546 at the plurality of perforations 1547. In at least some example embodiments, boundaries between the first and second portions 1545, 1546 are separated by cuts or weak regions, such as thinner regions. Thus, the first and second portions 1545, 1546 may be configured to be separated from one another. In at least some example embodiments, the first and second portions 1545, 1546 are configured to be separated from one another during a manufacturing process.

The second portion 1546 of the support layer 1542 may remain coupled to the elastic layer 1541 when the first portion 1545 is removed. In at least some example embodiments, the composite material 1540A, 1540B may be assembled, stored, and transported with the first and second portions 1545, 1546 remaining together. Accordingly, when the elastic and support layers 1541, 1542 are coextensive, the composite material 1540 may be stored, such as on a roll or in stacks of sheets, without adjacent elastic layers 1541 substantially sticking to one another. In at least some other example embodiments, the first portion 1545 of the support layer 1542 may be removed from the second portion 1546 prior to storage and/or transport. Thus, the composite material 1540 may further comprise an interleaf layer to reduce and/or prevent sticking between adjacent elastic layers 1541 (not shown). In still other example embodiments, the composite material is manufactured with a support layer that includes only second portions and is substantially free of a first portion (not shown).

FIG. 1E is a cross-sectional view of the composite material of FIG. 1D, the composite material having a portion of a support layer removed.

In at least one example embodiment, the first portion 1545 of the support layer 1542 may be removed from the composite material 1540A, 1540B to create a composite material 1540A', 1540B', as shown in FIG. 1E. The composite material 1540A', 1540B' includes the elastic layer 1541 and a support layer 1542'. The support layer 1542' includes the pair of second portions 1546, with the first portion 1545 (FIG. 15D) having been removed. Accordingly, a portion of the second surface 1544 of the elastic layer 1541 is exposed and free to interact with a product portion during a manufacturing process.

The composite material 1540A', 1540B' includes a first or product region 1548 and a second or apparatus region 1549. The product region 1548 comprises a portion of the elastic layer 1541 free from the support layer 1542' (e.g., where the first portion 1545 of FIG. 15D has been removed). The apparatus region 1549 comprises the portions of the elastic layer 1541 that remain with the support layer 1542' (e.g., the portions where the pair of second portions 1546 remain). In some embodiments, the apparatus region 1549 is configured to engage an apparatus (not shown) to facilitate conveyance of the composite material 1540A', 1540B' through the apparatus in a machine direction. In some embodiments, the presence of the support layer 1542' in the apparatus region 1549 may maintain tensile strength of the composite material 1540A', 1540B' in the machine direction to facilitate conveyance of the composite material 1540A', 1540B' and/or may facilitate holding the composite material 1540A', 1540B' on an apparatus (e.g., on a top surface of the apparatus) during a manufacturing process. For example, the elastic layer 1541 is disposed between the support layer 1542' and a surface of the apparatus. In at least some example embodiments, the composite material 1540' can be registered by and conveyed through the apparatus.

In the example embodiment shown in FIG. 1E, the apparatus region 1549 includes a first apparatus region 1549-1 and a second apparatus region 1549-2. The first and second apparatus regions 1549-1, 1549-2 may be disposed on opposite sides of the product region 1548. In at least one example embodiment, each of the product region 1548, the first apparatus region 1549-1, and the second apparatus region 1549-2 is substantially rectangular. The first and second apparatus regions 1549-1, 1549-2 may extend along opposing edges of the composite material 1540A', 1540B'. In at least one example embodiment, the first and second apparatus regions 1549-1, 1549-2 extend continuously between first and second ends of the composite material 1540A', 1540B' to maintain tensile strength of the composite material 1540A', 1540B' as it is conveyed through an apparatus. In at least one example embodiment, the first and second apparatus regions 1549-1, 1549-2 extend substantially parallel to one another.

The product region 1548 is free to stretch and deform (such as in a direction perpendicular to the first surface 1544) to permit the performance of additional manufacturing steps, such as product placement, sealing of the elastic layer 1541 to itself or to another elastic layer to form a pouch around the product, and/or cutting or other methods of separation. The first and second apparatus regions 1549-1, 1549-2 may continue to engage the apparatus while other manufacturing steps are performed within the product region 1548.

In at some example embodiments, the elastic layer is in the form of a sheet. The sheet may comprise an elastomer and be referred to as an "elastic layer." The elastomer may include polypropylene, polyurethane, styrene, or any combination thereof. In at least one example embodiment, the elastic layer comprises polyurethane. In at least some example embodiments, the elastic layer may have a low basis weight and a high elongation, and therefore have a tendency to stretch and rebound when conveyed through a typical process absent a support layer.

In at least one example embodiment, the elastic layer comprises a nonwoven fabric. The nonwoven fabric may comprise a plurality of fibers. The fibers may comprise a polymer. In at least one example embodiment, the plurality of fibers comprise an elastomer. In at least one example embodiment, the fibers consist essentially of polyurethane. The plurality fibers may comprise melt-blown fibers, electro-spun fibers, centrifugal-force-spun fibers, or any combination thereof.

In at least some example embodiments, the elastic layer has a basis weight of less than or equal to about 40 grams per square meter (GSM), optionally less than or equal to about 35 GSM, optionally less than or equal to about 30 GSM, optionally less than or equal to about 25 GSM, optionally less than or equal to about 20 GSM, optionally less than or equal to about 15 GSM, optionally less than or equal to about 10 GSM, optionally less than or equal to about 5 GSM. In at least some other example embodiments, the elastic layer has a basis weight of greater than or equal to about 5 GSM, optionally greater than or equal to about 10 GSM, optionally greater than or equal to about 15 GSM, optionally greater than or equal to about 20 GSM, optionally greater than or equal to about 25 GSM, or optionally greater than or equal to about 30 GSM. In at least some example embodiments, the basis weight ranges from about 10 GSM to about 30 GSM, or optionally about 15 GSM to about 25 GSM. The basis weight may range from about 10 GSM to about 15 GSM, about 15 GSM to about 20 GSM, about 20 GSM to about 25 GSM, or about 25 GSM to about 30 GSM, by way of example.

In at least some example embodiments, the elastic layer has a grab elongation in the machine direction of greater than about 100%, optionally greater than or equal to about 150%, optionally greater than or equal to about 200%, optionally greater than or equal to about 250%, optionally greater than or equal to about 300%, optionally greater than or equal to about 350%, optionally greater than or equal to about 400%, optionally greater than or equal to about 450%, or optionally greater than or equal to about 500%. In at least one example embodiment, the grab elongation in the machine direction ranges from about 200% to about 500%.

In at least one other example embodiment, an elastic layer may comprise a material similar to the elastomeric polymer pouch material set forth in U.S. Pat. No. 10,028,521 issued Jul. 24, 2018, the entire contents of which are incorporated herein by this reference thereto.

The support layer may also be referred to as a carrier or a scrim. In some example embodiments, the support layer is configured to maintain a minimum tensile strength of the composite material in the machine direction. In at least some example embodiments, the support layer is configured to maintain a minimum tensile strength of the composite material in both the machine direction and a cross direction substantially perpendicular to the machine direction. The support layer may include one or more of a sheet, such as a sheet including a woven material; a plurality of sheets; a web; a plurality of webs; an elongated support structure, such as a cord, a thread, a string, tape, a wire, or a polymeric strip; a plurality of elongated support structures; a sub-combination thereof, or a combination thereof.

In at least some example embodiments, the support layer is configured to facilitate holding a composite material on an apparatus. For example, at least a portion of the support layer may engage an apparatus, either directly or indirectly, to hold the composite material to the apparatus. In at least one example embodiment, the elastic layer is disposed between the apparatus and one or more portions of the support layer. A vacuum pulls the support layer to the apparatus, thereby holding the flexible layer between the support layer and the apparatus.

In at least some example embodiments, the support layer comprises a material that will not permanently bond to the elastic layer (see, e.g., FIGS. 15A-15C). Accordingly, the support layer is configured to be removably coupled or removably adhered to the elastic layer. In at least one example embodiment, the support layer comprises polyester, polypropylene, or a combination of polyester and polypropylene. In at least some other example embodiments, the support layer is permanently adhered to the elastic layer (see, e.g., FIGS. 5A-6).

In at least some example embodiments, the support layer has a basis weight of greater than or equal to about 20 GSM, optionally greater than or equal to about 25 GSM, optionally greater than or equal to about 30 GSM, optionally greater than or equal to about 35 GSM, and optionally greater than or equal to about 40 GSM. In at least one example embodiment, the basis weight ranges from about 30 GSM to about 38 GSM, or optionally about 34 GSM.

In at least some example embodiments, the support layer has a lower machine direction grab elongation than the elastic layer. Accordingly, the elastic layer may have a first machine direction grab elongation and the support layer may have a second machine direction grab elongation that is lower than the first machine direction grab elongation. In at least some example embodiments, a ratio of first machine direction grab elongation to the second machine direction grab elongation may be greater than or equal to about 2, optionally greater than or equal to about 3, optionally greater than or equal to about 4, optionally greater than or equal to about 5, optionally greater than or equal to about 10, or optionally greater than or equal to about 15.

In at least some example embodiments, the support layer has a grab elongation in the machine direction of less than or equal to about 100%, optionally less than or equal to about 90%, optionally less than or equal to about 80%, optionally less than or equal to about 70%, optionally less than or equal to about 60%, optionally less than or equal to about 50%, optionally less than or equal to about 40%, or optionally less than or equal to about 30%. In at least some example embodiments, the grab elongation in the machine direction ranges from about 18% to about 66%, optionally about 20% to about 65%, optionally about 25% to about 60%, optionally about 30% to about 55%, optionally about 35% to about 55%, or optionally about 40% to about 50%.

In at least some example embodiments, the support layer has a grab elongation in the cross direction of less than or equal to about 100%, optionally less than or equal to about 80%, optionally less than or equal to about 60%, optionally less than or equal to about 40%, optionally less than or equal to about 30%, optionally less than or equal to about 20%, and optionally less than or equal to about 10%. In at least some example embodiments, the grab elongation in the cross direction ranges from about 8% to about 85%, optionally about 10% to about 80%, optionally about 20% to about 75%, optionally about 30% to about 70%, optionally about 40% to about 65%, or optionally about 50% to about 60%.

The support layer may generally have a higher machine-direction tensile strength than the elastic layer. Accordingly, the elastic layer may have a first tensile strength and the support layer may have a second tensile strength that is greater than the first tensile strength. In at least some example embodiments, the support layer has a tensile strength in the machine direction ranging from about 98 kilograms-force per meter width (kgf/M) to about 216 kgf/M, optionally about 100 kgf/M to about 215 kgf/M, optionally about 110 kgf/M to about 210 kgf/M, optionally about 120 kgf/M to about 200 kgf/M, optionally about 130 kgf/M to about 190 kgf/M, optionally about 140 kgf/M to about 180 kgf/M, optionally about 150 kgf/M to about 170 kgf/M, or optionally about 155 kgf/M to about 165 kgf/M. In at least one example embodiment, the tensile strength in the machine direction ranges from about 100 kgf/M to about 110 kgf/M. In at least one other example embodiment, the tensile strength in the machine direction ranges from about 110 kgf/M to about 120 kgf/M. In at least one other example embodiment, the tensile strength in the machine direction ranges from about 120 kgf/M to about 130 kgf/M. In at least one other example embodiment, the tensile strength in the machine direction ranges from about 130 kgf/M to about 140 kgf/M. In at least one other example embodiment, the tensile strength in the machine direction ranges from about 140 kgf/M to about 150 kgf/M. In at least one other example embodiment, the tensile strength in the machine direction ranges from about 150 kgf/M to about 160 kgf/M. In at least one other example embodiment, the tensile strength in the machine direction ranges from about 160 kgf/M to about 170 kgf/M. In at least one other example embodiment, the tensile strength in the machine direction ranges from about 170 kgf/M to about 180 kgf/M. In at least one other example embodiment, the tensile strength in the machine direction ranges from about 180 kgf/M to about 190 kgf/M. In at least one other example embodiment, the tensile strength in the machine direction ranges from about 190 kgf/M to about 200 kgf/M. In at least one other example embodiment, the tensile strength in the machine direction ranges from about 200 kgf/M to about 215 kgf/M. In at least some example embodiments, the tensile strength in the machine direction is greater than or equal to about 98 kgf/M, optionally greater than or equal to about 100 kgf/M, optionally greater than or equal to about 110 kgf/M, optionally greater than or equal to about 120 kgf/M, optionally greater than or equal to about 130 kgf/M, optionally greater than or equal to about 135 kgf/M, optionally greater than or equal to about 140 kgf/M, optionally greater than or equal to about 145 kgf/M, optionally greater than or equal to about 150 kgf/M, optionally greater than or equal to about 155 kgf/M, and optionally greater than or equal to about 160 kgf/M.

In at least some example embodiments, the support layer has a tensile strength in the cross direction ranging from about 10 kgf/M to about 200 kgf/M, optionally about 25 kgf/M to about 190 kgf/M, optionally about 40 kgf/M to about 180 kgf/M, optionally about 55 kgf/M to about 170 kgf/M, optionally about 70 kgf/M to about 160 kgf/M, optionally about 85 kgf/M to about 150 kgf/M, optionally about 100 kgf/M to about 140 kgf/M, optionally about 105 kgf/M to about 135 kgf/M, optionally about 110 kgf/M to about 130 kgf/M, or optionally about 115 kgf/M to about 125 kgf/M.

In at least some example embodiments, the support layer has an air permeability ranging from about 80 cubic feet per minute (CFM) to about 200 CFM, optionally about 90 CFM to about 185 CFM, optionally about 100 CFM to about 170 CFM, optionally about 110 CFM to about 155 CFM, optionally about 115 CFM to about 145 CFM, optionally about 120 CFM to about 140 CFM, or optionally about 125 CFM to about 135 CFM. In at least one example embodiment, the support layer has an air permeability ranging from about 80 CFM to about 90 CFM. In at least one example embodiment, the support layer has an air permeability ranging from about 90 CFM to about 100 CFM. In at least one other example embodiment, the support layer has an air permeability ranging from about 100 CFM to about 110 CFM. In at least one other example embodiment, the support layer has an air permeability ranging from about 110 CFM to about 120 CFM. In at least one other example embodiment, the support layer has an air permeability ranging from about 120 CFM to about 130 CFM. In at least one other example embodiment, the support layer has an air permeability ranging from about 130 CFM to about 140 CFM. In at least one other example embodiment, the support layer has an air permeability ranging from about 140 CFM to about 150 CFM. In at least one other example embodiment, the support layer has an air permeability ranging from about 150 CFM to about 160 CFM. In at least one other example embodiment, the support layer has an air permeability ranging from about 160 CFM to about 170 CFM. In at least one other example embodiment, the support layer has an air permeability ranging from about 170 CFM to about 180 CFM. In at least one other example embodiment, the support layer has an air permeability ranging from about 180 CFM to about 190 CFM. In at least one other example embodiment, the support layer has an air permeability ranging from about 190 CFM to about 200 CFM.

In at least some example embodiments, a thickness of the support layer ranges from about 0.1 mm to about 1 mm, optionally about 0.1 mm to about 0.75 mm, optionally about 0.25 mm to about 0.5 mm. In at least one example embodiment, the thickness ranges from about 0.331 mm to about 0.471 mm, optionally about 0.191 mm. A color of the support layer may be white, off-white, tan, or brown, by way of example. In at least one example embodiment, the color of the support layer is white.

In at least some example embodiments, the support layer includes a first portion and a second portion. The second portion may be configured to be engaged by the apparatus, while the first portion is configured to be separable from the second portion. In at least some example embodiments, the support layer may include weak regions, such as perforations, that at least partially define the first and second portions. The support layer may be configured to separate at the weak regions upon application of appropriate force to create open spaces. In at least some other example embodiments, the support layer includes one or more open spaces that are integrally formed with the material of the support layer, or formed in post-processing (e.g., die cutting, laser cutting). The open spaces may be continuous along the machine direction, continuous along the cross direction, or discrete.

In at least some example embodiments, a composite material comprises an elastic layer and a support layer. In at least one example embodiment, the composite material has combined thickness ranging from about 1 mm to about 5 mm, optionally about 1.5 mm to about 4.5 mm, optionally about 2 mm to about 4 mm, or optionally about 2.5 mm to about 3.5 mm. In at least some example embodiments, the composite material has a basis weight ranging from about 40 GSM to about 70 GSM, optionally about 45 GSM to about 65 GSM, optionally about 50 GSM to about 60 GSM, or optionally about 50 GSM to 55 GSM. In at least some example embodiments, the composite material has an air permeability ranging from about 175 CFM to about 225 CFM, optionally about 180 CFM to about 220 CFM, optionally about 185 CFM to about 215 CFM, optionally about 190 CFM to about 210 CFM, or optionally about 195 CFM to about 205 CFM.

In at least some example embodiments, the composite material further comprises an interleaf layer. The interleaf layer is configured to prevent adjacent elastic layers or portions of elastic layers from sticking to one another. In at least one example embodiment, the composite material may include the interleaf layer when support layer includes the open spaces. In at least some example embodiments, the interleaf layer comprises a polymeric material. In at least one example embodiment, the support layer comprises polyester, polypropylene, or a combination of polyester and polypropylene. In at least some other example embodiments, the composite material both includes open spaces and omits the interleaf layer, such as when the elastic layer does not stick to itself.

In at least one example embodiments, the composite material may be the composite material described in co-ending U.S. application Ser. No. 16/382,733 titled "CARRIER MATERIAL LAYER," filed concurrently herewith, the entire contents of which is incorporated herein by reference.

In at least some example embodiments, the elastic layer is used to enclose a product portion, such as in a pouch formed from one or more sheets of elastic layers. In at least some example embodiments, the product portion is an oral product. The oral product may be a tobacco product, a nicotine product, or a non-tobacco product.

An oral tobacco product may include smokeless tobacco that is placed in the mouth and not combusted. Smokeless tobacco exists in various forms, such as chewing tobacco, moist smokeless tobacco, snus, dry snuff, etc. Chewing tobacco is coarsely divided tobacco leaf that is typically packaged in a large pouch-like package and used in a plug or twist. Moist smokeless tobacco is a moist, more finely divided tobacco that is provided in loose form or in pouch form and is typically packaged in round cans and used as a pinch or in a pouch placed in an adult tobacco consumer's mouth. Snus is a heat treated smokeless tobacco. Dry snuff is finely ground tobacco that is placed in the mouth or used nasally.

A nicotine product may include tobacco-derived nicotine, non-tobacco-derived nicotine, and/or nicotine derivative.

In operation, the apparatus 100 is configured to form pouch products and package the pouch products in containers as shown in FIGS. 16-29 and described herein. The pouch products include an outer layer formed of the elastic layer 1512 and an inner filling material, which may comprise tobacco or other plant material.

Figure 16:
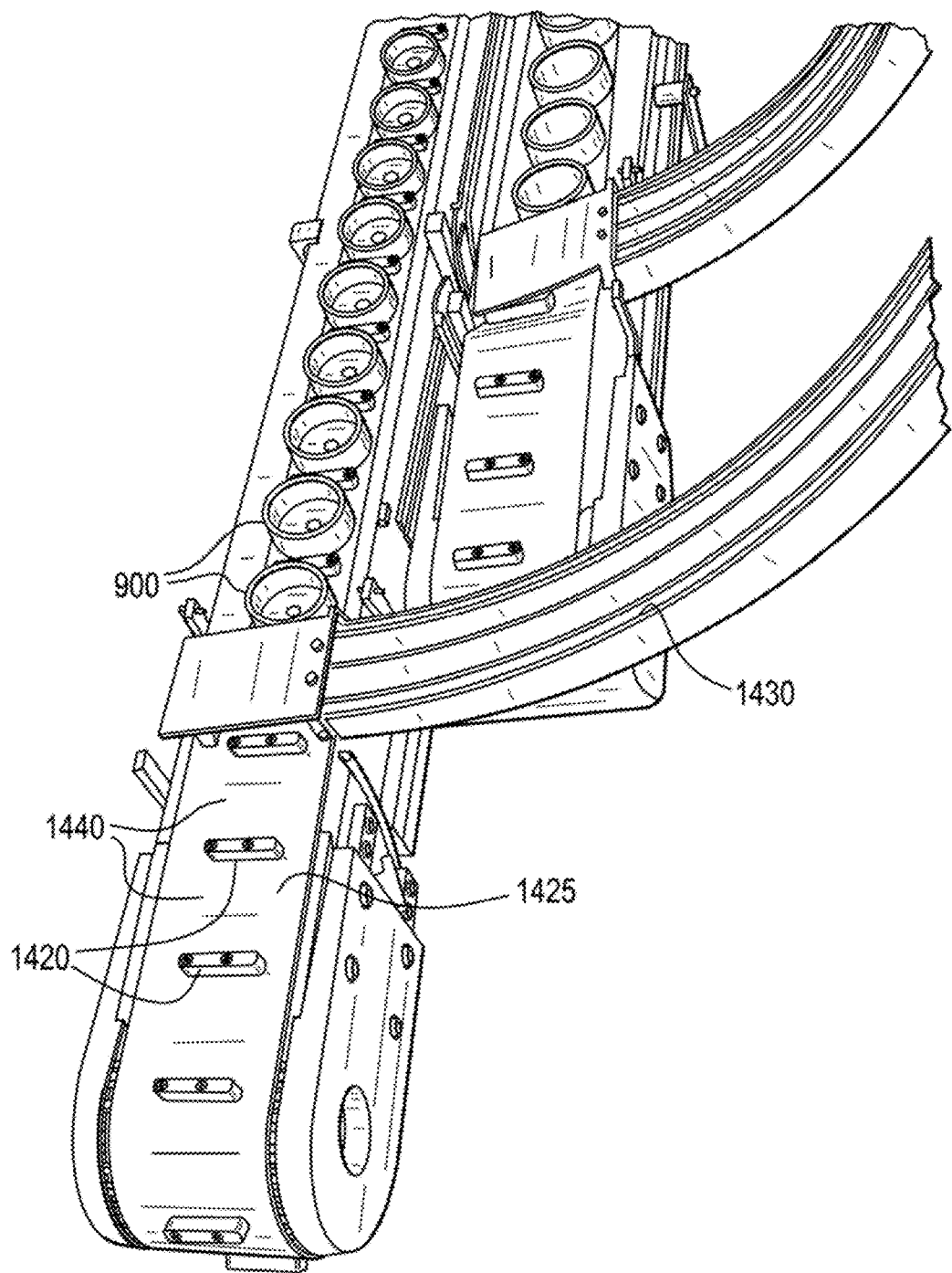
FIG. 16 is a top perspective view of a portion of the container feed system of FIG. 14 according to at least one example embodiment.

FIG. 16 is a top perspective view of a portion of the container feed system according to at least one example embodiment.

In operation, as shown in FIG. 16, the containers 900 are delivered to the conveyor 1425 of a container conveyor system 180 by the container infeed system 1430, which gravity feeds the containers 900 towards the conveyor 1425. As the conveyor 1425 progresses, one of the containers 900 slides from the container delivery chute 1600 to the space 1440 between adjacent ones of the cleats 1420 on the conveyor 1425. The container conveyor system 180 may be any suitable container system generally known to a person having ordinary skill in the art. The conveyor 1425 then moves forward, carrying the containers 900 towards the rotatable drum 125.

Figure 17:
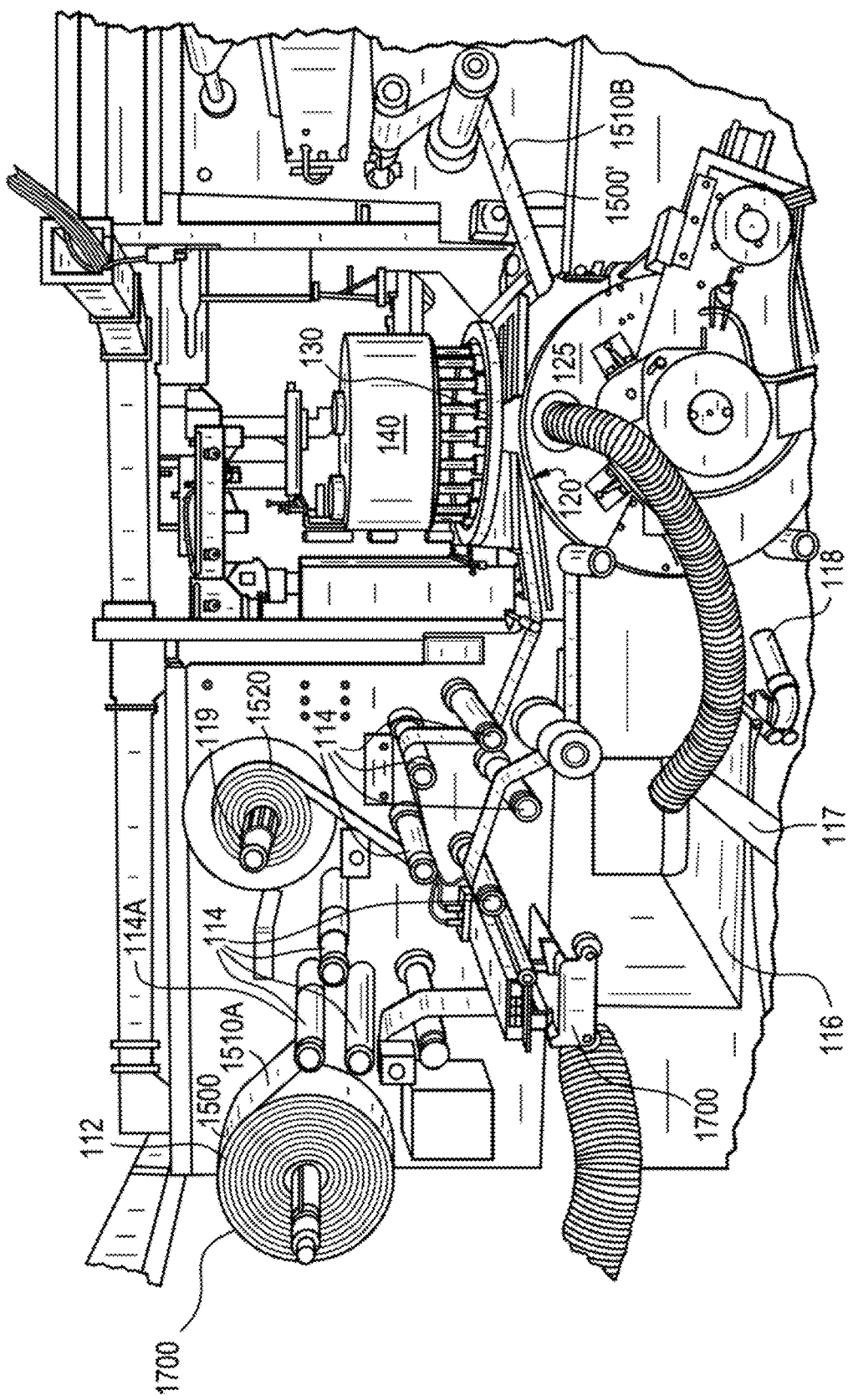
FIG. 17 is a partial front view of an apparatus for forming a pouch product including a first material roll extending through the first material distribution station according to at least one example embodiment.

FIG. 17 is a partial front view of an apparatus for forming a pouch product including a first material extending through the first material distribution station according to at least one example embodiment. The first material 1500 and the second material 1500' are described with respect to FIGS. 15A-15C.

In at least one example embodiment, as shown in FIG. 17, as the containers 900 (not shown in FIG. 17) move along the conveyor 1425, the first material 1500, which is on a roll 1700, is placed on the first roll holder 112 and then threaded through the first set of rollers 114 including the first tensioner 114A, the first dewrinkling roller 117, the first stripper plate 118, and to the first scrap roll holder 119. It should be noted that to initiate operation of the apparatus 100, the first material 1500 and the second material 1500' are threaded through the rollers, like thread in a sewing machine, prior to operation.

During operation, the first material 1500 travels from the first roll holder 112 to the first receiving location 120. As the first material 1500 travels, the first material 1500 runs through the first tensioner 114A which may include the first tracking controller 116. The first tensioner 114A may include at least one tension sensing roller, as generally known to a person having ordinary skill in the art. The first tracking controller 116 and the first tensioner 114A are configured keep the first material 1500 on track and at a desired tension as the first material 1500 passes along the various rollers. The first tracking controller is configured to pivot a set of rollers around a center axis so as to maintain web tracking. The first tracking controller 116 is in constant movement so as to maintain the edge of the web within the target area of an edge sensor (not shown).

In at least one example embodiment, the first material 1500 then travels along the dewrinkling roller 117, which has a bowed (convex) surface that is configured to reduce and/or prevent wrinkles in the first material 1500.

Once the first material 1500 arrives at the first receiving location 120, portions of the first material 1500 are aligned with the rotatable drum 125, while the first portion 1520 of the first support layer 1514 is removed. Removal of the first portion 1520 along the perforations 1524 occurs as the first stripper plate 118 and remaining ones of the first set of rollers 114 roll up the first portion 1520, such that only the elastic layer 1512 and portions 1522 of the support layer 1514 of the first material 1500 remain at the first receiving location 120 and in contact with the rotatable drum 125. The motion of the rotatable drum 125 simultaneously pulls the elastic layer 1512 and the second portions 1522 of the support layer 1514 away from the removed portion 1520 thereby aiding in the removal of the first portion 1520. The first stripper plate 118 puts pressure along the first material 1500, and the first portion 1520 is pulled back over the first stripper plate 118 as the first scrap roll holder 119 and remaining ones of the first set of rollers 114 pull the portion 1520 from the elastic layer 1512 and the second portions 1522 of the support layer 1514.

In at least one example embodiment, at the first receiving location 120, the elastic layer 1512 and the second portions 1522 of the support layer 1514 are aligned with the rotatable drum 125, such that the elastic layer 1512 and the second portions 1522 of the support layer 1514 move with the rotatable drum 125 in a machine direction towards the dosing location 130. Thus, the elastic layer 1512 and the second portions 1522 of the support layer 1514 of the first material 1500 are conveyed through the apparatus 100 in the machine direction. The elastic layer 1512 and the second portions 1522 of the support layer 1514 of the first material 1500 includes the product region 1526 and the apparatus region 1528 (shown in FIGS. 15A-15C). The product region 1526 includes the elastic layer 1512, and the apparatus region 1528 includes the elastic layer 1512 and the support layer 1514', which prevents stretching of the elastic layer 1512 as the composite material 1510A' passes through the apparatus 100.

Figure 18:
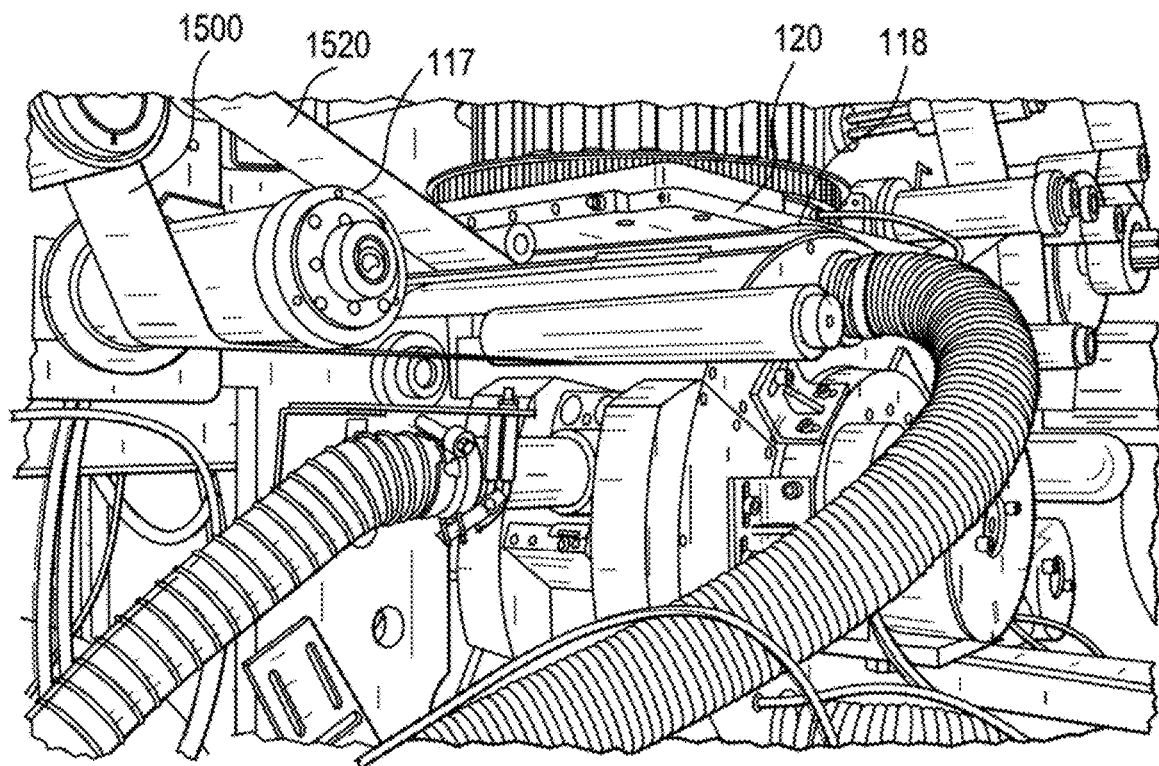
FIG. 18 is a perspective view of a first receiving location of the apparatus of FIG. 1 according to at least one example embodiment.

FIG. 18 is a perspective view of a first receiving location of the apparatus of FIG. 1 according to at least one example embodiment.

In at least one example embodiment, as shown in FIG. 18, the movement of the first material 1500 to the first receiving location 120 is shown in more detail. As shown, the first material 1500 moves along the first dewrinkling roller 117 to the first receiving location 120. At the first receiving location 120 along the path of the rotatable drum 125, the first material 1500 is brought into contact with a portion of the rotatable drum 125 while the first portion 1520 is pulled away from the elastic layer 1512 and the second portions 1522 by the first stripper plate 118 and the remaining rollers. As shown, the first portion 1520 is pulled in a direction substantially opposite to the direction in which the rotatable drum 125 rotates.

Figure 19:
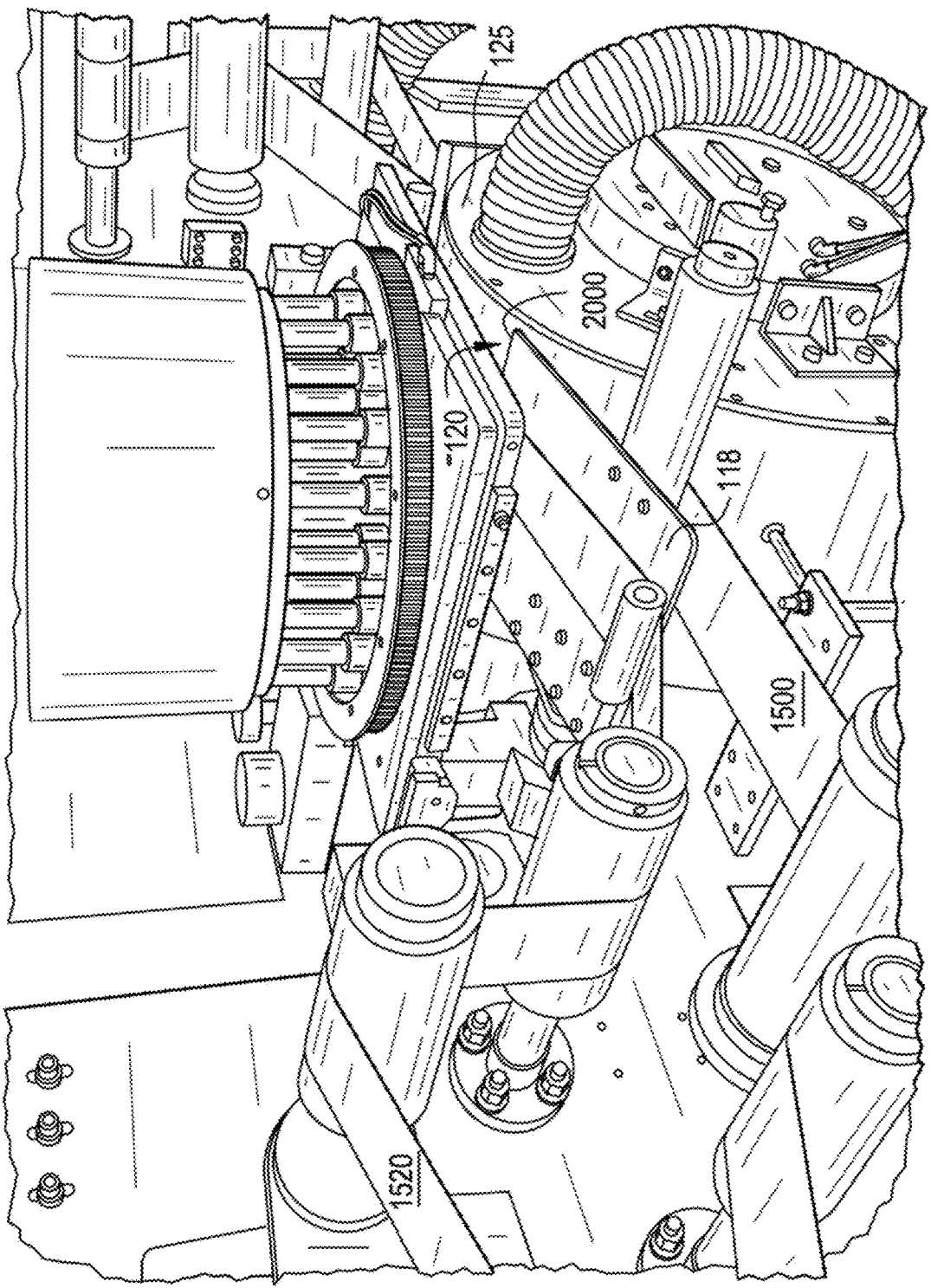
FIG. 19 is a perspective view of a first receiving location and a dosing location of the apparatus of FIG. 1 according to at least one example embodiment.

FIG. 19 is a perspective view of a first receiving location and a dosing location of the apparatus of FIG. 1 according to at least one example embodiment.

In at least one example embodiment, as shown in FIG. 19, an edge 2000 of the first stripper plate 118 abuts a portion of the rotatable drum 125 at the first receiving location 120. Once the first material 1500 aligns with the rotatable drum 125, the first portion 1520 of the support layer 1514 is pulled over the edge 2000 and the body of the first stripper plate 118 as the rotatable drum 125 rotates clockwise away from the first stripper plate 118. Substantially simultaneously, the removed first portion 1520 of the support layer 1514 is being pulled by the rollers and the first scrap roll holder 119 (shown in FIG. 17).

Figure 20:
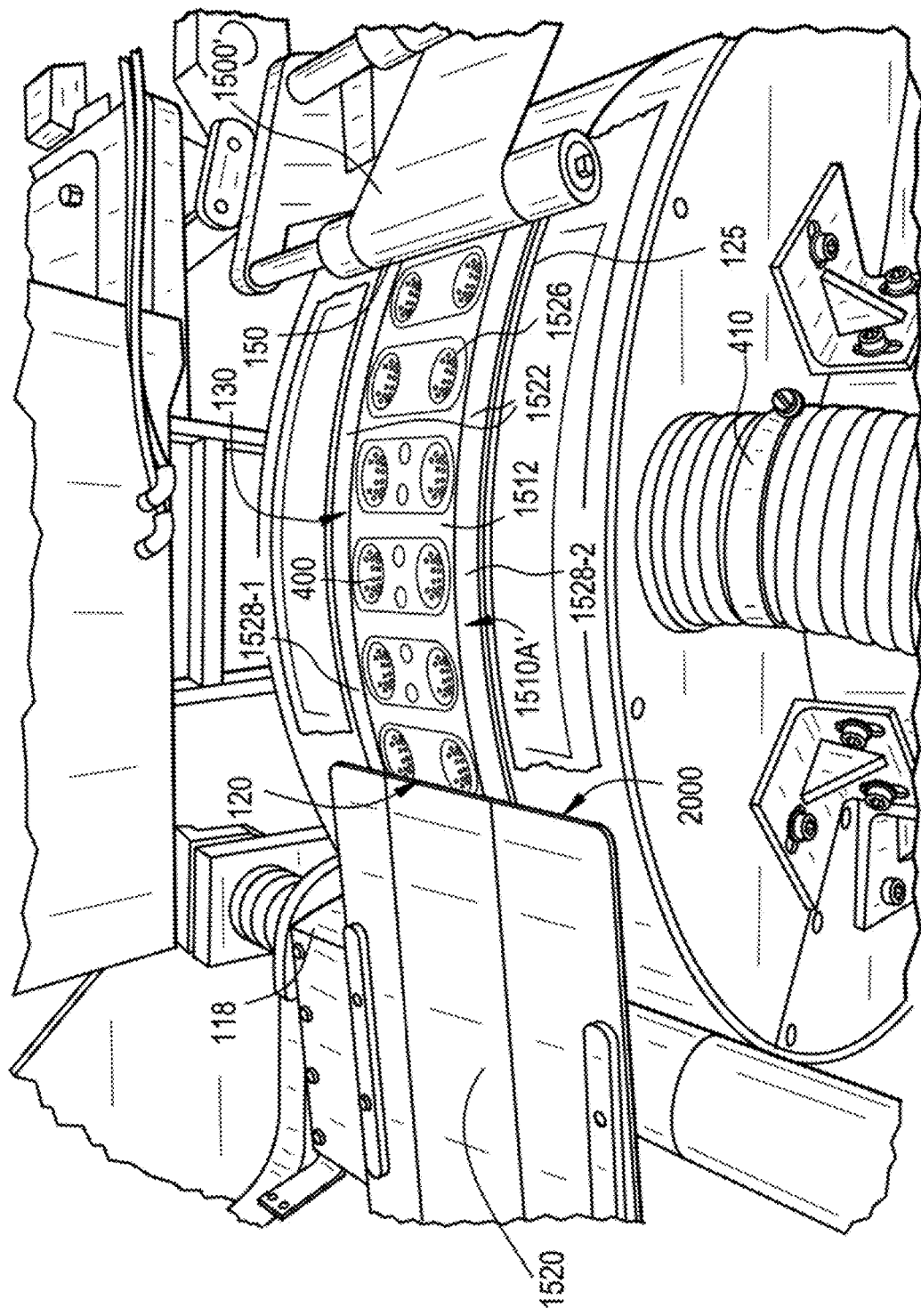
FIG. 20 is a top perspective view of the dosing location with the doser removed according to at least one example embodiment.

FIG. 20 is a top perspective view of the dosing location with the doser removed according to at least one example embodiment.

In at least one example embodiment, as shown in FIG. 20, the first material 1500 including the elastic layer 1512 and the second portions 1522 of the support layer 1514 moves along the rotatable drum 125 from the first receiving location 120 to the dosing location 130. The first edge 2000 of the first stripper plate 118 abuts the first material 1500 at the first receiving location 120. As the elastic layer 1512 and the second portions 1522 rotate with the rotatable drum 125, the removed first portion 1520 is pulled away from the elastic layer 1512 and the second portions 1522. The first portion 1520 is pulled in a direction opposite of the direction of rotation of the rotatable drum 125. The first portion 1520 extends over the first stripper plate 118.

Further, as shown, the elastic layer 1512 is semi-transparent such that the divots 400 along the rotatable drum 125 can be seen therethrough. As the rotatable drum 125 rotates, a vacuum is pulled via the vacuum source 410 so as to conform at least a portion of the first elastic layer 1512, which includes the first product region 1526, and the second portions 1522 to a surface of the apparatus 100. Thus, the vacuum pulls the elastic layer 1512 into each of the divots 400 prior to dosing by the doser 140.

In at least one example embodiment, the rotatable drum 125 may also include the grippers 710 (shown in FIG. 7), which may be air inlets at which the vacuum is communicated to the second portions 1522 and/or raised bumps that grip the first material 1500. In at least one example embodiment, when the grippers 710 include air inlets, the vacuum can be applied so as to pull and hold the first material 1500 against a surface of the rotatable drum 125.

After the elastic layer 1512 is pulled into the divots 400, the filler material is placed into the divots 400 on top of the elastic layer 1512 as will be discussed with respect to FIG. 22, and the rotatable drum 125 continues to rotate towards the second receiving location 150.

At the second receiving location 150, the second material 1500' is aligned with the elastic layer 1512 and the second portions 1522 of the support layer 1514, such that the filler material is sandwiched between the elastic layer 1512 of the first material and the second material 1500'.

Figure 21:
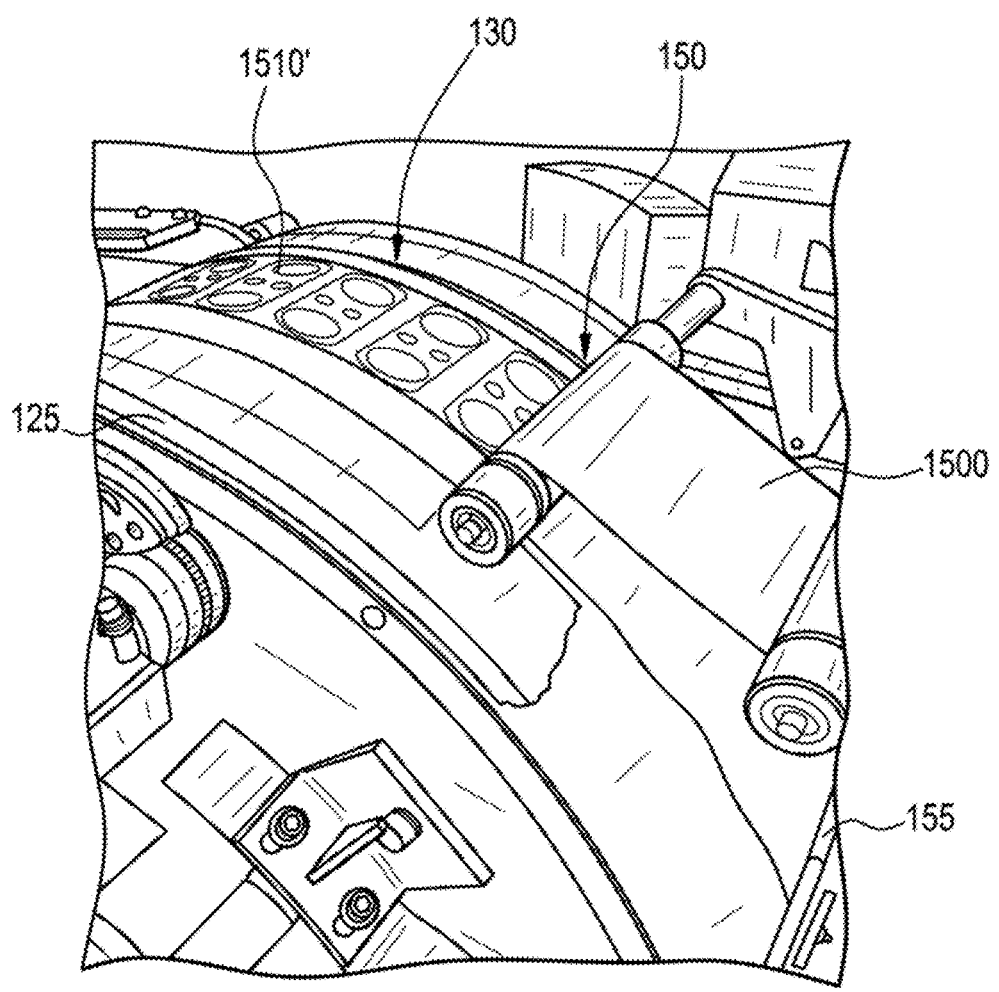
FIG. 21 is a top perspective view of the dosing location with the doser removed and a second receiving location according to at least one example embodiment.

FIG. 21 is a top perspective view of the dosing location with the doser removed and a second receiving location according to at least one example embodiment.

In at least one example embodiment, as shown in FIG. 21, the second material 1500' is aligned with the elastic layer 1512 and the second portions 1522 at the second receiving location 150, which is along the rotatable drum 125 as the rotatable drum 125 continuously rotates.

Figure 22:
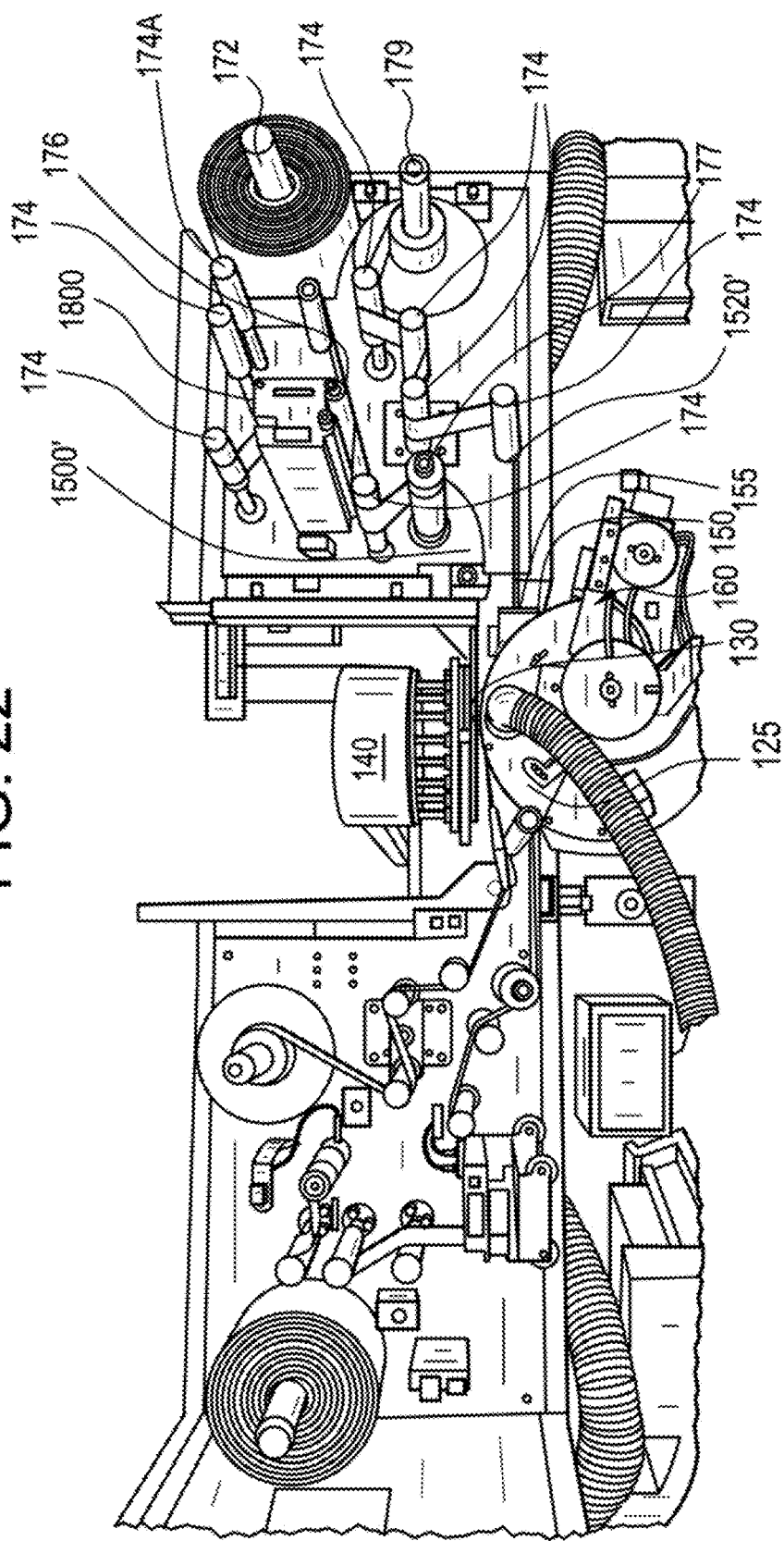
FIG. 22 is a partial front view of an apparatus for forming a pouch product including a first material roll extending through the first material distribution station and a second material roll extending through the second material distribution station according to at least one example embodiment.

FIG. 22 is a partial front view of an apparatus for forming a pouch product including a first material roll extending through the first material distribution station and a second material roll extending through the second material distribution station according to at least one example embodiment.

In at least one example embodiment, as shown in FIG. 22, the elastic layer 1512 and the second portions 1522 of the support layer 1514 of the first material 1500 move along the rotatable drum 125 to the dosing location 130 after the elastic layer 1512 of the first material 1500 has been pulled into the divots 400 by vacuum as discussed with respect to FIG. 20.

At the dosing location 130, a desired amount of filler material is placed into each divot 400 on top of the first elastic layer 1512 by the doser 140. The doser 140 may be any suitable doser including a carousel style doser as discussed herein.

The rotatable drum 125 continues rotating from the dosing location 130 to the second receiving location 150, such that the filled divots 400 continue moving along the rotatable drum 125 towards the second receiving location 150.

At the second receiving location 150, the second material 1500' is delivered to the rotatable drum 125 via the second roll holder 172, the second set of rollers 174 including the second tensioner 174A, and the second dewrinkling roller 177. The second material 1500' is then aligned with the elastic layer 1512 and the second portions 1522 of the first material 1500, such that the filler material is sandwiched between the elastic layer 1512 of the first material 1500 and the second material 1500'.

At the second receiving location 150, as with the first material 1500, the first portion 1520 of the support layer 1514 of the second material 1500' is removed as the second stripper plate 155 and second scrap roll holder 179 pull the first portion 1520' away from the remaining second portions 1522' along the perforations 1524. The first portion 1520' is continuously rolled onto the second scrap roll holder 179 while the remaining second portions 1522' of the second material 1500' are aligned with the elastic layer 1512 and the second portions 1522 of the support layer 1514 of the first material 1500 as the rotatable drum 125 continuously rotates towards the cutting and sealing location 160.

Figure 23:
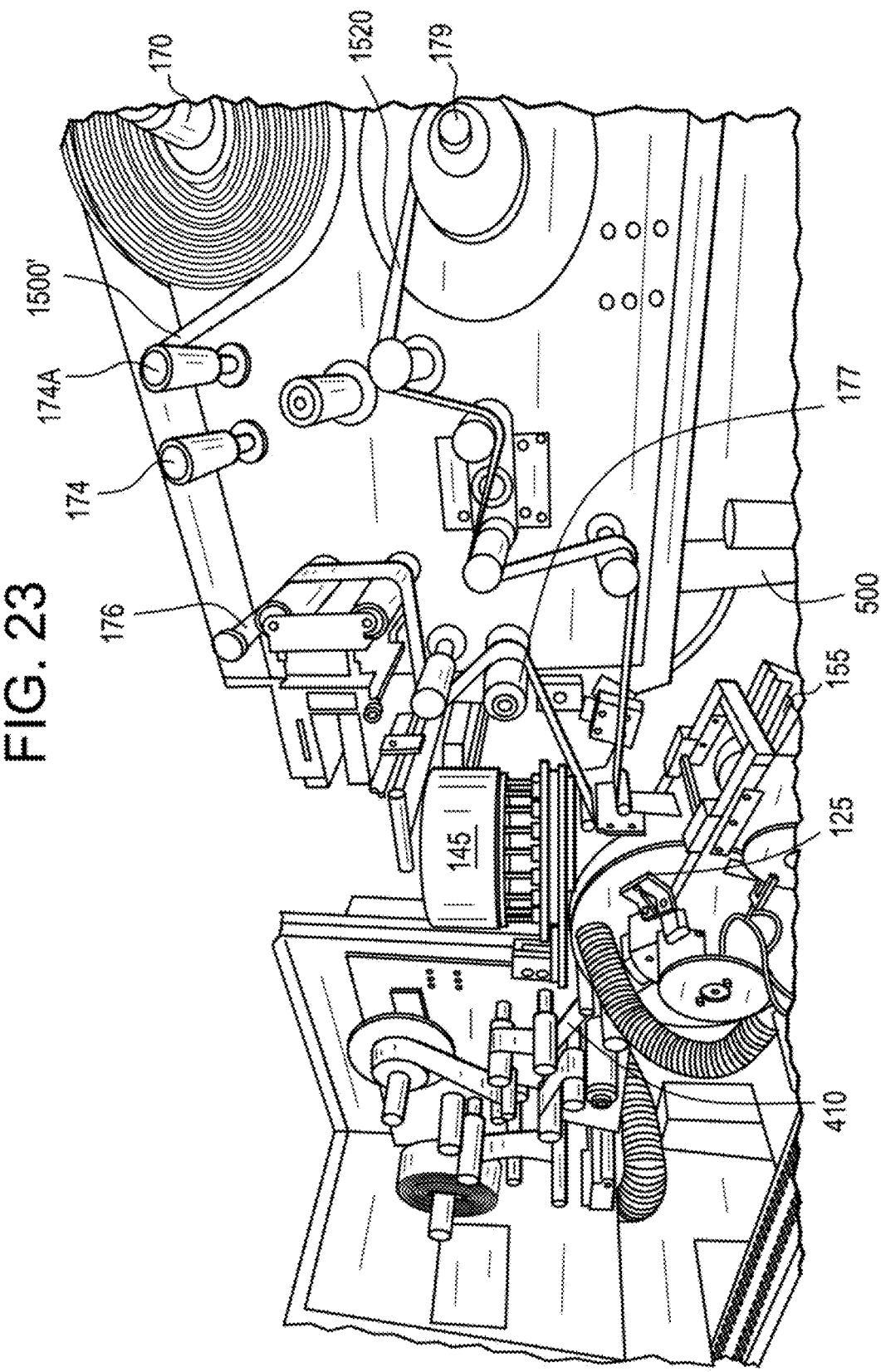
FIG. 23 is a front perspective view showing the second material extending through the second material distribution station according to at least one example embodiment.

FIG. 23 is a front perspective view showing the second material extending through the second material distribution station according to at least one example embodiment.

In at least one example embodiment, as shown in FIG. 23, the first portion 1520 of the second material 1500' is pulled away from the remainder of the second material as the rotatable drum 125 rotates and the second stripper plate 155 presses against the second material. The second scrap roll holder 179 continuously rolls the removed first portion 1520 to aid in pulling the removed material from the remainder of the second material 1500'.

Figure 24:
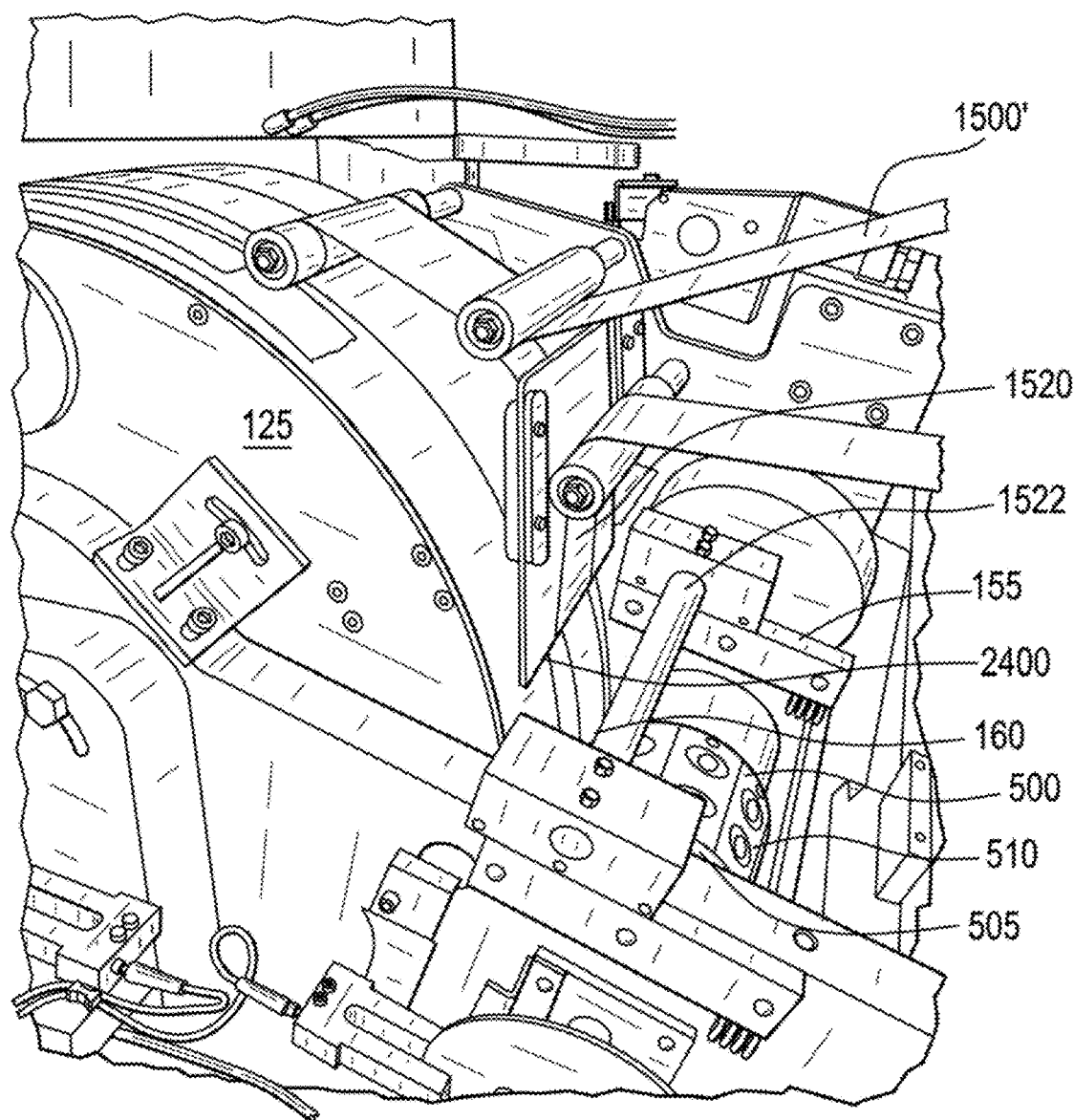
FIG. 24 is a side perspective view of the dosing location with the doser removed and a second receiving location according to at least one example embodiment.

FIG. 24 is a side perspective view of the second receiving location and the cutting and sealing location according to at least one example embodiment.

In at least one example embodiment, as shown in FIG. 24, after the elastic layer 1512 and the remaining second portions 1522 of the first material 1500 and the second material 1500' are aligned along the rotatable drum 125, the aligned materials move into contact with an edge 2400 of the second stripper plate 155. The edge 2400 abuts the rotatable drum 125 and the first portion 1520 of the second material 1500' is pulled from the second portions 1522 of the second material 1500' along the perforations 1524 (shown in FIGS. 15A-15C). The edge 2400 provides a point at which pressure is applied to the second material 1500' as the first portion 1520 of the support layer 1514 is pulled and removed along the perforations 1524 in the support layer 1514 of the second material 1500'.

The remaining portions of the first material 1500 and the second material 1500' continue to travel along the rotatable drum 125 to the cutting and sealing location 160, which may be at about a 4 o'clock position along the rotatable drum 125. As the rotatable drum 125 rotates clockwise, the heat knife assembly roller 505 rotates counterclockwise, such that the heat knives 510 align with respective ones of the divots 400 along the rotatable drum 125. The heat knives 510 are heated to a temperature sufficient to at least partially melt the first and second elastic layers so as to form a seal between the elastic layers of the first material 1500 and the second material 1500'. In at least one example embodiment, the heating is sufficient to at least partially cut the newly formed pouch product from the surrounding waste material simultaneous to the sealing.

FIG. 25 is a partial view of the apparatus of FIG. 1 showing the second receiving location and the cutting and sealing location according to at least one example embodiment.

In at least one example embodiment, as shown in FIG. 25, the first and second elastic layers are aligned and travel to the cutting and sealing location 160.

In at least one example embodiment, the apparatus 100 also includes a drum register 2500 configured to adjust a speed of rotation of the rotatable drum 125. The rotatable drum 125 is servo controlled to follow speed and position commands using motion move position cam instructions synchronized to follow a master virtual axis. Servo configuration allows each motor to know how to far to move over the course of one pouch, taking in account motor speed and powertrain setup (gear box ratios etc.). Speeds are therefore set in pouches/sec. The rotatable drum 125 has an attached disk with a small slot cut near outside perimeter. A homing sensor on each of the two disks detects the slots to provide a "Home" position. This home position is offset in software so as to provide accurate alignment of the two drums.

Further, as shown the heat knives 510 align with the divots 400 as the rotatable drum 125 rotates clockwise, and the heat knife assembly roller 505 rotates counterclockwise, and the first and second elastic layers pass therebetween.

Figure 26A:
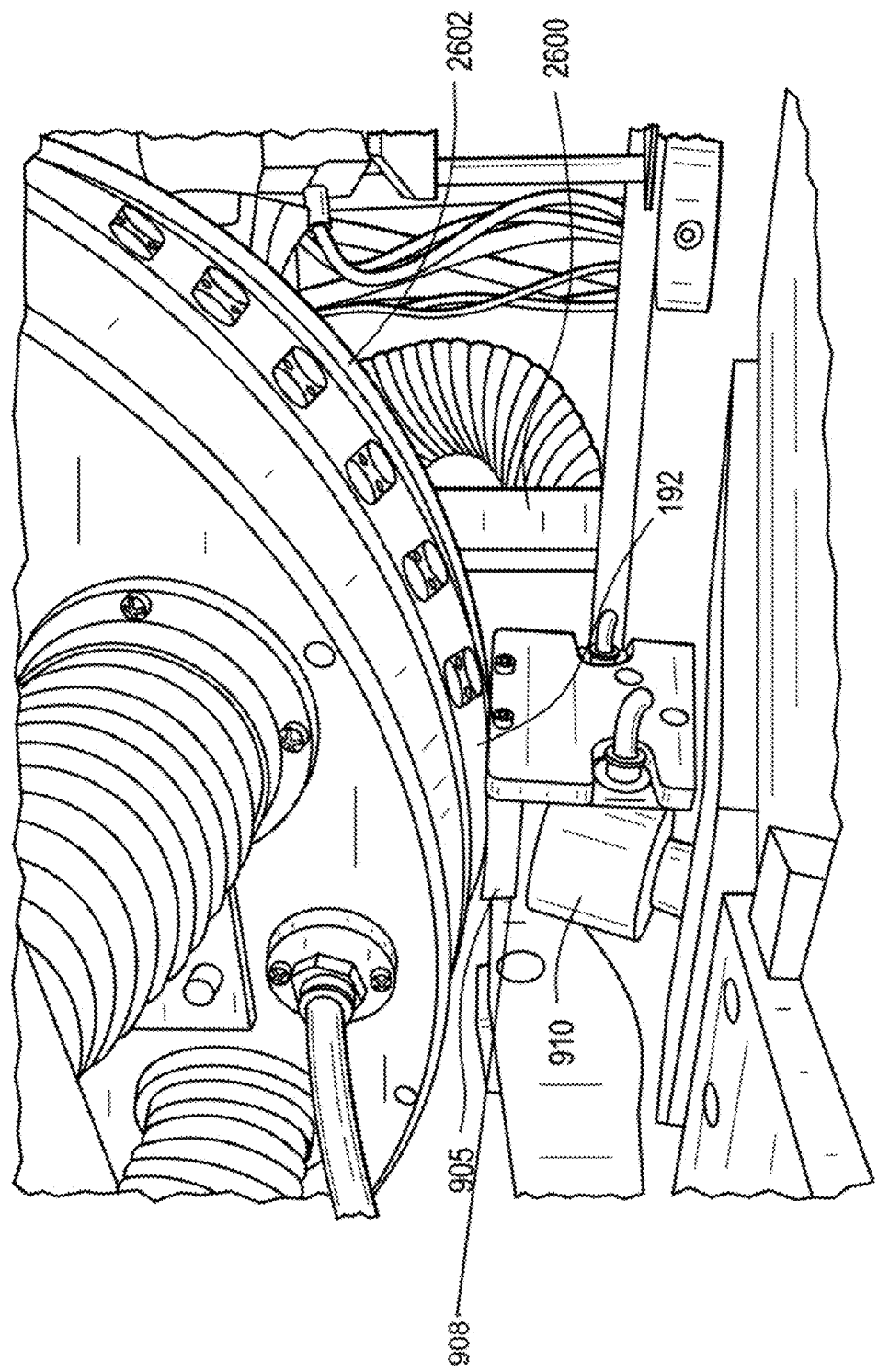
FIG. 26A is a partial view of the apparatus of FIG. 1 showing an ejector location according to at least one example embodiment.

FIG. 26A is a partial view of the apparatus of FIG. 1 showing an ejector station according to at least one example embodiment.

In at least one example embodiment, as shown in FIG. 26A, as the rotatable drum 125 continues to rotate past the cutting and sealing location 160, pouch products 2600, formed after being sealed and at least partially cut dangle from the surrounding waste materials 2602 as the rotatable drum 125 continuously rotates towards the ejection location 192.

As shown, the ejection location 192, includes the ejector assembly 905 including the ejector housing 908 defining an opening that catches the pouch products 2600 and aids in removal of the pouch products 2600 from the waste material 2602. The opening in the ejector housing 908 leads to at least one ejector 910. The edge of the ejector housing 908 may aid in scraping and/or pushing the pouch products 2600 from the waste material 2602 and into the ejectors 910. The ejectors 910 may be substantially tubular. The ejectors 910 include an outlet (not shown) that aligns with a respective one of the funnels 920 and a respective container as discussed herein, such that the pouch products 2600 are directed into containers for packaging. The pouch products 2600 are gravity fed through the ejectors 910, through the funnels 920, and into the respective containers.

Figure 26B:
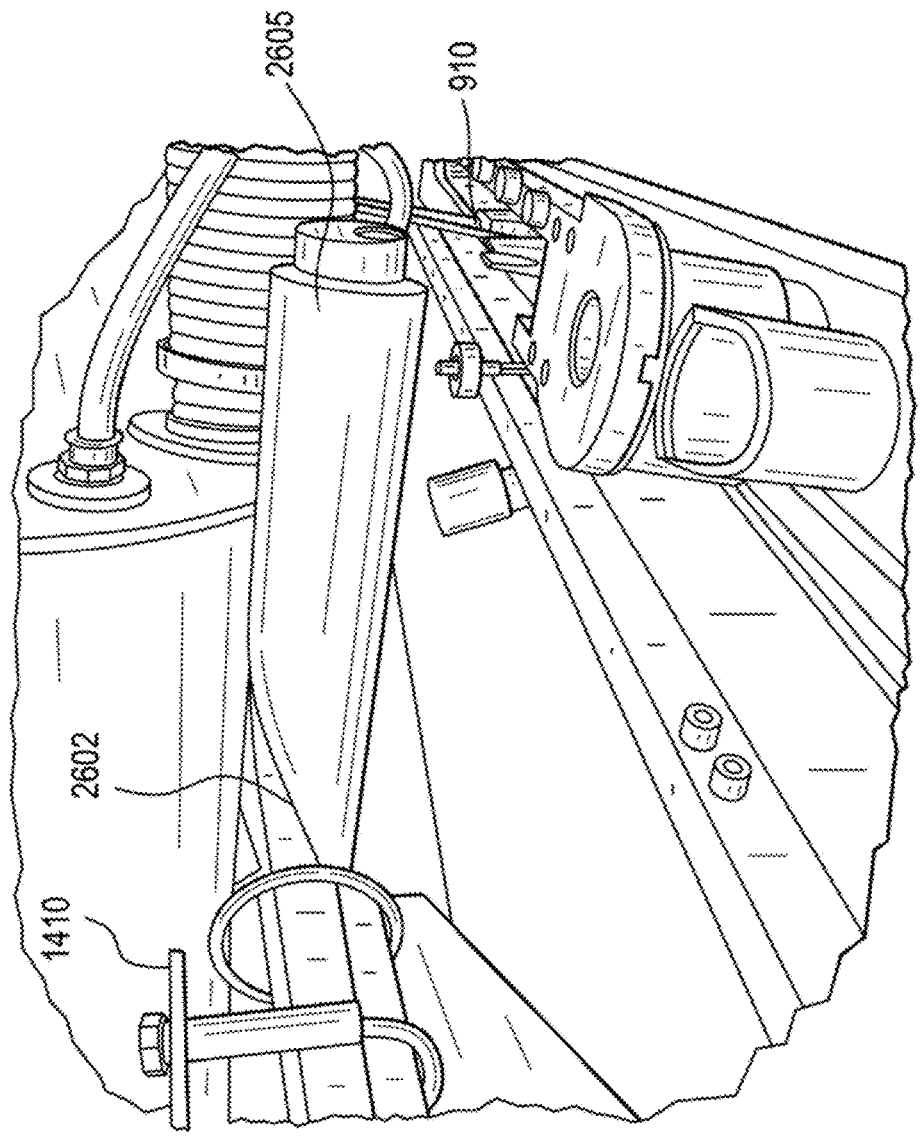
FIG. 26B is a partial view of the apparatus of FIG. 1 showing an ejector location according to at least one example embodiment.

FIG. 26B is a partial view of the apparatus of FIG. 1 showing an ejector station according to at least one example embodiment.

In at least one example embodiment, as shown in FIG. 26B, the waste removal system 190 further includes a waste roller 2605. As the rotatable drum 125 continues to rotate, the waste material 2602 moves over the waste roller 2605 and is then vacuumed up by the waste vacuum 1410 to remove the waste material 2602 from the area of the rotatable drum 125.

Figure 27:
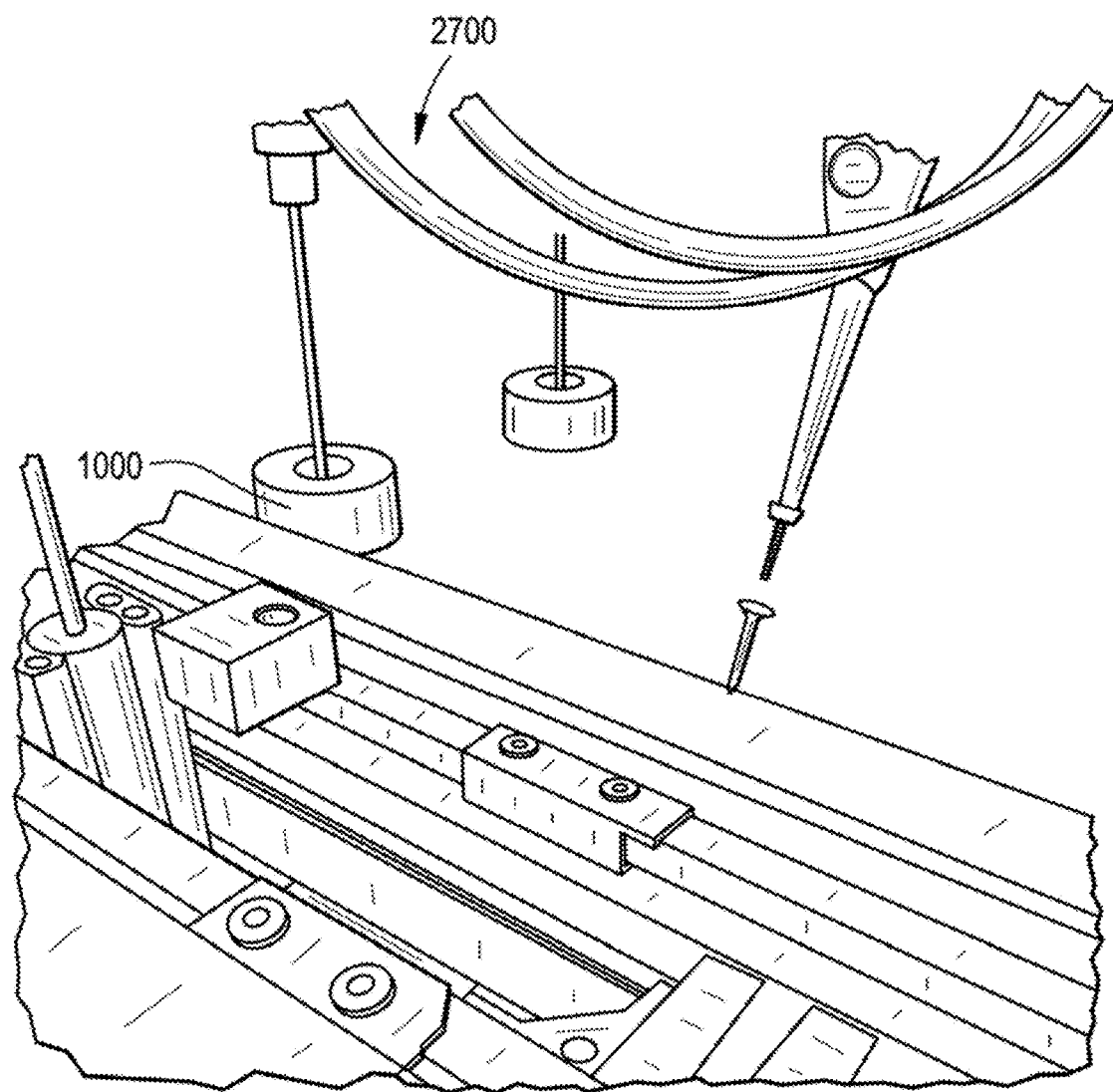
FIG. 27 is a partial view of the apparatus of FIG. 1 showing a tamping location according to at least one example embodiment.

FIG. 27 is a partial view of the apparatus of FIG. 1 showing a tamping station according to at least one example embodiment.

In at least one example embodiment, after a desired number of pouch products 2600 are inserted into each container, the pouch products 2600 are tamped using the tamper 1000. The tamper 1000 is driven by a pneumatic cylinder with position feedback. After each container index, the tamper 1000 is commanded to extend and retract for a configured number of times and duration. Position switches confirm operation and ensure unit is out of the way before another container index can take place.

Figure 28:
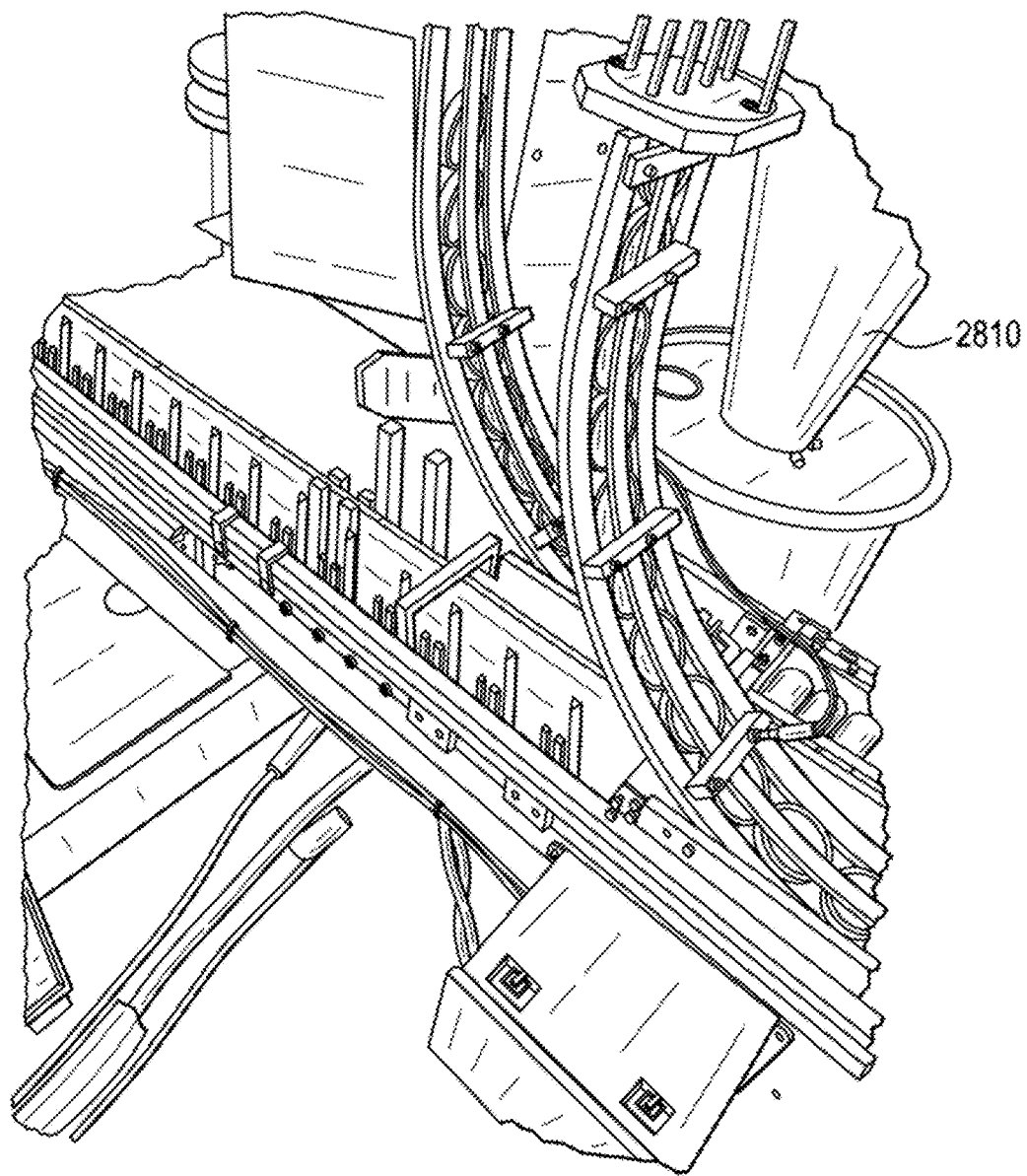
FIG. 28 is a lid distribution system for the apparatus of FIG. 1 according to at least one example embodiment.

FIG. 28 is a lid distribution system for the apparatus of FIG. 1 according to at least one example embodiment.

In at least one example embodiment, as shown in FIG. 28, once the pouch products 2600 are in each container, a lid 2800 is placed on each container by a lid distribution system 2810, which may be any lid distribution system generally known to a person having ordinary skill in the art.

Figure 29:
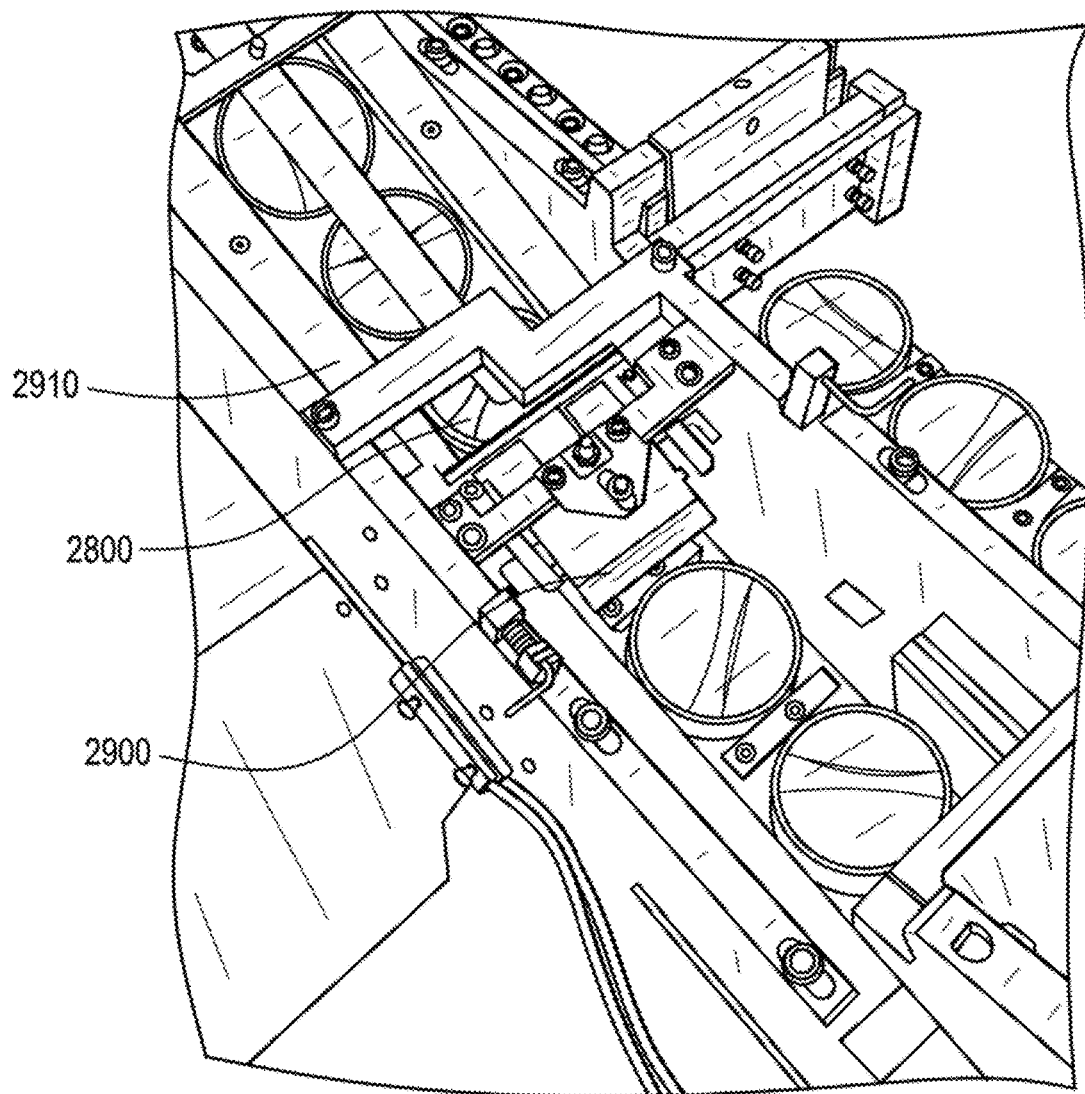
FIG. 29 is an enlarged view of a portion of the lid distribution system of FIG. 28 according to at least one example embodiment.

FIG. 29 is an enlarged view of a portion of the lid distribution system of FIG. 28 according to at least one example embodiment.

In at least one example embodiment, as shown in FIG. 29, each of the lids 2800 slides down a chute 2910 and is allowed to slide onto an open container. A flap 2900 applies pressure to the lid so ensure that the lid is pressed onto the container and forms a closed package.

Figure 30:
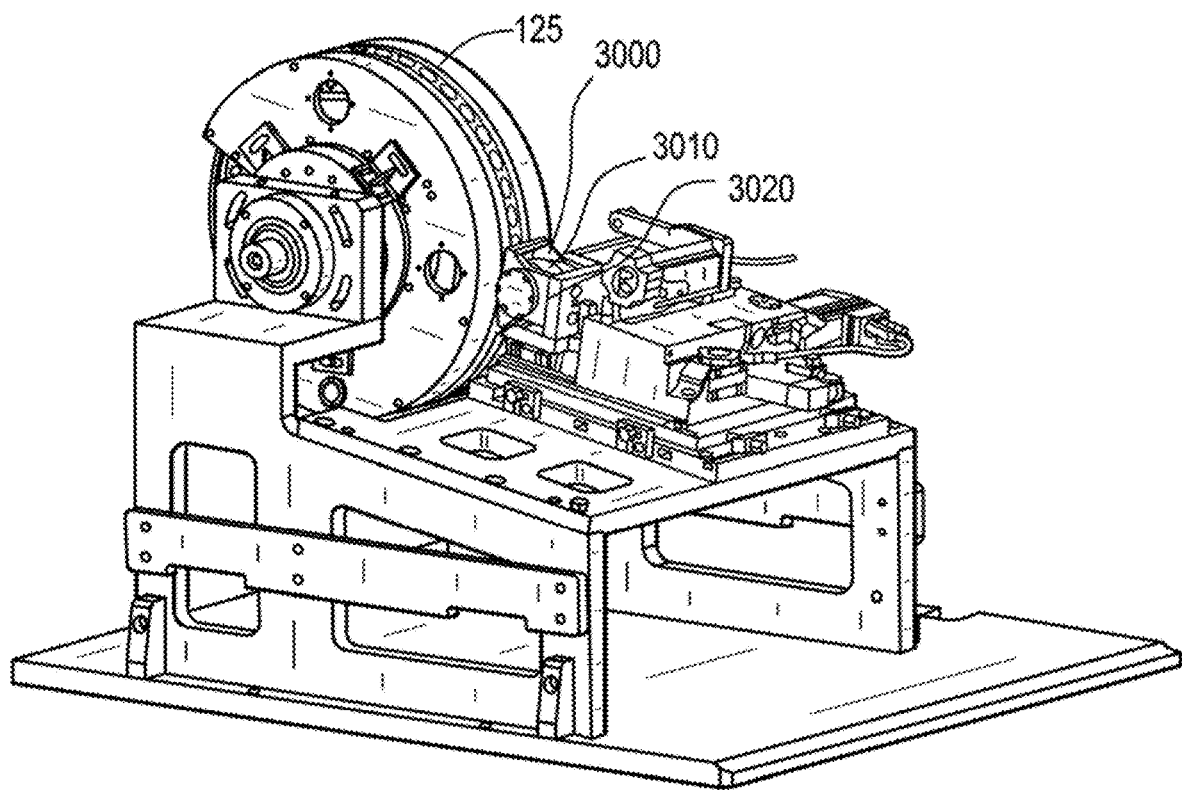
FIG. 30 is a perspective view of a rotatable drum and ultrasonic rotary sealer and cutter according to at least one example embodiment.

FIG. 30 is a perspective view of a rotatable drum and ultrasonic rotary sealer and cutter according to at least one example embodiment.

In at least one example embodiment, as shown in FIG. 30, the rotatable drum 125 is generally the same as in FIG. 1. However, instead of the heat knife assembly, a rotary ultrasonic sealer and cutter 3000 is used to form seals between the elastic layers of material, and the rotatable drum 125 is modified to include ribs (shown in FIG. 32) around each divot.

In at least one example embodiment, the rotary ultrasonic sealer and cutter 3000 includes an ultrasonic roller or sonitrode roller 3010 and a housing 3020. The ultrasonic roller 3010 uses energy in the form of sinusoidal waves to soften the elastic material and seal multiple layers of the elastic material together. The energy wave amplitude or wave height may be adjusted as the power being applied is increased or decreased. The adjustment in power can be used to adjust the sealing based on mechanical strength and/or thickness of the material being sealed. For example, a polymer will soften at a specific rate depending on the mechanical properties of the base material until the polymer is sufficiently melted to create flow between layers being sealed so as to create a bond therebetween. The ultrasonic roller 3010 generates high frequency waves that vibrate the layers of material so as to generate heat and form a seal between the layers. Thus, the friction of vibration generates the heat to form the seal.

In at least one example embodiment, the housing 3020 of the rotary ultrasonic sealer and cutter 3000 is configured to pivot or slide so as to bring the ultrasonic roller 3010 into close proximity to the rotatable drum 125 or move the ultrasonic roller 3010 away from the rotatable drum 125 for maintenance purposes.

Figure 31:
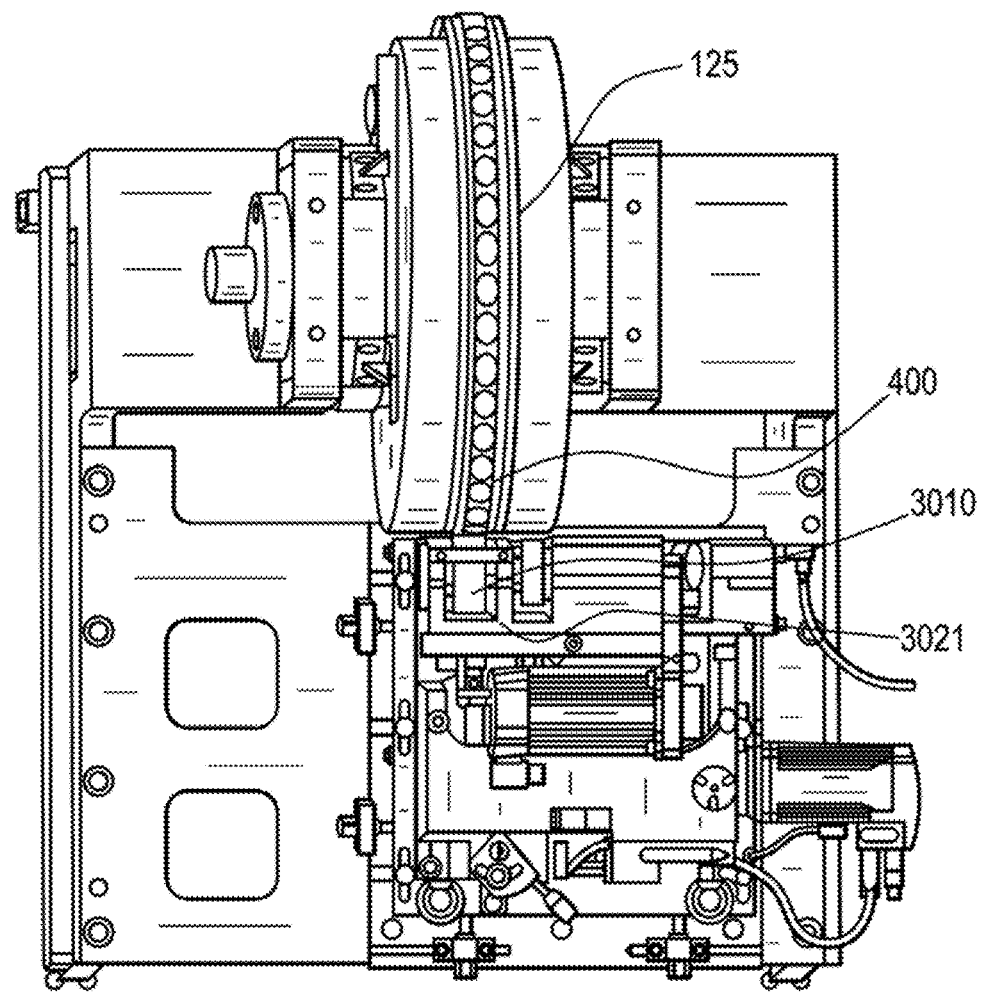
FIG. 31 is a top view of the rotatable drum and the ultrasonic rotary sealer and cutter of FIG. 30 according to at least one example embodiment.

FIG. 31 is a top view of the rotatable drum and the ultrasonic rotary sealer and cutter of FIG. 30 according to at least one example embodiment.

In at least one example embodiment, as shown in FIG. 31, the ultrasonic roller 3010 has a generally smooth surface and comes into close proximity to a portion of the rotatable drum 125 so as to apply a specific amount of pressure to the mesh layers and drive flow between the mesh layers. Because the ultrasonic roller 3010 has a smooth surface, there is no need to align any specific portion of the ultrasonic roller 3010 with each of the divots 400. Further, the ultrasonic welding method may cut through any tobacco or non-metal material located in the sealing region so as to allow for one continuous seal to be formed thereby reducing and/or preventing any gaps where the material being encapsulated could escape from the pouch. Additionally, rotary ultrasonic sealer and cutter 3000 is configured to seal and cut the pouch from the mesh web substrate substantially simultaneously.

Figure 32:
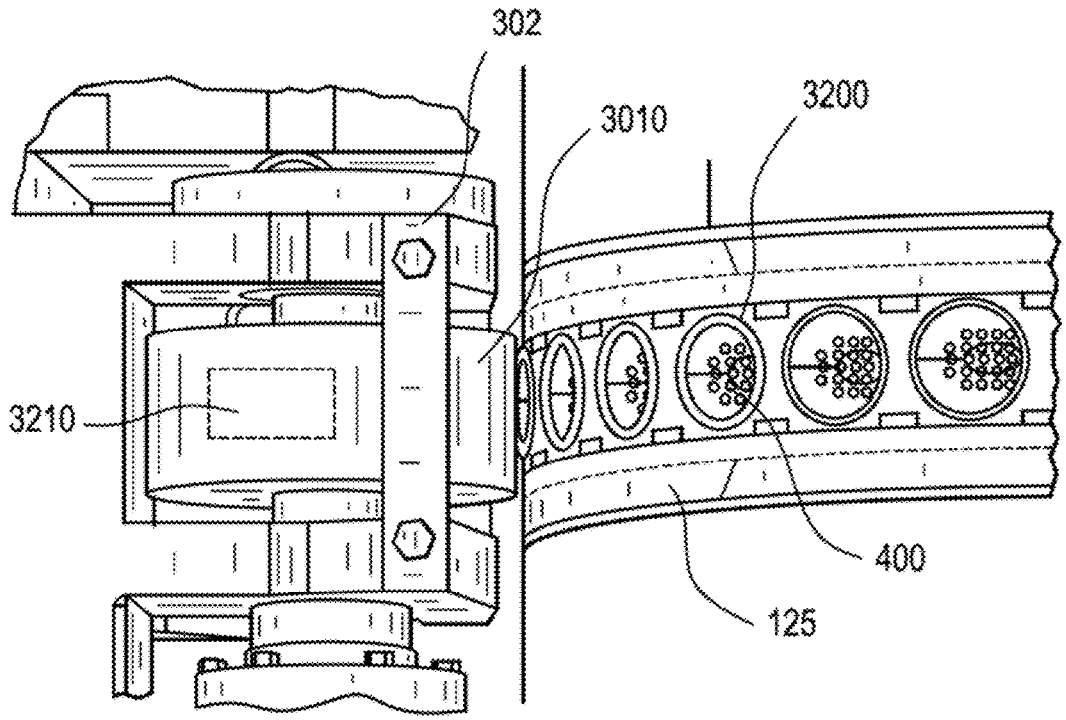
FIG. 32 is an enlarged view of a portion of the rotatable drum and the ultrasonic rotary sealer and cutter of FIG. 30 according to at least one example embodiment.

FIG. 32 is an enlarged view of a portion of the rotatable drum and the ultrasonic rotary sealer and cutter of FIG. 30 according to at least one example embodiment.

In at least one example embodiment, as shown in FIG. 32, ribs 3200 may surround each of the divots 400 of the rotatable drum 125. The ribs 3200 are configured to focus energy so as to form a seal between layers of material overlying the ribs 3200 as the ultrasonic roller 3010 passes over each of the ribs 3200.

In at least one example embodiment, as shown in FIG. 32, the rotary ultrasonic sealer and cutter 3000 includes an ultrasonic wave generator 3210, which may be in the ultrasonic roller 3010. In other example embodiments, the ultrasonic wave generator 3210 may be adjacent to the ultrasonic roller 3010. The ultrasonic wave generator 3210 may be any device configured to generate ultrasonic waves as known to a person having ordinary skill in the art.

Figure 33:
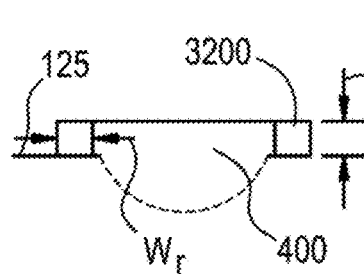
FIGS. 33-35 are cross-sectional views of a sealing and cutting surface of the rotatable drum of FIG. 30 according to at least one example embodiment.
Figure 34:
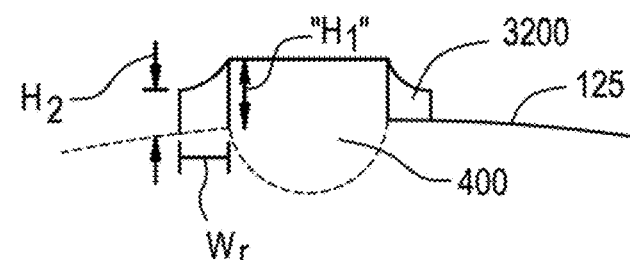
Figure 35:
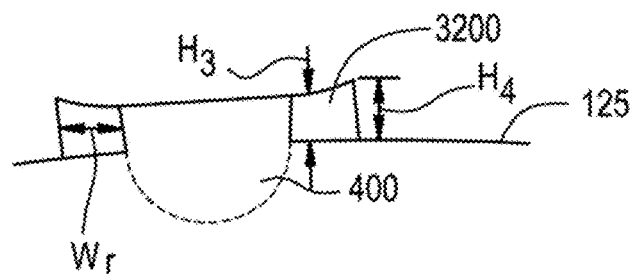

FIGS. 33-35 are cross-sectional views of a sealing and cutting surface of the rotatable drum of FIG. 30 according to at least one example embodiment.

In at least one example embodiment, as shown in FIGS. 33-35, each of the ribs 3200 is raised with respect to a surface of the rotatable drum 125. A height of the ribs 3200 may range from about 0.5 mm to about 1.5 mm (e.g., about 0.75 m to about 1.25 mm).

In at least one example embodiment, as shown in FIG. 33, each of the ribs 3200 may have a generally flat surface, such that the height across an entirety of each rib 3200 is substantially the same.

In at least one example embodiment, as shown in FIG. 34, each of the ribs 3200 may have an angled surface, such that a height H1 is greater than a height H2. Thus, an outer portion of each rib 3200 may be shorter than an inner portion of each rib 3200. Both the height H1 and the height H2 may range from about 0.5 mm to about 1.5 mm.

In at least one example embodiment, as shown in FIG. 35, each of the ribs 3200 may have an angled surface, such that a height H3 is less than a height H4. Thus, an outer portion of each rib 3200 may be higher than an inner portion of each rib 3200. Both the height H1 and the height H2 may range from about 0.5 mm to about 1.5 mm.

Figure 36A:
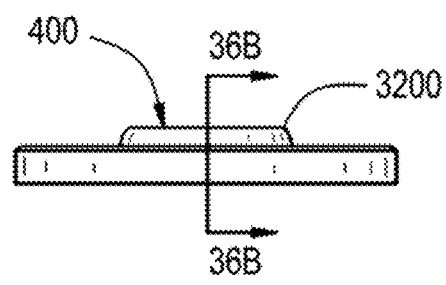
FIG. 36A is a side view of a sealing and cutting surface of the rotatable drum of FIG. 30 according to at least one example embodiment.

FIG. 36A is a side view of a sealing and cutting surface of the rotatable drum of FIG. 30 according to at least one example embodiment.

In at least one example embodiment, as shown in FIG. 36A, the rib 3200 may be angled away from the divot 400.

Figure 36B:
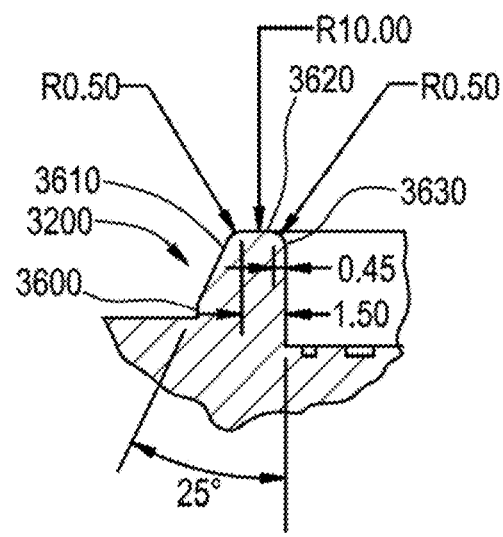
FIG. 36B is a cross-section view along line XXXVI-XXXVI of FIG. 36A according to at least one example embodiment.

FIG. 36B is a cross-section view along line XXXVI-XXXVI of FIG. 36A according to at least one example embodiment.

In at least one example embodiment, as shown in FIG. 36B, the rib 3200 may have a vertical portion 3600 at a base of the rib 3200, and an angled portion 3610 between the vertical portion 3600 and a top portion 3620. Corners 3630 may be rounded and have a radius of about 0.5 mm. In at least one example embodiment, the top portion 3620 may also be rounded. In other example embodiments, the top portion 3620 may be flat.

Figure 37A:
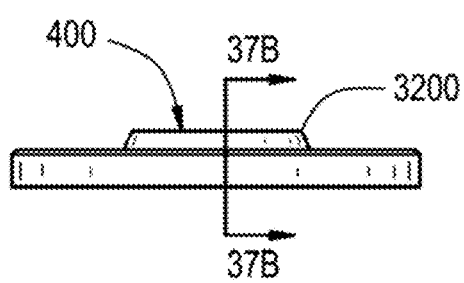
FIG. 37A is a side view of a sealing and cutting surface of the rotatable drum of FIG. 30 according to at least one example embodiment.

FIG. 37A is a side view of a sealing and cutting surface of the rotatable drum of FIG. 30 according to at least one example embodiment.

In at least one example embodiment, as shown in FIG. 37A, the rib 3200 may be angled away from the divot 400.

Figure 37B:
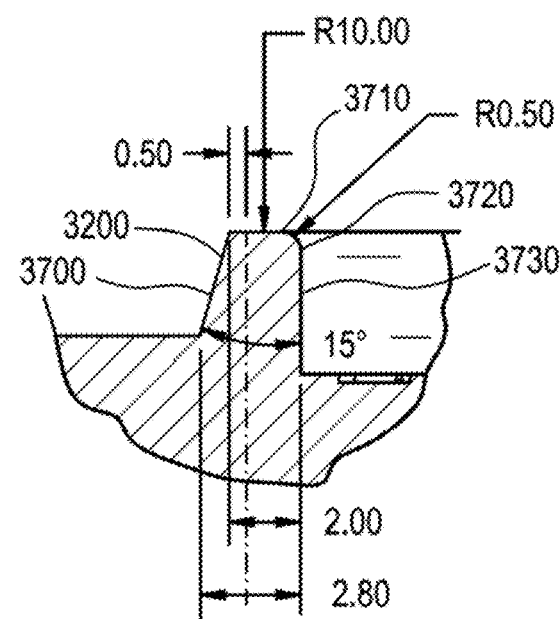
FIG. 37B is a cross-section view along line XXXVII-XXXVII of FIG. 37A according to at least one example embodiment.

FIG. 37B is a cross-section view along line XXXVII-XXXVII of FIG. 37A according to at least one example embodiment.

In at least one example embodiment, as shown in FIG. 37B, the rib 3200 may include an angled outer wall 3700, a top portion 3710, a corner 3720, and an inner wall 3730. In at least one example embodiment, the angled outer wall is about arranged about 105 degrees from the top portion 3710. The top portion 3710 may be substantially flat. The corner 3720 may be generally curved and have a radius of about 0.5 mm. The inner wall 3730 may be generally vertical.

Figure 38A:
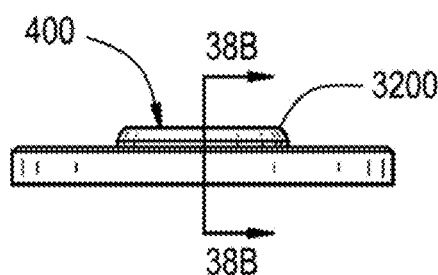
FIG. 38A is a side view of a sealing and cutting surface of the rotatable drum of FIG. 30 according to at least one example embodiment.

FIG. 38A is a side view of a sealing and cutting surface of the rotatable drum of FIG. 30 according to at least one example embodiment.

In at least one example embodiment, as shown in FIG. 38A, the rib 3200 may be angled away from the divot 400.

Figure 38B:
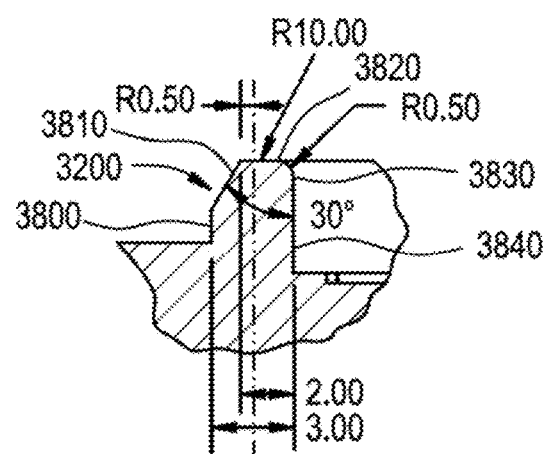
FIG. 38B is a cross-section view along line XXXVIII-XXXVIII of FIG. 38A according to at least one example embodiment.

FIG. 38B is a cross-section view along line XXXVIII-XXXVIII of FIG. 38A according to at least one example embodiment.

In at least one example embodiment, as shown in FIG. 38B, the rib 3200 may include a vertical base wall 3800, an angled outer wall 3810, a top portion 3820, a corner 3830, and an inner wall 3840. In at least one example embodiment, the angled outer wall is about arranged about 120 degrees from the top portion 3820. The top portion 3820 may be substantially flat. The corner 3830 may be generally curved and have a radius of about 0.5 mm. The inner wall 3840 may be generally vertical.

Figure 39A:
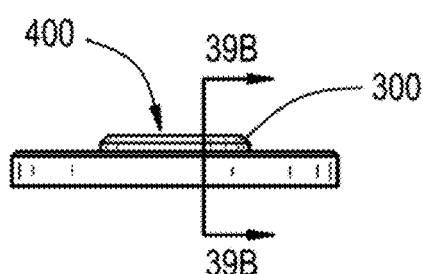
FIG. 39A is a side view of a sealing and cutting surface of the rotatable drum of FIG. 30 according to at least one example embodiment.

FIG. 39A is a side view of a sealing and cutting surface of the rotatable drum of FIG. 30 according to at least one example embodiment.

In at least one example embodiment, as shown in FIG. 39A, the rib 3200 may be angled away from the divot 400.

Figure 39B:
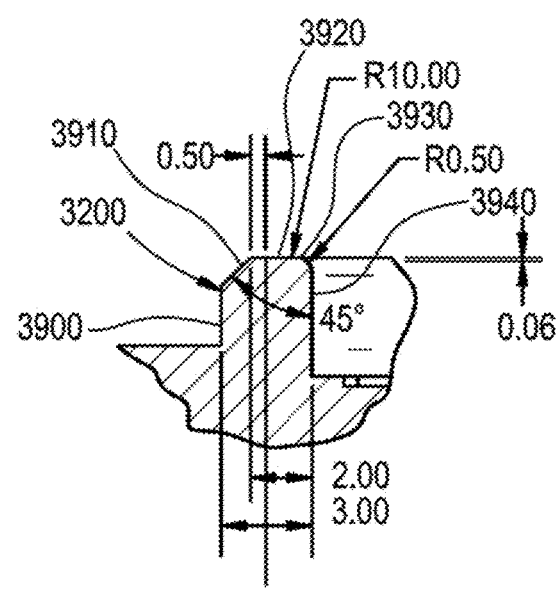
FIG. 39B is a cross-section view along line XXXIX-XXXIX of FIG. 39A according to at least one example embodiment.

FIG. 39B is a cross-section view along line XXXIX-XXXIX of FIG. 39A according to at least one example embodiment.

In at least one example embodiment, as shown in FIG. 39B, the rib 3200 may include a vertical base wall 3900, an angled outer wall 3910, a top portion 3920, a corner 3930, and an inner wall 3940. In at least one example embodiment, the angled outer wall 3910 is about arranged about 135 degrees from the top portion 3920. The top portion 3920 may be substantially flat. The corner 3930 may be generally curved and have a radius of about 0.5 mm. The inner wall 3940 may be generally vertical.

Figure 40A:
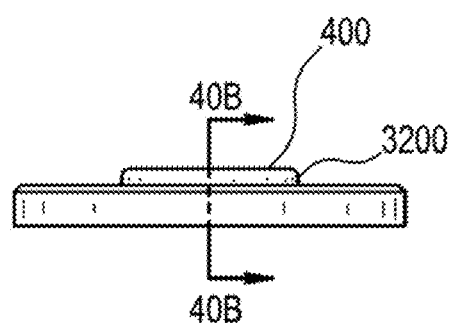
FIG. 40A is a side view of a sealing and cutting surface of the rotatable drum of FIG. 30 according to at least one example embodiment.

FIG. 40A is a side view of a sealing and cutting surface of the rotatable drum of FIG. 30 according to at least one example embodiment.

In at least one example embodiment, as shown in FIG. 39A, the rib 3200 may be curved inwardly towards the divot 400.

Figure 40B:
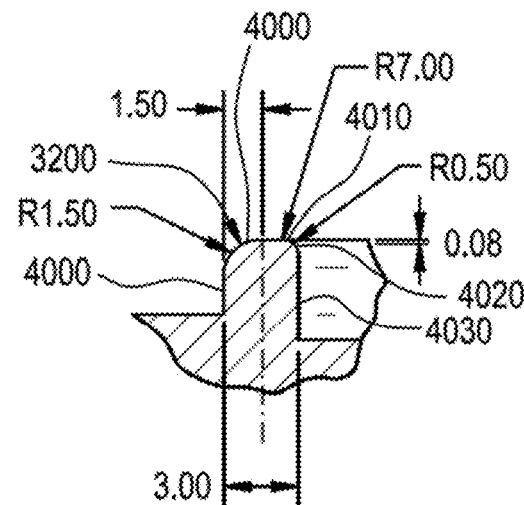
FIG. 40B is a cross-section view along line XL-XL of FIG. 40A according to at least one example embodiment.

FIG. 40B is a cross-section view along line XL-XL of FIG. 40A according to at least one example embodiment.

In at least one example embodiment, as shown in FIG. 40B, the rib 3200 may have a vertical outer wall 4000, an outer corner 4000, a top portion 4010, an inner corner 4020, and an inner wall 4030. The outer corner 4000 may be generally curved and may have a radius of about 1.50 mm. The top portion 4010 may be generally flat. In other example embodiments, the top portion 4010 may be curved. The inner corner 4020 may be generally curved and may have a radius of about 0.5 mm. The inner wall 4030 may be generally vertical.

Figure 41A:
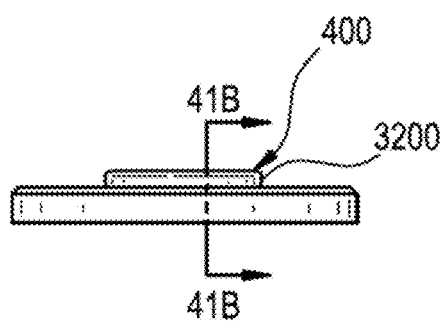
FIG. 41A is a side view of a sealing and cutting surface of the rotatable drum of FIG. 30 according to at least one example embodiment.

FIG. 41A is a side view of a sealing and cutting surface of the rotatable drum of FIG. 30 according to at least one example embodiment.

Figure 41B:
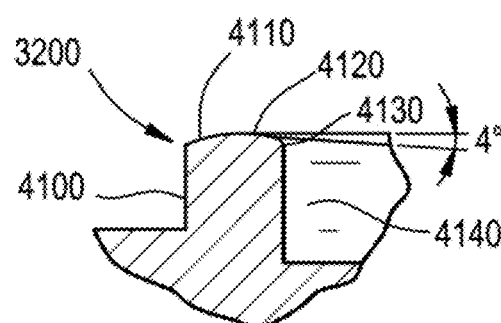
FIG. 41B is a cross-section view along line XLI-XLI of FIG. 41A according to at least one example embodiment.

In at least one example embodiment, as shown in FIG. 41A, the rib 3200 may have a generally straight outer wall and an angled top portion that angles inwardly towards the divot 400 at a top portion of the outer wall (as shown in FIG. 41B).

FIG. 41B is a cross-section view along line XLI-XLI of FIG. 41A according to at least one example embodiment.

In at least one example embodiment, as shown in FIG. 41B, the rib 3200 includes an outer wall 4100, an angled top portion 4110, a flat top portion 4120, an inner corner 4130, and an inner wall 4140. The angled top portion 4110 may be angled upwardly from the outer wall 4100 to the flat top portion 4120. The inner corner 4130 may be curved or angled. The inner wall 4140 may be substantially vertical.

In at least one example embodiment, the ribs 3200 may be flat or angled. Multiple geometries may be used to promote sealing and cutting. Ribs 3200 having a larger radius at a top portion and/or corners thereof may provide improved sealing. In at least one example embodiment, ribs 3200 having a top portion with an acute angle may provide improved cutting.

While some example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

Although described with reference to specific examples and drawings, modifications, additions and substitutions of example embodiments may be variously made according to the description by those of ordinary skill in the art. For example, the described techniques may be performed in an order different with that of the methods described, and/or elements such as the described system, architecture, devices, circuit, and the like, may be connected or combined to be different from the above-described methods, or results may be appropriately achieved by other elements or equivalents.

We claim:

1. A method of making a pouch product having an elastic outer wrapper, the method comprising:
transferring a first material to a first receiving location, the first material including a first elastic layer and a first support layer;
removing a portion of the first support layer from the first elastic layer to form a first web; and
conveying the first web to a dosing location.

2. The method of claim 1, further comprising:
applying a vacuum to the first web at the dosing location to form first web portions;
filling each of the first web portions with a filling material to form filled first web portions; and
conveying the filled first web portions to a second receiving location.

3. The method of claim 2, further comprising:
transferring a second material to the second receiving location, the second material including a second elastic layer and a second support layer; and
removing a portion of the second support layer to form a second web.

4. The method of claim 3, further comprising:
aligning the second web with the first web; and
sealing the second web to the first web to form a pouch product.

5. The method of claim 4, further comprising:
cutting the pouch product from the first web and the second web.

6. The method of claim 5, wherein the sealing and the cutting are performed at a same location, a cutting and sealing location.

7. The method of claim 6,
wherein the cutting and sealing location includes a heat knife,
wherein the heat knife is configured to heat seal a portion of the first web to a portion of the second web, and
wherein the heat knife is configured to at least partially cut through the first web and the second web.

8. The method of claim 6,
wherein the cutting and sealing location includes an ultrasonic roller,
wherein the ultrasonic roller is configured to generate high frequency waves that vibrate the first web and the second web so as to generate heat and seal the first web and the second web.

9. The method of claim 5, further comprising:
ejecting the pouch product from a product ejection location into a product container.

10. The method of claim 9, further comprising:
removing waste material from a waste removal location, the waste material including excess amounts of the first web and the second web,
wherein the waste material is removed by applying a vacuum to the waste removal location.

11. The method of claim 3, wherein the second material is different from the first material.

12. The method of claim 1,
wherein the first support layer includes a first portion and a second portion, and
wherein the first portion and the second portion of the first support layer are configured to be separated.

13. The method of claim 12, wherein the first portion of the first support layer is configured to be removed and the second portion of the first support layer is configured to remain coupled to the first elastic layer.

14. The method of claim 12,
wherein the second portion of the first support layer includes a pair of second portions, and
wherein the first portion of the first support layer separates the pair of second portions from each other.

15. The method of claim 1, wherein the first support layer is a sheet of woven material.

16. The method of claim 1, wherein a first stripper plate is configured to remove the portion of the first support layer from the first elastic layer to form the first web.

17. The method of claim 1, wherein the first elastic layer includes polyurethane.

18. The method of claim 1, wherein the first support layer includes polypropylene.

19. The method of claim 1, wherein the first support layer of the first material extends coextensive along an upper surface or a lower surface of the first elastic layer of the first material.

* * * * *